US011741812B2

(12) United States Patent
Pourmohammad et al.

(10) Patent No.: US 11,741,812 B2
(45) Date of Patent: *Aug. 29, 2023

(54) BUILDING RISK ANALYSIS SYSTEM WITH DYNAMIC MODIFICATION OF ASSET-THREAT WEIGHTS

(71) Applicant: Johnson Controls Tyco IP Holdings LLP, Milwaukee, WI (US)

(72) Inventors: Sajjad Pourmohammad, Milwaukee, WI (US); Youngchoon Park, Brookfield, WI (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/691,722

(22) Filed: Mar. 10, 2022

(65) Prior Publication Data
US 2022/0223023 A1 Jul. 14, 2022

Related U.S. Application Data

(63) Continuation of application No. 16/783,936, filed on Feb. 6, 2020, now Pat. No. 11,276,288, which is a
(Continued)

(51) Int. Cl.
*G08B 25/00* (2006.01)
*G08B 21/02* (2006.01)
(Continued)

(52) U.S. Cl.
CPC ............ *G08B 21/02* (2013.01); *G06F 40/30* (2020.01); *G06N 5/022* (2013.01); *G06N 20/00* (2019.01);
(Continued)

(58) Field of Classification Search
USPC .. 340/517, 506, 541, 521, 870.06, 903–907, 340/915, 990–991
See application file for complete search history.

(56) References Cited

U.S. PATENT DOCUMENTS 5,301,109 A    4/1994   Landauer et al.
5,446,677 A    8/1995   Jensen et al.
(Continued)

FOREIGN PATENT DOCUMENTS

CN    101415011 A    4/2009
CN    102136099 A    7/2011
(Continued)

OTHER PUBLICATIONS

International Search Report and Written Opinion on PCT/US2018/052971, dated Mar. 1, 2019, 19 pages.
(Continued)

*Primary Examiner* — Daniel Previl
(74) *Attorney, Agent, or Firm* — Foley & Lardner LLP

(57) ABSTRACT

A building management system includes one or more computer-readable storage media having a data structure, wherein the data structure comprises a plurality of vulnerabilities and a plurality of pairs, each of the plurality of pairs comprising one of a plurality of assets and one of the plurality of threat types, wherein each of the plurality of pairs is associated with one of the plurality of vulnerabilities and instructions. The instructions cause one or more processors to receive a threat, the threat comprising a particular threat type of the plurality of threat types, the threat indicating an incident affecting a risk value associated with a particular asset of the plurality of assets, identify a particular vulnerability of the data structure based on the particular threat type and the particular asset, and determine, based on
(Continued)

the particular vulnerability and the threat, the risk value associated with the particular asset.

20 Claims, 36 Drawing Sheets

Related U.S. Application Data continuation of application No. 16/143,247, filed on Sep. 26, 2018, now Pat. No. 10,559,180.

(60) Provisional application No. 62/637,954, filed on Mar. 2, 2018, provisional application No. 62/628,711, filed on Feb. 9, 2018, provisional application No. 62/628,647, filed on Feb. 9, 2018, provisional application No. 62/627,606, filed on Feb. 7, 2018, provisional application No. 62/627,615, filed on Feb. 7, 2018, provisional application No. 62/627,627, filed on Feb. 7, 2018, provisional application No. 62/627,596, filed on Feb. 7, 2018, provisional application No. 62/627,698, filed on Feb. 7, 2018, provisional application No. 62/564,247, filed on Sep. 27, 2017.

(51) Int. Cl.
| | | |
|---|---|---|
| *G08B 19/00* | (2006.01) | |
| *G08B 31/00* | (2006.01) | |
| *G06F 40/30* | (2020.01) | |
| *G06N 20/00* | (2019.01) | |
| *G06N 5/022* | (2023.01) | |
| *G08B 21/10* | (2006.01) | |
| *G08B 21/18* | (2006.01) | |
| *G08B 25/10* | (2006.01) | |
| *G08B 23/00* | (2006.01) | |
| *H04W 4/021* | (2018.01) | |
| *G06Q 10/0635* | (2023.01) | |
| *G06Q 10/067* | (2023.01) | |
| *G06Q 50/16* | (2012.01) | |

(52) U.S. Cl.
CPC ....... *G06Q 10/067* (2013.01); *G06Q 10/0635* (2013.01); *G06Q 50/163* (2013.01); *G08B 19/00* (2013.01); *G08B 21/10* (2013.01); *G08B 21/182* (2013.01); *G08B 23/00* (2013.01); *G08B 25/10* (2013.01); *G08B 31/00* (2013.01); *H04W 4/021* (2013.01); *G08B 21/18* (2013.01)

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 * | 10/2010 | Lovejoy ............ G06Q 10/0635 |
| | | | 705/28 |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,201,257 | B1 | 6/2012 | Andres et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,516,053 | B1 | 12/2016 | Muddu et al. |
| 9,524,594 | B2 | 12/2016 | Ouyang et al. |
| 9,537,884 | B1 * | 1/2017 | Raugas ............... H04L 63/1433 |
| 9,558,196 | B2 | 1/2017 | Johnston et al. |
| 9,609,009 | B2 | 3/2017 | Muddu et al. |
| 9,652,813 | B2 | 5/2017 | Gifford et al. |
| 9,753,455 | B2 | 9/2017 | Drees |
| 9,762,603 | B2 | 9/2017 | Grondin et al. |
| 9,800,605 | B2 | 10/2017 | Baikalov et al. |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,559,180 | B2 * | 2/2020 | Pourmohammad ..... G06F 40/30 |
| 10,559,181 | B2 | 2/2020 | Pourmohammad et al. |

(56) References Cited

U.S. PATENT DOCUMENTS

| | | |
|---|---|---|
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,276,288 B2* | 3/2022 | Pourmohammad .... G08B 25/10 |
| 11,360,959 B2 | 6/2022 | Pourmohammad et al. |
| 2002/0066034 A1 | 5/2002 | Schlossberg et al. |
| 2002/0138416 A1 | 9/2002 | Lovejoy et al. |
| 2004/0193451 A1 | 9/2004 | McNair |
| 2005/0055308 A1 | 3/2005 | Meyer et al. |
| 2006/0265751 A1 | 11/2006 | Cosquer et al. |
| 2007/0169194 A1* | 7/2007 | Church .............. H04L 63/1416 726/23 |
| 2007/0273497 A1 | 11/2007 | Kuroda et al. |
| 2008/0034425 A1 | 2/2008 | Overcash et al. |
| 2008/0094230 A1 | 4/2008 | Mock et al. |
| 2009/0157744 A1 | 6/2009 | McConnell |
| 2010/0094768 A1 | 4/2010 | Miltonberger |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0208849 A1 | 8/2011 | Barnett et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0072039 A1 | 3/2012 | Anderson et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0074188 A1 | 3/2013 | Giakouminakis et al. |
| 2013/0086497 A1 | 4/2013 | Ambuhl et al. |
| 2013/0096980 A1 | 4/2013 | Basavapatna et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0184838 A1 | 7/2013 | Tchoryk et al. |
| 2013/0191919 A1* | 7/2013 | Basavapatna .......... H04L 63/20 726/25 |
| 2013/0204836 A1 | 8/2013 | Choi et al. |
| 2013/0212685 A1 | 8/2013 | Kelley et al. |
| 2013/0246916 A1 | 9/2013 | Reimann et al. |
| 2013/0247205 A1* | 9/2013 | Schrecker ............. G06F 21/577 726/25 |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0046863 A1 | 2/2014 | Gifford et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0279641 A1 | 9/2014 | Singh et al. |
| 2014/0280231 A1 | 9/2014 | Paruchuri et al. |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0215332 A1 | 7/2015 | Curcic et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316907 A1 | 11/2015 | Elbsat et al. |
| 2015/0316918 A1 | 11/2015 | Schleiss et al. |
| 2015/0324422 A1 | 11/2015 | Elder |
| 2015/0324430 A1 | 11/2015 | Koran et al. |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0226905 A1 | 8/2016 | Baikalov et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |

(56) References Cited

U.S. PATENT DOCUMENTS

| | | |
|---|---|---|
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0237752 A1 | 8/2017 | Ganguly et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0366561 A1 | 12/2017 | Petersen et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0053401 A1 | 2/2018 | Martin et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0315283 A1 | 11/2018 | Brosnan |
| 2018/0324202 A1 | 11/2018 | Lim |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0095644 A1 | 3/2019 | Park et al. |
| 2019/0096014 A1 | 3/2019 | Pourmohammad et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0268644 A1 | 8/2019 | Fradlis et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102571870 A | 7/2012 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |

(56) References Cited

FOREIGN PATENT DOCUMENTS

| WO | WO-2017/194244 A1 | 11/2017 |
|----|-------------------|---------|
| WO | WO-2017/205330 A1 | 11/2017 |
| WO | WO-2017/213918 A1 | 12/2017 |

OTHER PUBLICATIONS

Results of the Partial International Search for PCT/US2018/052971, dated Jan. 3, 2019, 3 pages.
U.S. Decision on Appeal on U.S. Appl. No. 16/143,037 dated Oct. 25, 2021 (34 pages).
U.S. Final Office Action on U.S. Appl. No. 16/143,037 dated Sep. 29, 2020 (32 pages).
U.S. Final Office Action on U.S. Appl. No. 16/143,221 dated Mar. 2, 2021 (15 pages).
U.S. Final Office Action on U.S. Appl. No. 16/143,274 dated Mar. 3, 2022 (30 pages).
U.S. Final Office Action on U.S. Appl. No. 16/255,719 dated Dec. 23, 2019 (16 pages).
U.S. Final Office Action on U.S. Appl. No. 16/255,719 dated Jun. 16, 2021 (11 pages).
U.S. Final Office Action on U.S. Appl. No. 16/783,936 dated Feb. 22, 2021 (11 pages).
U.S. Final Office Action on U.S. Appl. No. 16/143,221 dated Jun. 7, 2022 (15 pages).
U.S. Non-Final Office Action on U.S. Appl. No. 16/143,282 dated Jun. 10, 2019 (14 pages).
U.S. Non-Final Office Action on U.S. Appl. No. 16/143,221 dated Oct. 26, 2021 (22 pages).
U.S. Non-Final Office Action on U.S. Appl. No. 16/143,037 dated Apr. 17, 2020 (28 pages).
U.S. Non-Final Office Action on U.S. Appl. No. 16/143,221 dated Jul. 24, 2020 (15 pages).
U.S. Non-Final Office Action on U.S. Appl. No. 16/143,247 dated Jun. 5, 2019 (9 pages).
U.S. Non-Final Office Action on U.S. Appl. No. 16/143,256 dated Mar. 8, 2021 (14 pages).
U.S. Non-Final Office Action on U.S. Appl. No. 16/143,274 dated Jul. 19, 2021 (29 pages).
U.S. Non-Final Office Action on U.S. Appl. No. 16/143,274 dated Sep. 6, 2022 (31 pages).
U.S. Non-Final Office Action on U.S. Appl. No. 16/143,276 dated Jun. 7, 2019 (18 pages).
U.S. Non-Final Office Action on U.S. Appl. No. 16/143,283 dated Nov. 29, 2019 (16 pages).
U.S. Non-Final Office Action on U.S. Appl. No. 16/255,719 dated Dec. 23, 2020 (16 pages).
U.S. Non-Final Office Action on U.S. Appl. No. 16/255,719 dated Jun. 24, 2019 (9 pages).
U.S. Non-Final Office Action on U.S. Appl. No. 16/255,719 dated May 14, 2020 (10 pages).
U.S. Non-Final Office Action on U.S. Appl. No. 16/783,936 dated Jul. 1, 2021 (9 pages).
U.S. Non-Final Office Action on U.S. Appl. No. 16/783,936 dated Sep. 23, 2020 (10 pages).
U.S. Non-Final Office Action on U.S. Appl. No. 17/542,837 dated Oct. 7, 2022 (11 pages).
U.S. Notice of Allowance on U.S. Appl. No. 16/255,719 dated Mar. 17, 2022 (9 pages).
U.S. Notice of Allowance on U.S. Appl. No. 16/143,221 dated Oct. 3, 2022 (9 pages).
U.S. Notice of Allowance on U.S. Appl. No. 16/143,247 dated Jan. 9, 2020 (2 pages).
U.S. Notice of Allowance on U.S. Appl. No. 16/143,247 dated Oct. 31, 2019 (2 pages).
U.S. Notice of Allowance on U.S. Appl. No. 16/143,247 dated Sep. 27, 2019 (10 pages).
U.S. Notice of Allowance on U.S. Appl. No. 16/143,256 dated Aug. 4, 2021 (8 pages).
U.S. Notice of Allowance on U.S. Appl. No. 16/143,276 dated Jan. 21, 2020 (2 pages).
U.S. Notice of Allowance on U.S. Appl. No. 16/143,276 dated Oct. 30, 2019 (2 pages).
U.S. Notice of Allowance on U.S. Appl. No. 16/143,276 dated Sep. 27, 2019 (15 pages).
U.S. Notice of Allowance on U.S. Appl. No. 16/143,282 dated Jan. 15, 2020 (2 pages).
U.S. Notice of Allowance on U.S. Appl. No. 16/143,282 dated Nov. 15, 2019 (2 pages).
U.S. Notice of Allowance on U.S. Appl. No. 16/143,282 dated Sep. 25, 2019 (13 pages).
U.S. Notice of Allowance on U.S. Appl. No. 16/783,936 dated Dec. 1, 2021 (8 pages).
Fritz, Matthew S., "An Exponential Decay Model for Mediation," Prev Sci., Oct. 2014, 15(5) (20 pages).
German Office Action on German Appl. No. DE 112018004325.8 dated Aug. 31, 2022 (8 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).

(56) References Cited

OTHER PUBLICATIONS

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Reporton EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," Data'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
U.S. Final Office Action on U.S. Appl. No. 16/143,274 dated Jan. 10, 2023 (46 pages).
U.S. Notice of Allowance on U.S. Appl. No. 17/542,837 dated Feb. 1, 2023 (8 pages).

(56) References Cited

OTHER PUBLICATIONS

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
Hecht, J., "An Application of Risk Terrain Modeling to Identifying High Risk Locations for Active Shooter Events, A Thesis Submitted to the Faculty of Mercyhurst University," Mercyhurst University, Erie, PA, USA, May 2016 (64 pages).
U.S. Non-Final Office Action on US Appl. U.S. Appl. No. 16/143,221 dated Jun. 30, 2023 (19 pages).

* cited by examiner

|  | Asset 1 | Asset 2 | ... | Asset m |
|---|---|---|---|---|
| Threat 1 | $V_{11}$ | ... | ... | $V_{1m}$ |
| Threat 2 | ⋮ | $V_{22}$ |  | ⋮ |
| ⋮ | ⋮ |  | ⋱ | ⋮ |
| Threat n | $V_{n1}$ | ... | ... | $V_{nm}$ |

ADMIN SETTINGS

Update Vulnerabilities of Assets:

- ● Bulk Update ← 1910
- ○ Single Update

Select Asset Category: [Tactical ▼] ← 1902

Select Asset: [ ▼] ← 1904

Enabled Threats: ← 1906
[Disease Outbreak ▼]
[Remove from the list] ← 1912

Select Threat To Enable: ← 1908
[ ▼]
[Add to the list] ← 1914

[Update Category-wide Vulnerabilities] ← 1916
[Update Selected Asset Vulnerabilities] ← 1918

HOME

All monitoring zones
Sort by: Severity
(Pending alarms) — 2902

● System - Door Held Open
ID: 708b74b8-7e0b-4a25-8ac6-2a756412c87b
■ 10   ◆ BOISE-401WFRONT, Office - Boise,ID,US    03:25:42 (MDT)    10:25:4... | TaaS Priority | 18
                                                                      | Risk          |
                                                                      | Severity  |
● System - Shorted Line Active
ID: a538ebb2-8cde-438a-a0f1-57a6dae35551a
■ 10   ◆ S0017-PALOALTO, Retail - Palo Alto, CA, US    02:22:42 (PDT)    10:25:4... | Date & Time  | 18
                                                                          ◆ DNV 10... | Source       |
● System - Power Failure Active                                                        | Alarm Type   |
ID: dc56a756-0f97-462c-a084-b028e70fa28c                                               | Device Name  |
■ 18   ◆ S0006-BELLVUE, Retail - Bellvue, WA, US    02:25:42 (PDT)    10:25:4...                     | se
                                                                                                     | 18
◆ LSQ 0069I+L15PSF Pwr Fail Elev M ● System - Reader Low Battery
ID: a7bc1f3e-44fd-4608-ad7c-f4e65159ac5
■ 10   ◆ S0017-PALOALTO, Retail - Palo Alto, CA, US    02:25:42 (PDT)    10:25:42 AM (IST) - April 20/2018
◆ PAP 0015IV L01 DC N Emerg Exit ● Trouble - Foil Break Alarm
ID: 8bea847c-bc05-4ecb-9a28-3c212e5c361f
■ 25   ◆ K-DENVER3030, Retail - Denver, CO, US    03:25:42 (MDT)    10:25:42 AM (IST) - April 20/2018
◆ DNV 1019IV L00 FDS N Ext Wing ● Temperature - Temperature Alarm
ID: 7b9252e7-3eee-4a1b-8f7f-22476843b1cf
■ 23   ◆ MTN-VIEW-1090-A, RD - Mountain View, CA, US    02:25:42 (PDT)    10:25:42 AM (IST) - April 20/2018
◆ MVN 0000I+ UNK TM XBOX Temp 01

● AccessDenied - Invalid Badge
ID: 6b88ce87-ca03-4315-b9f6-80d652fae223

Home
Reports
Watch

BUILDING RISK ANALYSIS SYSTEM WITH DYNAMIC MODIFICATION OF ASSET-THREAT WEIGHTS

CROSS-REFERENCE TO RELATED PATENT APPLICATIONS

This application is a continuation of and claims the benefit of and priority to U.S. patent application Ser. No. 16/783,936 filed Feb. 6, 2020. U.S. patent application Ser. No. 16/783,936 filed Feb. 6, 2020 claims the benefit of and priority to U.S. Non-Provisional patent application Ser. No. 16/143,247 filed Sep. 26, 2018. U.S. patent application Ser. No. 16/143,247 filed Sep. 26, 2018 claims the benefit of and priority to U.S. Provisional Patent Application No. 62/564,247 filed Sep. 27, 2017, U.S. Provisional Patent Application No. 62/627,596 filed Feb. 7, 2018, U.S. Provisional Patent Application No. 62/627,615 filed Feb. 7, 2018, U.S. Provisional Patent Application No. 62/627,627 filed Feb. 7, 2018, U.S. Provisional Patent Application No. 62/627,606 filed Feb. 7, 2018, U.S. Provisional Patent Application No. 62/627,698 filed Feb. 7, 2018, U.S. Provisional Patent Application No. 62/628,647 filed Feb. 9, 2018, U.S. Provisional Patent Application No. 62/628,711 filed Feb. 9, 2018, and U.S. Provisional Patent Application No. 62/637,954 filed Mar. 2, 2018. The entirety of each of these patent applications is incorporated by reference herein.

BACKGROUND

The present disclosure relates generally to building security systems for assets (e.g., buildings, building sites, building spaces, people, cars, equipment, etc.). The present disclosure relates more particularly to security platforms for handling alarms for the building, risk analytics, and risk mitigation.

Many security platforms provide threat information to operators and analysts monitoring all the activities and data generated from building sensors, security cameras, access control systems, etc. The data may be, or may be indicative of alarms, i.e., events occurring in the building that indicate an intrusion, a fire, or any other dangerous event. Furthermore, the data may be external, e.g., data from data sources reporting potential threats e.g., violent crimes, weather and natural disaster reports, traffic incidents, robbery, protests, etc. However, due to the volume of data for the activities and the dynamic nature of the activities, a large amount of resources are required by the security platform to process the data. Since there may be many alarms, not only does the security platform require a large amount of resources, a high number of security operators and/or analysts are required to review and/or monitor the various different alarms or systems of the building.

SUMMARY

Natural Language Processing (NLP) Engine

One implementation of the present disclosure is a building management system including one or more computer-readable storage media having instructions stored thereon that, when executed by one or more processors, cause the one or more processors to receive threat events from one or more data sources indicating a potential threat to at least one of buildings, building equipment, people, or spaces within a building, each threat event including a description. The instructions cause the one or more processors, for each threat event, to determine whether the description for the threat event corresponds to one of multiple predefined threat categories, in response to determining the description corresponds to one of the predefined threat categories, generate a standardized threat object for the threat event using the corresponding predefined threat category, and in response to determining the description does not correspond to one of the predefined threat categories. The instructions cause the one or more processors to generate the standardized threat object by processing the description using a natural language processing engine to identify one of the predefined threat categories to be assigned to the threat event and generating a standardized threat object for the threat event using the predefined threat category identified by the natural language processing engine.

In some embodiments, determining whether the description for the threat event corresponds to one of the predefined threat categories includes determining whether a stored data identifies a direct mapping of at least a portion of the description to one of the predefined threat categories.

In some embodiments, the threat events are received from a multiple data sources having multiple different data formats.

In some embodiments, the instructions cause the one or more processors to generate a classifier for the natural language processing engine using historical threat data including a multiple historical threat events each having a description. In some embodiments, the instructions cause the one or more processors to process the description using the classifier of the natural language processing engine.

In some embodiments, the instructions cause the one or more processors to pre-process the historical threat data, pre-processing the historical threat data including at least one of filtering historical threat events from the set having a description longer than a first threshold length or filtering historical threat events from the set having a description shorter than a second threshold length.

In some embodiments, the instructions cause the one or more processors to generate vector representations from the historical threat data subsequent to applying the labels.

In some embodiments, the instructions cause the one or more processors to separate the historical threat data into a training data set and a test data set. In some embodiments, the instructions cause the one or more processors to train the classifier using the training data set and to test an accuracy of the classifier using the test data set.

In some embodiments, the instructions cause the one or more processors to apply labels to the pre-processed historical threat data from among a set of predetermined labels, the set of predetermined labels associated with the predefined threat categories.

In some embodiments, the instructions cause the one or more processors to apply the labels based on input from one or more users, the one or more processors configured to generate a user interface via which the input is received, where, for each historical threat event, the instructions cause the one or more processors to generate a suggested subset of the set of predetermined labels from which the one or more users can select the label to be applies to the historical threat event. In some embodiments, the instructions cause the one or more processors to generate the suggested subset of predetermined labels by performing a similarity analysis between the description of the historical threat event and the labels of the set of predetermined labels and including one or more predetermined labels from the set of predetermined labels having a highest similarity with the description of the historical threat event in the suggested subset.

In some embodiments, performing the similarity analysis includes performing a vector space similarity comparison between the description of the historical threat event and the set of predetermined labels and generating a similarity score for each predetermined label of the set of predetermined labels. In some embodiments, the instructions cause the one or more processors to select a one or more of the predetermined labels having the highest similarity scores for inclusion in the suggested subset.

Another implementation of the present disclosure is a method for a risk analysis. The method includes receiving threat events from one or more data sources indicating a potential threat to at least one of buildings, building equipment, people, or spaces within a building, each threat event including a description. For each threat event, the method includes determining whether the description for the threat event corresponds to one of multiple predefined threat categories, in response to determining the description corresponds to one of the predefined threat categories, generating a standardized threat object for the threat event using the corresponding predefined threat category, and in response to determining the description does not correspond to one of the predefined threat categories processing the description using a natural language processing engine to identify one of the predefined threat categories to be assigned to the threat event and generating a standardized threat object for the threat event using the predefined threat category identified by the natural language processing engine.

In some embodiments, determining whether the description for the threat event corresponds to one of the predefined threat categories includes determining whether a stored data identifies a direct mapping of at least a portion of the description to one of the predefined threat categories.

In some embodiments, the threat events are received from multiple data sources having multiple different data formats.

In some embodiments, the method includes generating a classifier for the natural language processing engine using historical threat data including multiple historical threat events each having a description. In some embodiments, processing the description includes using the classifier of the natural language processing engine.

In some embodiments, the method includes pre-processing the historical threat data, wherein pre-processing the historical threat data includes filtering historical threat events from the set having a description longer than a first threshold length or filtering historical threat events from the set having a description shorter than a second threshold length.

In some embodiments, the method further includes generating vector representations from the historical threat data subsequent to applying the labels.

In some embodiments, the method further includes separating the historical threat data into a training data set and a test data set. In some embodiments, the method further includes training the classifier using the training data set and to test an accuracy of the classifier using the test data set.

In some embodiments, the method further includes applying labels to the pre-processed historical threat data from among a set of predetermined labels, the set of predetermined labels associated with the predefined threat categories.

In some embodiments, applying the labels is based on input from one or more users, wherein the method further includes generating a user interface via which the input is received, wherein, for each historical threat event, the method further includes generating a suggested subset of the set of predetermined labels from which the one or more users can select the label to be applies to the historical threat event, wherein generating the suggested subset of predetermined labels includes performing a similarity analysis between the description of the historical threat event and the labels of the set of predetermined labels and including one or more predetermined labels from the set of predetermined labels having a highest similarity with the description of the historical threat event in the suggested subset.

Another implementation of the present disclosure is a building risk analytics system including one or more computer-readable storage media communicably coupled to one or more processors and configured to store instructions. The system further includes the one or more processors configured to execute the instructions to receive threat events from one or more data sources indicating a potential threat to at least one of buildings, building equipment, people, or spaces within a building, each threat event including a description, wherein the threat events are received from multiple data sources having multiple different data formats. The one or more processors are configured to execute the instructions to, for each threat event, determine whether the description for the threat event corresponds to one of multiple predefined threat categories, in response to determining the description corresponds to one of the predefined threat categories, generate a standardized threat object for the threat event using the corresponding predefined threat category, and in response to determining the description does not correspond to one of the predefined threat categories process the description using a natural language processing engine to identify one of the predefined threat categories to be assigned to the threat event and generate a standardized threat object for the threat event using the predefined threat category identified by the natural language processing engine.

Expiry Time Prediction

Another implementation of the present disclosure is a building management system. The system includes one or more computer-readable storage media having instructions stored thereon that, when executed by one or more processors, cause the one or more processors to receive threat events indicating a potential threat to at least one of buildings, building equipment, people, or spaces within a building, each threat event including a threat category from among multiple threat categories. The instructions cause the one or more processors, for each threat event, to assign, using an expiry time prediction model, an expiry time to the threat event based at least in part on the threat category of the threat event, the expiry time prediction model trained using a set of historical threat events. Each historical threat event in the set of historical threat events includes at least one of the threat categories and at least one of an expiry time for the historical threat event or a start time and an end time usable by the one or more processors to determine the expiry time for the historical threat event. The instructions cause the one or more processors to classify the threat event as inactive upon expiration of the assigned expiry time.

In some embodiments, the instructions cause the one or more processors to process the received threat events into a set of standardized threat event objects each including a threat category from among the threat categories, wherein the instructions cause the one or more processors to apply the expiry times to the standardized threat event objects.

In some embodiments, the instructions cause the one or more processors to group a set of the threat events together by determining a correlation between the start times of the threat events, the threat categories of the threat events, and locations associated with the threat events.

In some embodiments, the instructions cause the one or more processors to generate a classifier for the expiry time prediction model using the set of historical threat events and assign the expiry time to each of the threat events using the classifier.

In some embodiments, the instructions cause the one or more processors to apply multiple labels to the historical threat events of the set of historical threat events, the labels applied to each historical threat event determined based on a histogram analysis of the expiry time of the historical threat event.

In some embodiments, the instructions cause the one or more processors to apply the labels by separating the historical threat events into multiple classes, each class of the classes defined by a range of expiry times.

In some embodiments, the instructions cause the one or more processors to train the classifier using the labeled historical threat events.

Another implementation of the present disclosure is a method for risk analysis. The method includes receiving threat events indicating a potential threat to at least one of buildings, building equipment, people, or spaces within a building, each threat event including a threat category from among multiple threat categories. The method includes for each threat event assigning, using an expiry time prediction model, an expiry time to the threat event based at least in part on the threat category of the threat event, the expiry time prediction model trained using a set of historical threat events. Each historical threat event in the set of historical threat events includes at least one of the threat categories and at least one of an expiry time for the historical threat event or a start time and an end time usable to determine the expiry time for the historical threat event. The method includes classifying the threat event as inactive upon expiration of the assigned expiry time.

In some embodiments, the method further includes processing the received threat events into a set of standardized threat event objects each including a threat category from among the threat categories. In some embodiments, the method further includes causing the one or more processors to apply the expiry times to the standardized threat event objects.

In some embodiments, the method further includes grouping a set of the threat events together by determining a correlation between the start times of the threat events, the threat categories of the threat events, and locations associated with the threat events.

In some embodiments, the method further includes generating a classifier for the expiry time prediction model using the set of historical threat events and assign the expiry time to each of the threat events using the classifier.

In some embodiments, the method further includes applying multiple labels to the historical threat events of the set of historical threat events, the labels applied to each historical threat event determined based on the expiry time of the historical threat event.

In some embodiments, the method includes applying the labels includes separating the historical threat events into multiple classes, each class of the classes defined by a range of expiry times.

In some embodiments, the method further includes training the classifier using the labeled historical threat events.

Another implementation of the present disclosure is a building risk analytics system including one or more computer-readable storage media communicably coupled to one or more processors and configured to store instructions. The system includes the one or more processors configured to execute the instructions to receive threat events indicating a potential threat to at least one of buildings, building equipment, people, or spaces within a building, each threat event including a threat category from among multiple threat categories. The one or more processors are configured to execute the instructions to, for each threat event, assign, using an expiry time prediction model, an expiry time to the threat event based at least in part on the threat category of the threat event, the expiry time prediction model trained using a set of historical threat events. Each historical threat event in the set of historical threat events includes at least one of the threat categories and at least one of an expiry time for the historical threat event or a start time and an end time usable by the one or more processor configured to determine the expiry time for the historical threat event. The one or more processors are configured to execute the instructions to classify the threat event as inactive upon expiration of the assigned expiry time.

In some embodiments, the one or more processors are configured to execute the instructions to process the received threat events into a set of standardized threat event objects each including a threat category from among the threat categories, the one or more processors configured to apply the expiry times to the standardized threat event objects.

In some embodiments, the one or more processors are configured to execute the instructions to group a set of the threat events together by determining a correlation between the start times of the threat events, the threat categories of the threat events, and locations associated with the threat events.

In some embodiments, the one or more processors are configured to execute the instructions to generate a classifier for the expiry time prediction model using the set of historical threat events and assign the expiry time to each of the threat events using the classifier.

In some embodiments, the one or more processors are configured to execute the instructions to apply multiple labels to the historical threat events of the set of historical threat events, the labels applied to each historical threat event determined based on the expiry time of the historical threat event.

In some embodiments, the one or more processors are configured to execute the instructions to apply the labels by separating the historical threat events into multiple classes, each class of the classes defined by a range of expiry times. In some embodiments, the one or more processors are configured to execute the instructions to train the classifier using the labeled historical threat events.

Geofencing

Another implementation of the present disclosure is a building management system including one or more computer-readable storage media having instructions stored thereon that, when executed by one or more processors, cause the one or more processors to receive multiple threat events indicating a potential threat to at least one of buildings, building equipment, people, or spaces within a building, the received threat events including a first threat event associated with a first geolocation and a first threat category and a second threat event associated with a second geolocation and a second threat category. The instructions cause the one or more processors to determine, for an asset, a first geofence defining a first area around the asset for the first threat category, determine, for the asset, a second geofence defining a second area around the asset for the second threat category, the second area different than the first area, determine whether the first geolocation falls within the first geofence, determine whether the second geolocation falls within the second geofence, in response to determining the first geolocation falls within the first geofence, identify the first threat event as an active threat for the asset, and in response to determining the second geolocation falls within the second geofence, identify the second threat event as an active threat for the asset.

In some embodiments, the instructions cause the one or more processors to in response to determining the first geolocation falls outside of the first geofence, determine the first threat event is not an active threat for the asset and in response to determining the second geolocation falls outside of the second geofence, determine the second threat event is not an active threat for the asset.

In some embodiments, the first geofence and the second geofence are each defined as one of an area centered around the asset and having a predefined radius associated with the threat category or a predefined geographic area including a geolocation of the asset.

In some embodiments the asset includes a first asset the instructions cause the one or more processors to determine whether the first geolocation falls within a third geofence for the second asset, the third geofence defining a third area around the second asset for the first threat category and in response to determining the first geolocation falls within the third geofence, identify the first threat event as an active threat for the second asset.

In some embodiments, the instructions cause the one or more processors to generate a first threat event data item for the first threat event and the first asset and a second threat event data item for the first threat event and the second asset.

In some embodiments, the first threat event is associated with a first threat geofence. In some embodiments, the instructions cause the one or more processors to determine whether at least some of the first threat geofence overlaps with the first geofence. In some embodiments, the instructions cause the one or more processors to, in response to determining that at least some of the first threat geofence overlaps with the first geofence, identify the first threat event as an active threat for the asset.

In some embodiments, the instructions cause the one or more processors to determine whether at least some of the first threat geofence overlaps with the first geofence by determining whether an intersection area of the first threat geofence and the first geofence is greater than a predefined amount.

Another implementation of the present disclosure is a method for risk analysis. The method includes receiving multiple threat events indicating a potential threat to at least one of buildings, building equipment, people, or spaces within a building, the received threat events including a first threat event associated with a first geolocation and a first threat category and a second threat event associated with a second geolocation and a second threat category. The method further includes determining, for an asset, a first geofence defining a first area around the asset for the first threat category, determining, for the asset, a second geofence defining a second area around the asset for the second threat category, the second area different than the first area, determining whether the first geolocation falls within the first geofence, determining whether the second geolocation falls within the second geofence, in response to determining the first geolocation falls within the first geofence, identifying the first threat event as an active threat for the asset, and in response to determining the second geolocation falls within the second geofence, identifying the second threat event as an active threat for the asset.

In some embodiments, the method includes in response to determining the first geolocation falls outside of the first geofence, determining the first threat event is not an active threat for the asset and in response to determining the second geolocation falls outside of the second geofence, determining the second threat event is not an active threat for the asset.

In some embodiments, the first geofence and the second geofence are each defined as one of an area centered around the asset and having a predefined radius associated with the threat category or a predefined geographic area including a geolocation of the asset.

In some embodiments, the asset includes a first asset. In some embodiments, the method further includes determining whether the first geolocation falls within a third geofence for the second asset, the third geofence defining a third area around the second asset for the first threat category and in response to determining the first geolocation falls within the third geofence, identifying the first threat event as an active threat for the second asset.

In some embodiments, the method includes generating a first threat event data item for the first threat event and the first asset and a second threat event data item for the first threat event and the second asset.

In some embodiments, the first threat event is associated with a first threat geofence. In some embodiments, the method further includes determining whether at least some of the first threat geofence overlaps with the first geofence. In some embodiments, the method includes, in response to determining that at least some of the first threat geofence overlaps with the first geofence, identifying the first threat event as an active threat for the asset.

In some embodiments, determining whether at least some of the first threat geofence overlaps with the first geofence includes determining whether an intersection area of the first threat geofence and the first geofence is greater than a predefined amount.

Another implementation of the present disclosure is a risk analysis system including one or more computer-readable storage media having instructions stored thereon and one or more processors configured to execute the instructions to receive multiple threat events indicating a potential threat to at least one of buildings, building equipment, people, or spaces within a building, the received threat events including a first threat event associated with a first geolocation and a first threat category and a second threat event associated with a second geolocation and a second threat category. The instructions cause the one more processors to determine, for an asset, a first geofence defining a first area around the asset for the first threat category, determine, for the asset, a second geofence defining a second area around the asset for the second threat category, the second area different than the first area, determine whether the first geolocation falls within the first geofence, determine whether the second geolocation falls within the second geofence, in response to determining the first geolocation falls within the first geofence, identify the first threat event as an active threat for the asset, and in response to determining the second geolocation falls within the second geofence, identify the second threat event as an active threat for the asset.

In some embodiments, the one or more processors are configured to execute the instructions to in response to determining the first geolocation falls outside of the first geofence, determine the first threat event is not an active threat for the asset and in response to determining the second geolocation falls outside of the second geofence, determine the second threat event is not an active threat for the asset.

In some embodiments, the first geofence and the second geofence are each defined as one of an area centered around the asset and having a predefined radius associated with the threat category or a predefined geographic area including a geolocation of the asset.

In some embodiments, the first threat event is associated with a first threat geofence. In some embodiments, the one or more processors are configured to execute the instructions to determine whether at least some of the first threat geofence overlaps with the first geofence. In some embodiments, the one or more processors are configured to execute the instructions to, in response to determining that at least some of the first threat geofence overlaps with the first geofence, identify the first threat event as an active threat for the asset.

In some embodiments, the asset includes a first asset and the one or more processors are configured to execute the instructions to determine whether the first geolocation falls within a third geofence for the second asset, the third geofence defining a third area around the second asset for the first threat category and in response to determining the first geolocation falls within the third geofence, identify the first threat event as an active threat for the second asset.

In some embodiments, the one or more processors are configured to execute the instructions to generate a first threat event data item for the first threat event and the first asset and a second threat event data item for the first threat event and the second asset.

Dynamic Modification of Asset Threat Weights

Another implementation of the present disclosure building management system including one or more computer-readable storage media having a data structure, wherein the data structure includes multiple vulnerabilities and multiple pairs, each of the pairs including one of multiple assets and one of the threat types, wherein each of the pairs is associated with one of the vulnerabilities and instructions stored thereon. The instructions, when executed by one or more processors, cause the one or more processors to receive a threat, the threat including a particular threat type of the threat types, the threat indicating an incident affecting a risk value associated with a particular asset of the assets, identify a particular vulnerability of the data structure based on the particular threat type and the particular asset, and determine, based on the particular vulnerability and the threat, the risk value associated with the particular asset.

In some embodiments, each of the vulnerabilities include a binary indication of whether the assets are affected by the threat types.

In some embodiments, each of the vulnerabilities is a numeric value indicating an amount that the assets are affected by each of the threat types.

In some embodiments, the data structure is a matrix including a first dimension and a second dimension. In some embodiments, the assets are associated with the first dimension and the threat types are associated with the second dimension.

In some embodiments, the instructions cause the one or more processors to provide a data structure retrieve endpoint, wherein the data structure retrieve endpoint is configured to provide the data structure to a requesting device and provide a data structure update endpoint. In some embodiments, the data structure update endpoint is configured to update the vulnerabilities of the data structure based on updates received from the requesting device.

In some embodiments, the instructions cause the one or more processors to receive, via a user interface, an update to a vulnerability associated with the particular asset and the particular threat type and update the data structure with the received update to the vulnerability.

In some embodiments, the instructions cause the one or more processors to generate, for the particular asset, a list of threat types that the particular asset is vulnerable based on the data structure, wherein the list of threat types are threat types that affect the risk score of the particular asset, cause the user interface to display the list, receive, via the user interface, an update to the list, the update including an indication to add one or more new threat types, wherein the data structure does not indicate that the risk score of the particular asset is affected by the one or more new threat types, and update the vulnerabilities of the data structure based on the received update by adding or removing vulnerabilities based on the indication to add the one or more new threat types or remove the one or more threat types of the list.

In some embodiments, the instructions cause the one or more processors to generate a list indicating identifiers of each of the assets, cause the user interface to display the list indicating the identifiers of each of the assets, receive a selection of the particular asset from the list indicating the identifiers of each of the assets, and update the vulnerabilities of the data structure in response to receiving the selection of the particular asset.

In some embodiments, the instructions cause the one or more processors to receive an indication of a set of assets of the assets, the set of assets associated with a particular asset category, generate, for the set of assets, a list of threat types that the set of assets is vulnerable to based on the data structure, wherein the list of threat types are threat types that affect risk scores of the set of assets, cause the user interface to display the list, receive, via the user interface, an update to the list, the update including an indication to add one or more new threat types, wherein the data structure does not indicate that the risk scores of the set of assets are affected by the one or more new threat types, and update the vulnerabilities of the data structure based on the received update by adding or removing vulnerabilities based on the indication to add the one or more new threat types or remove the one or more threat types of the list.

In some embodiments, the instructions cause the one or more processors to generate a list indicating asset categories, cause the user interface to display the list indicating the asset categories, receive a selection of the particular asset category from the list indicating the asset categories, and update the vulnerabilities of the data structure in response to receiving the selection of the particular asset category.

Another implementation of the present disclosure is a method for risk analysis. The method includes receiving a threat, the threat including a particular threat type of threat types, the threat indicating an incident affecting a risk value associated with a particular asset of a multiple assets. The method includes identifying a particular vulnerability of a data structure based on the particular threat type and the particular asset, wherein the data structure includes the vulnerabilities and multiple pairs, each of the pairs including one of the assets and one of the threat types, wherein each of the pairs is associated with one of the vulnerabilities and determining, based on the particular vulnerability and the threat, the risk value associated with the particular asset.

In some embodiments, each of the vulnerabilities include a binary indication of whether the assets are affected by the threat types.

In some embodiments, each of the vulnerabilities is a numeric value indicating an amount that the assets are affected by each of the threat types.

In some embodiments, the data structure is a matrix including a first dimension and a second dimension. In some embodiments, the assets are associated with the first dimension and the threat types are associated with the second dimension.

In some embodiments, the method further includes providing a data structure retrieve endpoint, wherein the data structure retrieve endpoint is configured to provide the data structure to a requesting device and providing a data structure update endpoint, wherein the data structure update endpoint is configured to update the vulnerabilities of the data structure based on updates received from the requesting device.

In some embodiments, the method further includes receiving, via a user interface, an update to a vulnerability associated with the particular asset and the particular threat type and updating the data structure with the received update to the vulnerability.

In some embodiments, the method further includes generating, for the particular asset, a list of threat types that the particular asset is vulnerable based on the data structure, wherein the list of threat types are threat types that affect the risk score of the particular asset, causing the user interface to display the list, receiving, via the user interface, an update to the list, the update including an indication to add one or more new threat types, wherein the data structure does not indicate that the risk score of the particular asset is affected by the one or more new threat types, and updating the vulnerabilities of the data structure based on the received update by adding or removing vulnerabilities based on the indication to add the one or more new threat types or remove the one or more threat types of the list.

In some embodiments, the method further includes generating a list indicating identifiers of each of the assets, causing the user interface to display the list indicating the identifiers of each of the assets, receiving a selection of the particular asset from the list indicating the identifiers of each of the assets, and updating the vulnerabilities of the data structure in response to receiving the selection of the particular asset.

In some embodiments, the method further includes receiving an indication of a set of assets of the assets, the set of assets associated with a particular asset category, generating, for the set of assets, a list of threat types that the set of assets is vulnerable to based on the data structure, wherein the list of threat types are threat types that affect risk scores of the set of assets, causing the user interface to display the list, receiving, via the user interface, an update to the list, the update including an indication to add one or more new threat types, wherein the data structure does not indicate that the risk scores of the set of assets are affected by the one or more new threat types, and updating the vulnerabilities of the data structure based on the received update by adding or removing vulnerabilities based on the indication to add the one or more new threat types or remove the one or more threat types of the list.

Another implementation of the present disclosure is a building management system. The system includes one or more computer-readable storage media communicably coupled to one or more processors and configured to store instructions and a data structure, wherein the data structure includes multiple vulnerabilities and multiple pairs, each of the pairs including one of multiple assets and one of the threat types, wherein each of the pairs is associated with one of the vulnerabilities. The system includes the one or more processors configured to execute the instructions to receive a threat, the threat including a particular threat type of the threat types, the threat indicating an incident affecting a risk value associated with a particular asset of the assets, identify a particular vulnerability of the data structure based on the particular threat type and the particular asset, and determine, based on the particular vulnerability and the threat, the risk value associated with the particular asset.

Combined Risk from Multiple Threats

Another implementation of the present disclosure is building management system. The building management system includes one or more computer-readable storage media having instructions stored thereon that, when executed by one or more processors, cause the one or more processors to receive multiple threats, the threats including a first threat and a second threat, the first threat and the second threat affecting a risk score of an asset. The instructions cause the one or more processors to determine whether the first threat is correlated with the second threat, determine a value of the risk score to be a first value in response to a determination that the first threat is correlated with the second threat, and determine the value of the risk score to be a second value in response to a determination that the first threat is not correlated with the second threat.

In some embodiments, the second threat is a second weather threat presenting a threat that increases as a result of a presence of the first threat.

In some embodiments, the second threat is a non-weather threat presenting a threat that increases as a result of a presence of the first threat. In some embodiments, the first threat event is a weather threat event.

In some embodiments, the instructions cause the one or more processors to determine the first value by determining a first risk score for the first threat based on a risk model, determining a second risk score for the second threat based on the risk model, and generating the risk score based on the first risk score and the second risk score.

In some embodiments, the instructions cause the one or more processors to determine the first value by updating a parameter value of a threat severity parameter for the first threat based on the correlation of the first threat and the second threat, generating the risk score for the first threat based on the risk model and the updated parameter value, generating a second risk score for the second threat based on the risk model, and selecting one of the first risk score and the second risk score by comparing a value of the first risk score to the second risk score, wherein the selected risk score includes a value representing a greatest level of risk.

In some embodiments, the instructions cause the one or more processors to generate a first risk score based on the first threat, generate a second risk score based on the second threat, and determine the first value by determining a p-norm with the first risk score and the second risk score.

In some embodiments, the p-norm is at least one of a 2-norm or an infinity-norm.

In some embodiments, the instructions cause the one or more processors to receive a first set of weather threat data for weather associated with the asset, store the first set of weather threat data in the one or more computer-readable media, generate, based on the first set of weather threat data stored in the computer-readable media, normal weather condition rules, wherein the normal weather rules indicate an expected weather condition, receive a first weather threat, determine, based on the normal weather condition rules, whether first weather threat indicates the expected weather condition, and generate the risk score based on the first weather threat event, wherein generating the risk score includes generating a first weather value for the risk score in response to the determination that the first weather threat indicates the expected weather condition and generating a second weather value for the risk score in response to the determination that the first weather threat indicates that the weather condition is not the expected weather condition, wherein the second weather value indicates a greater level of risk than the first weather value.

In some embodiments, the normal weather condition rules include an upper condition threshold. In some embodiments, the instructions cause the one or more processors to determine whether an environmental condition of the first weather threat is greater than the upper condition threshold, generate the risk score to be the second weather value in response to determining that the environmental condition of the first weather threat event is greater than the upper condition threshold, and generate the risk score to be the first weather value in response to determining that the environmental condition of the first weather threat is not greater than the upper condition threshold.

In some embodiments, the normal weather condition rules include a lower condition threshold. In some embodiments, the instructions cause the one or more processors to determine whether an environmental condition of the first weather threat is less than the lower condition threshold, generate the risk score to be the second weather value in response to determining that the environmental condition of the first weather threat is less than the lower condition threshold, and generate the risk score to be the first weather value in response to determining that the environmental condition of the first weather threat is not less than the lower condition threshold.

In some embodiments, the normal weather condition rules include an upper risk score threshold. In some embodiments, the instructions cause the one or more processors to generate the risk score by generating a third weather value for the first weather threat based on a risk model, determining whether the third weather value is greater than the upper risk threshold, generating the risk score to be the second weather risk score value in response to determining that the third weather risk score is greater than the upper risk threshold, wherein the second weather value is greater than the first weather value and the third weather value, and generating the risk score to be the first weather risk score value in response to determining that the third risk score is not greater than the upper risk threshold.

In some embodiments, the instructions cause the one or more processors to execute the instructions to generate the risk score for the asset by generating the risk score to be the second weather value in response to determining that the third weather value is greater than the upper risk threshold by multiplying the third weather risk score with a multiplier, wherein the multiplier is greater than one.

In some embodiments, the value of the multiplier is based on a frequency at which a type of the first weather threat occurs. In some embodiments, wherein the instructions cause the one or more processors to determine a frequency at which the type of the first weather threat occurs based on the first set of weather threat data stored in the one or more computer-readable media and generate a value for the multiplier based on the determined frequency at which the type of the first weather threat occurs.

Another implementation of the present disclosure is a method for risk analysis. The method includes receiving multiple threats, the threats including a first threat and a second threat, the first threat and the second threat affecting a risk score of an asset and determining whether the first threat is correlated with the second threat. The method includes determining a value of the risk score to be a first value in response to a determination that the first threat is correlated with the second threat and determining the value of the risk score to be a second value in response to a determination that the first threat is not correlated with the second threat.

In some embodiments, the second threat is a second weather threat presenting a threat that increases as a result of a presence of the first threat.

In some embodiments, the method further includes determining an asset-threat risk score for the first threat and the asset based on a vulnerability parameter associated with the asset, an asset cost parameter associated with the asset, a severity associated with the first threat, and a geographic distance between the asset and the first threat.

In some embodiments, the second threat is a non-weather threat presenting a threat that increases as a result of a presence of the first threat. In some embodiments, the first threat event is a weather threat event.

In some embodiments, determining the first value includes determining a first risk score for the first threat based on a risk model, determining a second risk score for the second threat based on the risk model, and generating the risk score based on the first risk score and the second risk score.

In some embodiments, determining the first value includes updating a parameter value of a threat severity parameter for the first threat based on the correlation of the first threat and the second threat, generating the risk score for the first threat based on the risk model and the updated parameter value, generating a second risk score for the second threat based on the risk model, and selecting one of the first risk score and the second risk score by comparing a value of the first risk score to the second risk score, wherein the selected risk score includes a value representing a greatest level of risk.

In some embodiments, the method includes generating a first risk score based on the first threat, generating a second risk score based on the second threat, and determining the first value by determining a p-norm with the first risk score and the second risk score.

Another implementation of the present disclosure is a building management system. The system includes one or more computer-readable storage media communicably coupled to one or more processors and configured to store instructions. The system includes the one or more processors configured to execute the instructions to receive multiple threats, the threats including a first threat and a second threat, the first threat and the second threat affecting a risk score of an asset, determine whether the first threat is correlated with the second threat, determine a value of the risk score to be a first value in response to a determination that the first threat is correlated with the second threat, and determine the value of the risk score to be a second value in response to a determination that the first threat is not correlated with the second threat.

Dynamic Risk, Baseline Risk, and Monitoring Client

Another implementation of the present disclosure is a building management system. The system includes one or more computer-readable storage media having instructions stored thereon that, when executed by one or more processors, cause the one or more processors to receive multiple threats, the threats each indicating an incident affecting a dynamic risk score associated with an asset, wherein one or more of the threats are current threats that are active at a current point in time and one or more of the threats are historic threats that were active at one or more past times. The instructions cause the one or more processors to generate, based on the one or more current threats, the dynamic risk score at the current point in time, generate, based on the one or more historic threats, a baseline risk score, and cause a user interface to display an indication of the dynamic risk score at the current point in time and an indication of the baseline risk score.

In some embodiments, the one or more historic threats are stored in the one or more computer-readable storage media. In some embodiments, the instructions cause the one or more processors to determine that a predefined amount of time has passed, retrieve the one or more historic threats from the one or more computer-readable storage media in response to a determination that the predefined amount of time has passed, and generate, based on the retrieved one or more historic threats, the baseline risk score.

In some embodiments, the instructions cause the one or more processors to execute the instructions to generate, based on the one or more historic threats, the baseline risk score by averaging a particular dynamic risk score associated with each of the historic threats.

In some embodiments, the instructions cause the one or more processors to cause the user interface to display the indication of the dynamic risk score at the current point in time and the indication of the baseline risk score by generating an asset risk card element, the asset risk card element including an indication of the asset, the indication of the dynamic risk score at the current point in time, and the indication of the baseline risk score and causing the user interface to display the asset risk card element.

In some embodiments, each of the historic threats include one of a multiple threat types. In some embodiments, the one or more processors are configured to execute the instructions to determine a first category baseline for the asset based on one or more of the historic threats of the historic threats including a first threat type of the threat types, determine a second category baseline for the asset based on one or more of the historic threats of the historic threats including a second threat type of the threat types, and cause the user interface to display an indication of the first category baseline and the second category baseline.

In some embodiments, the instructions cause the one or more processors to record the baseline risk score over a period of time as new threats are received, record the dynamic risk score over the period of time as new threats are received, and generate a risk trend element, the risk trend element including a baseline risk trend and a dynamic risk trend, wherein the baseline risk trend is based on the baseline risk score recorded over the time period and the dynamic risk trend is based on the dynamic risk score recorded over the time period.

In some embodiments, the instructions cause the one or more processors to determine a total change in the dynamic risk score over the period of time based on a first dynamic risk score at a beginning of the period of time and a last dynamic risk score at an end of the period of time, determine whether the dynamic risk score is rising or falling over the period of time based on the first dynamic risk score at the beginning of the period of time and the last dynamic risk score at the end of the period of time, and cause the risk trend element to include an indication of the total change in the dynamic risk score and an indication of whether the dynamic risk score is rising or falling over the period of time.

In some embodiments, the instructions cause the one or more processors to receive a new threat for the asset, the new threat including an expiry time and affecting the dynamic risk score of the asset, determine, based on the expiry time, whether the new threat is active, determine a dynamic risk score for the new threat in response to a determination that the new threat is active, retrieve, from the one or more computer readable medium, one or more active threats associated with the asset, each of the one or more active threats being associated with a dynamic risk score, and determine the dynamic risk score for the asset based on the dynamic risk score for the new threat and the dynamic risks cores for the one or more active threats.

In some embodiments, the instructions cause the one or more processors to store the new threat in the one or more computer readable medium with a status, wherein the status is active and update the status of the new threat to closed in response to a determination that the expiry time has passed.

Another implementation of the present disclosure is a method for risk analysis. The method includes receiving threats, the threats each indicating an incident affecting a dynamic risk score associated with an asset, wherein one or more of the threats are current threats that are active at a current point in time and one or more of the threats are historic threats that were active at one or more past times. The method includes generating, based on the one or more current threats, the dynamic risk score at the current point in time, generating, based on the one or more historic threats, a baseline risk score, and causing a user interface to display an indication of the dynamic risk score at the current point in time and an indication of the baseline risk score.

In some embodiments, the method includes determining the dynamic risk score based on a vulnerability parameter associated with the asset, an asset cost parameter associated with the asset, a severity associated with the one or more current threats, and a geographic distance between the asset and the one or more current threats.

In some embodiments, the method includes generating a list including the one or more current threats, each of the one or more current threats associated with a particular dynamic risk score and sorting the list based on the particular dynamic risk scores of each of the one or more current threats.

In some embodiments, storing the one or more historic threats in one or more computer-readable storage media, determining that a predefined amount of time has passed, retrieving the one or more historic threats from the one or more computer-readable storage media in response to a determination that the predefined amount of time has passed, and generating, based on the retrieved one or more historic threats, the baseline risk score.

In some embodiments, determining, based on the particular vulnerability and the threat, the risk value associated with the particular asset is further based on a vulnerability parameter associated with the particular asset, an asset cost parameter associated with the particular asset, a severity associated with the threat, and a geographic distance between the particular asset and the threat.

In some embodiments, generating, based on the one or more historic threats, the baseline risk score includes averaging a particular dynamic risk score associated with each of the historic threats.

In some embodiments, causing the user interface to display the indication of the dynamic risk score at the current point in time and the indication of the baseline risk score includes generating an asset risk card element, the asset risk card element including an indication of the asset, the indication of the dynamic risk score at the current point in time, and the indication of the baseline risk score and causing the user interface to display the asset risk card element.

In some embodiments, each of the historic threats includes one of multiple threat types. In some embodiments, the method further includes determining a first category baseline for the asset based on one or more of the historic threats of the historic threats including a first threat type of the threat types, determining a second category baseline for the asset based on one or more of the historic threats of the historic threats including a second threat type of the threat types, and causing the user interface to display an indication of the first category baseline and the second category baseline.

In some embodiments, the method includes recording the baseline risk score over a period of time as new threats are received, recording the dynamic risk score over the period of time as new threats are received, and generating a risk trend element, the risk trend element including a baseline risk trend and a dynamic risk trend, wherein the baseline risk trend is based on the baseline risk score recorded over the time period and the dynamic risk trend is based on the dynamic risk score recorded over the time period.

In some embodiments, the method includes determining a total change in the dynamic risk score over the period of time based on a first dynamic risk score at a beginning of the period of time and a last dynamic risk score at an end of the period of time, determining whether the dynamic risk score is rising or falling over the period of time based on the first dynamic risk score at the beginning of the period of time and the last dynamic risk score at the end of the period of time, and causing the risk trend element to include an indication of the total change in the dynamic risk score and an indication of whether the dynamic risk score is rising or falling over the period of time.

In some embodiments, the method includes receiving a new threat for the asset, the new threat including an expiry time and affecting the dynamic risk score of the asset, determining, based on the expiry time, whether the new threat is active, determining a dynamic risk score for the new threat in response to a determination that the new threat is active, retrieving, from one or more computer readable medium, one or more active threats associated with the asset, each of the one or more active threats being associated with a dynamic risk score, and determining the dynamic risk score for the asset based on the dynamic risk score for the new threat and the dynamic risks cores for the one or more active threats.

In some embodiments, the method includes storing the new threat in the one or more computer readable medium with a status, wherein the status is active and updating the status of the new threat to closed in response to a determination that the expiry time has passed.

Another implementation of the present disclosure is a risk analysis system including one or more computer-readable storage media communicably coupled to one or more processors and configured to store instructions and the one or more processors configured to execute the instructions to receive multiple threats, the threats each indicating an incident affecting a dynamic risk score associated with an asset, wherein one or more of the threats are current threats that are active at a current point in time and one or more of the threats are historic threats that were active at one or more past times. The instructions cause the one or more processors to generate, based on the one or more current threats, the dynamic risk score at the current point in time, generate, based on the one or more historic threats, a baseline risk score, and cause a user interface to display an indication of the dynamic risk score at the current point in time and an indication of the baseline risk score.

In some embodiments, the one or more processors are configured to execute the instructions to cause the user interface to display the indication of the dynamic risk score at the current point in time and the indication of the baseline risk score by generating an asset risk card element, the asset risk card element including an indication of the asset, the indication of the dynamic risk score at the current point in time, and the indication of the baseline risk score and causing the user interface to display the asset risk card element.

In some embodiments, the dynamic risk score is on a scale from zero to one hundred.

Risk Decay

Another implementation of the present disclosure is a building management system one or more computer-readable storage media having instructions stored thereon that, when executed by one or more processors, cause the one or more processors to receive a threat, the threat including a particular threat type, the threat indicating an incident affecting a risk value associated with an asset. The instructions cause the one or more processors to determine, based on the threat and the asset, the risk value at a first point in time, select a decay model based on the particular threat type, and update the risk value at multiple points in time after the first point in time with the decay model causing the risk value to decay.

In some embodiments, the instructions cause the one or more processors to generate a list including multiple threats and the threat, each of the threats associated with a particular asset and the threat associated with the asset, sort the list based on the risk value and multiple other risk values to list the threats in order of highest risk score to lowest risk score, each of the other risk values associated with one of the threats and associated with one of the assets, and update the sorted list as the risk value decays to list the threats in order of the highest risk score to the lowest risk score.

In some embodiments, the instructions cause the one or more processors to execute the instructions to select the decay model based on the particular threat type and further based on the asset.

In some embodiments, the instructions cause the one or more processors to select the decay model based on the particular threat type by selecting the decay model from at least one of a polynomial decay model, an exponential decay model, or a linear decay mode.

In some embodiments, the instructions cause the one or more processors to publish the risk score at each of the points in time to a risk score topic, read the risk score topic to retrieve the risk score at each of the points in time, and cause a user interface to display an indication of the risk score at each of the points in time based on the read of the risk score topic.

In some embodiments, the instructions cause the one or more processors to receive a multiple threats, each of the threats including a particular threat type, each of the threats indicating an incident affecting a risk value associated with an asset, determine, based on the threats and the asset, multiple risk values at a first point in time, each risk value associated with the asset and one of the threats, select a decay model for each of the threats based on the threat type of each of the threats, update each of the risk values at multiple points in time after the first point in time with the decay models selected for each of the threats, and determine the risk value at each of the points in time associated with the asset by selecting a highest risk value from the risk values at each of the points in time.

In some embodiments, the instructions cause the one or more processors to determine, based on the type of the particular threat, an expiration time, wherein the expiration time indicates the length of time that the threat will affect the risk value associated with the asset. In some embodiments, the instructions cause the one or more processors to update the risk value at the points in time after the first point in time with the decay model and the expiration time causing the risk value to decay to a particular value at an end of the expiration time.

In some embodiments, the instructions cause the one or more processors to update the risk value at the points in time after the first point in time with the decay model and the expiration time by determining, at a second point in time of the points in time after the first point in time, a decay factor based on the expiration time and the decay model and determining the risk value at the second point in time by multiplying the risk value at the first point in time by the decay factor.

In some embodiments, the instructions cause the one or more processors to store the threat, the expiration time, and the decay model in the one or more computer-readable storage media and at each of the points in time retrieve the threat, the expiration time, and the decay model from the one or more computer-readable storage media, determine, whether the threat has expired by determining whether the expiration time has passed, determine the decay factor based on the expiration time and the decay model in response to a determination that the threat has not expired, and determine the risk value by multiplying the risk value at a previous point in time with the decay model to determine the risk value at a current point in time.

In some embodiments, the instructions cause the one or more processors to store a threat status for the threat in the one or more computer-readable storage media, wherein the stored threat status is an active threat status indicating that the expiration time has not passed, retrieve, at each of the points in time, the threat status, and update the threat status stored in the one or more computer-readable storage media to closed in response to a determination that the expiration time has passed.

Another implementation of the present disclosure is a method for risk analysis. The method includes receiving a threat, the threat including a particular threat type, the threat indicating an incident affecting a risk value associated with an asset and determining, based on the threat and the asset, the risk value at a first point in time. The method includes selecting a decay model based on the particular threat type and updating the risk value at multiple points in time after the first point in time with the decay model causing the risk value to decay.

In some embodiments, determining, based on the threat and the asset, the risk value at a first point in time is based on a vulnerability parameter associated with the asset, an asset cost parameter associated with the asset, a severity associated with the threat, and a geographic distance between the asset and the threat.

In some embodiments, the method includes generating a list including multiple threats and the threat, each of the threats associated with a particular asset and the threat associated with the asset, sorting the list based on the risk value and multiple other risk values to list the threats in order of highest risk score to lowest risk score, each of the other risk values associated with one of the threats and associated with one of the assets, and updating the sorted list as the risk value decays to list the threats in order of the highest risk score to the lowest risk score.

In some embodiments, the method includes selecting select the decay model based on the particular threat type and further based on the asset.

In some embodiments, the method includes selecting the decay model based on the particular threat type by selecting the decay model from at least one of a polynomial decay model, an exponential decay model, or a linear decay mode.

In some embodiments, the method includes publishing the risk score at each of the points in time to a risk score topic, reading the risk score topic to retrieve the risk score at each of the points in time, and causing a user interface to display an indication of the risk score at each of the points in time based on the read of the risk score topic.

In some embodiments, the method includes receiving multiple threats, each of the threats including a particular threat type, each of the threats indicating an incident affecting a risk value associated with an asset, determining, based on the threats and the asset, multiple risk values at a first point in time, each risk value associated with the asset and one of the threats, selecting a decay model for each of the threats based on the threat type of each of the threats, updating each of the risk values at multiple points in time after the first point in time with the decay models selected for each of the threats, and determining the risk value at each of the points in time associated with the asset by selecting a highest risk value from the risk values at each of the points in time.

In some embodiments, the method includes determining, based on the type of the particular threat, an expiration time, wherein the expiration time indicates the length of time that the threat will affect the risk value associated with the asset. In some embodiments, updating the risk value at the points in time after the first point in time includes updating the risk value with the decay model and the expiration time causing the risk value to decay to a particular value at an end of the expiration time.

In some embodiments, the method includes updating the risk value at the points in time after the first point in time with the decay model and the expiration time by determining, at a second point in time of the points in time after the first point in time, a decay factor based on the expiration time and the decay model and determining the risk value at the second point in time by multiplying the risk value at the first point in time by the decay factor.

In some embodiments, the method includes storing the threat, the expiration time, and the decay model in one or more computer-readable storage media and at each of the points in time retrieving the threat, the expiration time, and the decay model from the one or more computer-readable storage media, determining, whether the threat has expired by determining whether the expiration time has passed, determining the decay factor based on the expiration time and the decay model in response to a determination that the threat has not expired, and determining the risk value by multiplying the risk value at a previous point in time with the decay model to determine the risk value at a current point in time.

Another implementation of the present disclosure is a risk analytics system. The system includes one or more computer-readable storage media communicably coupled to one or more processors and configured to store instructions and the one or more processors configured to execute the instructions to receive a threat, the threat including a particular threat type, the threat indicating an incident affecting a risk value associated with an asset. The instructions cause the one or more processors to determine, based on the threat and the asset, the risk value at a first point in time, select a decay model based on the particular threat type, and update the risk value at multiple points in time after the first point in time with the decay model causing the risk value to decay.

Global Risk Dashboard

Another implementation of the present disclosure is a building management system including one or more computer-readable storage media having instructions stored thereon that, when executed by one or more processors, cause the one or more processors to receive multiple threat events indicating a potential threat to one or more of multiple assets, the assets including at least one of buildings, building equipment, people, or spaces within a building, the received threat events associated with multiple threat categories, the assets associated with multiple of locations. The instructions cause the one or more processors, for each of the assets, to determine one or more of the threat events affecting the asset and generate a risk score for the asset based on the threat events determined to affect the asset. The instructions cause the one or more processors to generate a location-specific aggregated risk score for two or more of the locations based on a combination of the risk scores for the assets associated with the locations, generate a category-specific risk metric indicating, for each of at least two or more of the threat categories, a number of threat events associated with the threat categories, generate user interface data including, within a single interface, visual representations of both the location-specific aggregated risk scores for the two or more locations and the category-specific risk metrics for the two or more threat categories, and cause the user interface data to be displayed on a device.

In some embodiments, the user interface data further includes, within the single interface, a total number of active alarms across the locations and the threat categories.

In some embodiments, the one or more processors are further configured to determine, for each of multiple timeframes, a timeframe-specific aggregated risk score based on a combination of the risk scores for the assets within the timeframe, the user interface data further including, within the single interface, a risk score time chart illustrating the timeframe-specific aggregated risk scores for at least two of the timeframes.

In some embodiments, the instructions cause the one or more processors to determine two or more of the assets using the risk scores of the assets, the user interface data further including a detailed asset interface including an identification of the two or more assets, the risk score for the assets, and an identification of one or more risk events affecting the assets.

In some embodiments, the user interface data includes a mapping portion showing the two or more locations, and wherein the visual representations of the location-specific aggregated risk scores are provided within the mapping portion.

In some embodiments, at least one of a size or a color of the visual representations of the location-specific aggregated risk scores is determined based on values of the location-specific aggregated risk scores.

In some embodiments, the instructions cause the one or more processors to determine two or more of the threat events associated with highest risk scores among the threat events and across the locations, the user interface data further including a detailed threat interface including the risk score, threat category, and a description for each of the two or more threat events.

In some embodiments, the detailed threat interface includes category filters configured to permit a user to select one or more threat categories, wherein the instructions cause the one or more processors to limit the threat events displayed within the detailed threat interface based on the selected threat categories.

In some embodiments, the detailed threat interface includes category filters configured to permit a user to select one or more threat categories, wherein the instructions cause the one or more processors to limit the threat events displayed within the detailed threat interface based on the selected threat categories. In some embodiments, the detailed threat interface includes severity filters configured to permit a user to select one or more severity ranges, wherein the instructions cause the one or more processors to limit the threat events displayed within the detailed threat interface based on the selected severity range. In some embodiments, the detailed threat interface including geographic region filters configured to permit a user to select one or more geographic regions, wherein the instructions cause the one or more processors to limit the threat events displayed within the detailed threat interface based on the selected geographic region. In some embodiments, the detailed threat interface includes forecasted threat values for an asset, wherein the instructions cause the one or more processors to generate the forecasted threat values based on historical threat values.

Another implementation of the present disclosure is a method for risk analysis. The method includes receiving multiple threat events indicating a potential threat to one or more of multiple assets, the assets including at least one of buildings, building equipment, people, or spaces within a building, the received threat events associated with multiple threat categories, the assets associated with multiple locations. The method includes, for each of the assets, determining one or more of the threat events affecting the asset and generating a risk score for the asset based on the threat events determined to affect the asset. The method includes generating a location-specific aggregated risk score for two or more of the locations based on a combination of the risk scores for the assets associated with the locations, generating a category-specific risk metric indicating, for each of at least two or more of the threat categories, a number of threat events associated with the threat categories, generating user interface data including, within a single interface, visual representations of both the location-specific aggregated risk scores for the two or more locations and the category-specific risk metrics for the two or more threat categories, and causing the user interface data to be displayed on a device.

In some embodiments, the user interface data further includes, within the single interface, a total number of active alarms across the locations and the threat categories.

In some embodiments, the method includes determining, for each of multiple timeframes, a timeframe-specific aggregated risk score based on a combination of the risk scores for the assets within the timeframe, the user interface data further including, within the single interface, a risk score time chart illustrating the timeframe-specific aggregated risk scores for at least two of the timeframes.

In some embodiments, the method includes determining two or more of the assets using the risk scores of the assets, the user interface data further including a detailed asset interface including an identification of the two or more assets, the risk score for the assets, and an identification of one or more risk events affecting the assets.

In some embodiments, the user interface data includes a mapping portion showing the two or more locations, and wherein the visual representations of the location-specific aggregated risk scores are provided within the mapping portion.

In some embodiments, at least one of a size or a color of the visual representations of the location-specific aggregated risk scores is determined based on values of the location-specific aggregated risk scores.

In some embodiments, the method further includes determining two or more of the threat events associated with highest risk scores among the threat events and across the locations, the user interface data further including a detailed threat interface including the risk score, threat category, and a description for each of the two or more threat events.

In some embodiments, the detailed threat interface including category filters configured to permit a user to select one or more threat categories. In some embodiments, the method further includes limiting the threat events displayed within the detailed threat interface based on the selected threat categories.

Another implementation of the present disclosure is a risk analysis system including one or more computer-readable storage media having instructions stored thereon and one or more processors configured to execute the instructions to receive multiple threat events indicating a potential threat to one or more of multiple assets, the assets including at least one of buildings, building equipment, people, or spaces within a building, the received threat events associated with multiple threat categories, the assets associated with multiple locations. The instructions cause the one or more processors, for each of the assets, to determine one or more of the threat events affecting the asset and generate a risk score for the asset based on the threat events determined to affect the asset. The instructions cause the one or more processors to generate a location-specific aggregated risk score for two or more of the locations based on a combination of the risk scores for the assets associated with the locations, generate a category-specific risk metric indicating, for each of at least two or more of the threat categories, a number of threat events associated with the threat categories, generate user interface data including, within a single interface, visual representations of both the location-specific aggregated risk scores for the two or more locations and the category-specific risk metrics for the two or more threat categories, and cause the user interface data to be displayed on a device.

In some embodiments, the user interface data further includes, within the single interface, a total number of active alarms across the locations and the threat categories.

In some embodiments, the user interface data includes a mapping portion showing the two or more locations, and wherein the visual representations of the location-specific aggregated risk scores are provided within the mapping portion.

In some embodiments, at least one of a size or a color of the visual representations of the location-specific aggregated risk scores is determined based on values of the location-specific aggregated risk scores.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 17 is a vulnerability-threat (VT) matrix illustrating vulnerability levels for particular assets based on different types of threats, according to an exemplary embodiment.

FIG. 19 is a schematic drawing of a user interface for modifying the VT matrix of FIG. 17, according to an exemplary embodiment.

FIG. 28 is a schematic drawing of a user interface including multiple threats dynamically sorted by risk score, according to an exemplary embodiment.

FIG. 29 is another schematic drawing of the user interface of FIG. 28 illustrating threats being dynamically sorted over other threats based on risk score, according to an exemplary embodiment.

DETAILED DESCRIPTION

Overview

Figure 1:
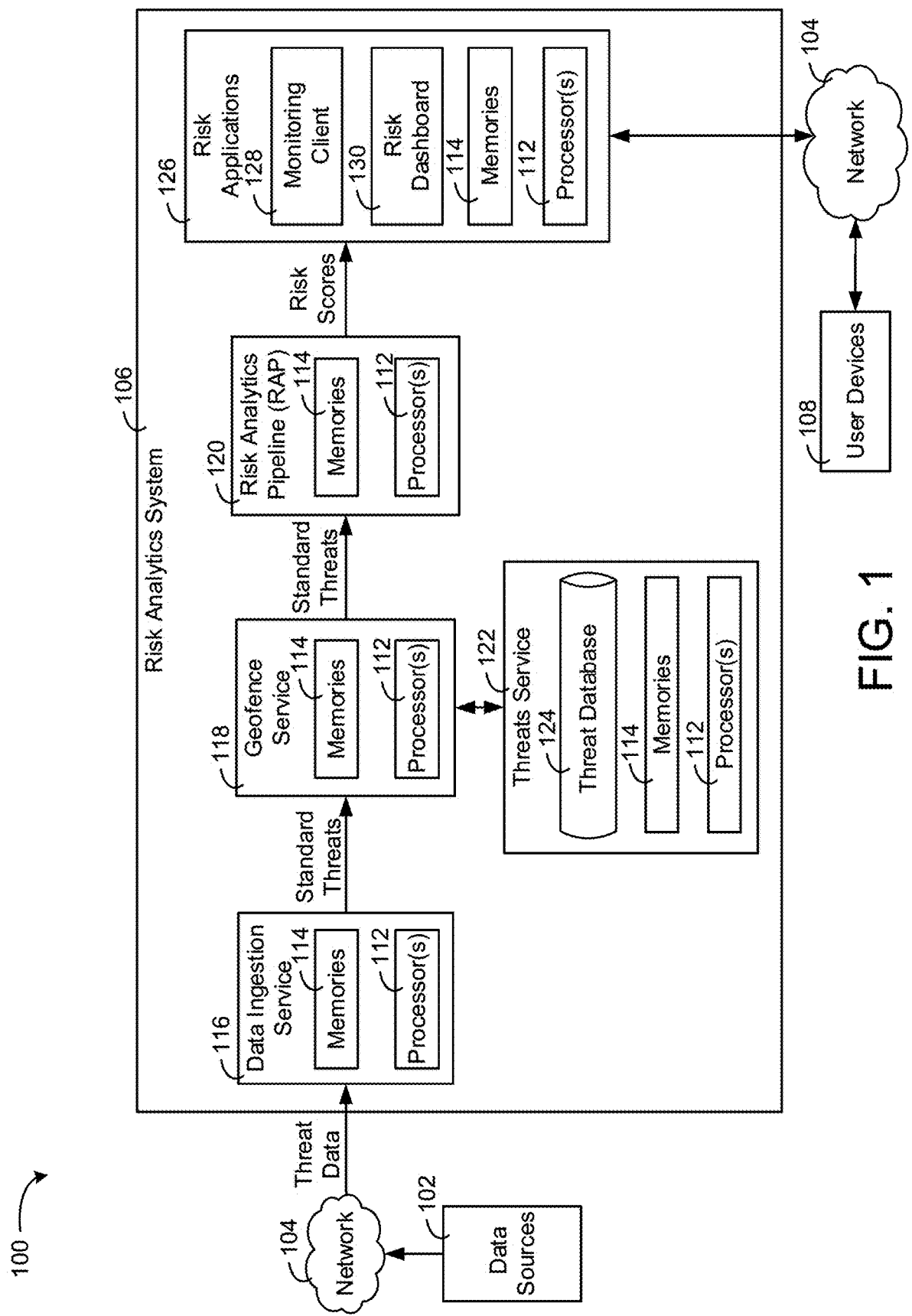
FIG. 1, a block diagram of a system including a risk analytics system for handling threats via a risk analysis system including a data ingestion service, a geofence service, and a risk analytics pipeline (RAP) is shown, according to an exemplary embodiment.

Referring generally to the FIGURES, systems and methods are shown for a risk analytics system for a building or multiple buildings, according to various exemplary embodiments. The risk analytics system can be configured for threat and risk analytics for security operations of the building. The analytics system provides a set of algorithms for scalable risk analytics pipeline including the threat data ingestion, enrichments, analytics, and machine learning models, risk modeling, reports, and presentation.

Many organizations need scalable and reliable security solutions to mitigate risk, monitor security operations and lower the chance of potential loss or damage on their assets. Asset can be anything that is valuable for that organization including campuses, buildings, personnel, equipment, and resources. Depending on the type of the asset, each asset might be vulnerable towards a set of threats. Understanding the relationship between an asset and the set of threats is a complex task that require an infrastructure that can gather all the relevant data from different sources, analyze the data in multiple processing steps and generate rich yet easy to understand information to security operators and site monitors so that these personal can take appropriate actions. The analytics systems and methods as described herein can generate risk information for use in prioritization of alarms, presenting users with contextual threat and/or asset information, reducing the response time to threats by raising the situational awareness, and automating response actions. In case of mobile assets, another block to the analytics system can be included to identify the location of the mobile asset since the location of the mobile asset will be dynamically changing while the rest of the pipeline of the analytics system may remain the same.

The analytics system as described herein can be configured to uses various components to provide scalability and reliable security solutions. The analytics system can be configured to ingest threat data from multiple disparate data sources. The threat data can be information indicating a particular threat incident, i.e., an event that may put the building or other asset at risk (e.g., a chance of personal injury, theft, asset damage, etc.). Based on the ingested threat data, the analytics system can identify which of a collection of stored assets are affected by the threat, e.g., by performing geofencing with geofences of the assets and reported locations of the threat data. Based on the indication of assets affecting threats, the analytics system can perform risk analytics via an analytics pipeline to perform operations such as risk calculation for the threat and asset, risk decay, and various other analytical operations.

Furthermore, based on the analyzed threat and asset data, the analytics system can present information to a user, e.g., a security officer, via user interface systems. The user interface system can facilitate alarm handling by providing contextual information together with risk scores for particular threats. Using the risk asset score for an alarm event, security personnel can filter and/or sort alarm events to show or highlight the highest risk alarms.

Referring now to FIG. 1, a system 100 is shown including a risk analytics system 106 configured to perform data ingestion with a data ingestion service 116, geofencing with a geofence service 118, risk analytics with a risk analytics pipeline (RAP) 120, and user interface operations with risk applications 126, according to an exemplary embodiment. The system 100 further includes third party data sources 102, network 104, and user devices 108. The risk analytics system 106 is shown to be communicably coupled to the data sources 102 and the user devices 108 via the network 104.

The network 104 can communicatively couple the devices and systems of system 100. In some embodiments, network 104 is at least one of and/or a combination of a Wi-Fi network, a wired Ethernet network, a ZigBee network, a Bluetooth network, and/or any other wireless network. Network 104 may be a local area network or a wide area network (e.g., the Internet, a building WAN, etc.) and may use a variety of communications protocols (e.g., BACnet, IP, LON, etc.). Network 104 may include routers, modems, servers, cell towers, satellites, and/or network switches. Network 104 may be a combination of wired and wireless networks.

Via the network 104, the risk analytics system 106 can be configured to ingest (receive, process, and/or standardize) data from data sources 102. The data sources 102 can be located locally within a building or outside a building and can report threats for multiple buildings, cities, states, countries, and/or continents. The data sources 102 can be local building systems, e.g., access control systems, camera security systems, occupancy sensing systems, and/or any other system located within a building. Furthermore, the data sources 102 can be government agency systems that report threats, e.g., a police report server providing the risk analytics system 106 with police reports.

The data sources can be analytics companies e.g., Dataminr, NC4, Lenel on Guard, and/or any other analytics system configured to collect and/or report threats. Dataminr is a service that monitors social media data and generates alarms on different topics. Dataminr can be configured to send alarms generated from twitter data to the risk analytics system 106. NC4 can be configured to generate incidents and/or advisory alerts and provide the incidents and/or alerts to the risk analytics system 106. NC4 can include local resources on different parts of the globe to collect data for generating the incidents and/or advisory alerts. Lenel is a system that manages the entrance, badge monitoring and etc. in a building.

The risk analytics system 106 can be configured to support any type of data source and is not limited to the data sources enumerated above. Any live feed of potential threats according to the vulnerabilities of the asset under protection can be used as a data source for the risk analytics system 106.

The threat data reported by the data sources 102 can include time information, location information, summary text, an indication of a threat category, and a severity indication.

Threat Data={Time Information, Location Information, Summary Text, Category,Severity}

In some embodiments, the data sources 102 are configured to provide time information, e.g., date and time information for reported threats to the risk analytics system 106. In some embodiments, the current time stamp can be attached to the incoming threats. However, this timing information may be different for different data sources, for example, some data sources may indicate that a current time of the data provided by the data source is the time of that threat occurring. In this regard, for data from data sources that indicate that the time of a threat is the time that the threat data is received, the risk analytics system 106 can add the time of threat occurrence as the time that the threat was received.

The data source can provide the location information on the incident. The location information could be the latitude and longitude of the incident. Both point and area information can be included. For example, some incidents like weather related threats affect a large area and they are not a specific point on the map but rather a particular geographic area. However, some other incidents like traffic incidents, bombing, or urban fires may be associated with a specific point on a map. The threat data can further include summary text or otherwise a text explanation of the incident should also be included in the threat reported.

Furthermore, the threat data can include an indication of a category of the incident. For example, each of the data sources 102 can define a category for the threat data, e.g., crime, fire, hurricane, tornado, etc. Each of the data sources 102 may have a unique category scheme. For example, one data source could define a shooting as a "Crime" category while another data source would define the same event as a "Violent Activity" category. If no category is reported by a data source, the risk analytics system 106 can be configured to determine a category from the text summary of the threat using Natural Language Processing (NLP).

The threat data can include severity information. Threats might be different in terms of severity. In order to understand the potential risk for that specific threat, the severity information can be included in the threat data. Different scales can be used for different data sources (e.g., 1-10, 1-5, A-F, etc.). The risk analytics system 106 can be configured to convert the severity levels to a standard format as part of ingesting data from the data sources 102.

The data sources 102 can provide real-time updates on potential and/or actual threats. Depending on the application, the data sources 102 may differ significantly in the formatting and/or reporting scheme of the data source. There should be some analysis done on the asset vulnerability before deciding on what data sources are suitable to report the potential threats. For example if the main vulnerability of the asset is towards natural disasters and extreme weather conditions then a proper channel that provides real-time updates on the weather conditions and forecast would be an appropriate data source for the risk analytics system 106.

Another example is social media information. If a reputation of a company is part of the asset the risk analytics system 106 is to protect or the way consumers share their feedback and thoughts on social media are a good indication of possible threats to hurt the company reputation. Then a data source that reports updates on social media topics and trends can be valuable for the risk analytics system 106. This can be extended to sensors and camera feeds that monitor a building or campus and generate alarms (threats) that need to be ingested and analyzed to deduce the best action possible. The data sources 102 can either be first party and/or third party, i.e., platforms and/or from equipment owned by an entity and/or generated by data sources subscribed to by an entity.

The risk analytics system 106 can be a computing system configured to perform threat ingesting, threat analysis, and user interfaces management. The risk analytics system 106 can be a server, multiple servers, a controller, a desktop computer, and/or any other computing system. In some embodiments, the risk analytics system 106 can be a cloud computing system e.g., Amazon Web Services (AWS) and/or MICROSOFT AZURE. The risk analytics system 106 can be an off-premises system located in the cloud or an on-premises system located within a building of the entity and/or on a campus.

Although the risk analytics system 106 can be implemented on a single system and/or distributed across multiple systems, the components of the risk analytics system 106 (the data ingestion service 116, the geofence service 118, the RAP 120, and the risk applications 126) are shown to include processor(s) 112 and memories 114. In some embodiments, the risk analytics system 106 is distributed, in whole or in part, across multiple different processing circuits. The components of the risk analytics system 106 can be implement on one, or across multiple of the memories 114 and/or the processors 112 such that, for example, each of the data ingestion service 116, the geofence service 118, the RAP 120, and/or the risk applications 126 could each be implemented on their own respective memories 114 and/or processors 112 or alternatively multiple of the components could be implemented on particular memories and/or processors (e.g., two of or more of the components could be stored on the same memory device and executed on the same processor).

The processor(s) 112 can be a general purpose or specific purpose processor, an application specific integrated circuit (ASIC), one or more field programmable gate arrays (FPGAs), a group of processing components, or other suitable processing components. The processor(s) 112 may be configured to execute computer code and/or instructions stored in the memories 114 or received from other computer readable media (e.g., CDROM, network storage, a remote server, etc.).

The memories 114 can include one or more devices (e.g., memory units, memory devices, storage devices, etc.) for storing data and/or computer code for completing and/or facilitating the various processes described in the present disclosure. The memories 114 can include random access memory (RAM), read-only memory (ROM), hard drive storage, temporary storage, non-volatile memory, flash memory, optical memory, or any other suitable memory for storing software objects and/or computer instructions. The memories 114 can include database components, object code components, script components, or any other type of information structure for supporting the various activities and information structures described in the present disclosure. The memories 114 can be communicably connected to the processor(s) 112 and can include computer code for executing (e.g., by the processor(s) 112) one or more processes described herein. The memories 114 can include multiple components (e.g., software modules, computer code, etc.) that can be performed by the processor(s) 112 (e.g., executed by the processor(s) 112). The risk analytics system 106 is shown to include a data ingestion service 116. The data ingestion service 116 can be configured to receive, collect, and/or pull threat data from the data sources 102 via the network 104.

The data ingestion service 116 can be configured to bring all relevant information on potential threats and/or actual threats into the risk analytics system 106 (e.g., based on insights gained from historical threat data analysis or data received from data sources 102). The data ingestion service 116 can perform various transformations and/or enrichments to the incoming threats and forward the transformed and/or enriched threats to the next stages of the pipeline of the risk analytics system 106, e.g., geofence service 118, RAP 120, and/or risk applications 126. The data ingestion service 116 can be configured receive threats in a variety of different formats and standardize the threats into a standard threat schema.

The risk analytics system 106 is shown to include the geofence service 118. The geofence service 118 can be configured to receive the standard threats from the data ingestion service 116 and determine which of multiple assets are affected by the threats. For example, assets, e.g., buildings, cities, people, building equipment, etc. can each be associated with a particular geofence. If a location of the standard threat violates the geofence, i.e., is within the geofence, the geofence service 118 can generate a specific threat object for that asset. In this regard, a single threat can be duplicated multiple times based on the number of assets that the threat affects. The geofence service 118 can communicate with threat service 122. Threat service 122 can be configured to buffer the threats received from data ingestion service 116 in queue or database, e.g., the threat database 124.

The standard threats can be provided by the geofence service 118 to the RAP 120. The RAP 120 can be configured to determine various risk scores for different assets and threats based on the standard threats. For example, for an asset, the RAP 120 can be configured to determine a dynamic risk score which is based on one or multiple threats affecting the asset. Furthermore, the RAP 120 can be configured to determine a baseline risk score for the asset which indicates what a normal dynamic risk score for the asset would be. In some embodiments, the baseline risk score is determined for particular threat categories. For example, the baseline risk score for a building may be different for snow than for active shooters.

Risk analytics system 106 is shown to include the risk applications 126. The risk applications 126 can be configured to present risk information to a user. For example, the risk applications 126 can be configured to generate various risk interfaces and present the interfaces to a user via the user devices 108 via network 104. The risk applications 126 can be configured to receive the risk scores and/or other contextual information for assets and/or threats and populate the user interfaces based on the information from the RAP 120. The user interfaces as described with reference to FIGS. 25-31 can be generated and/or managed by the risk applications 126.

Figure 30:
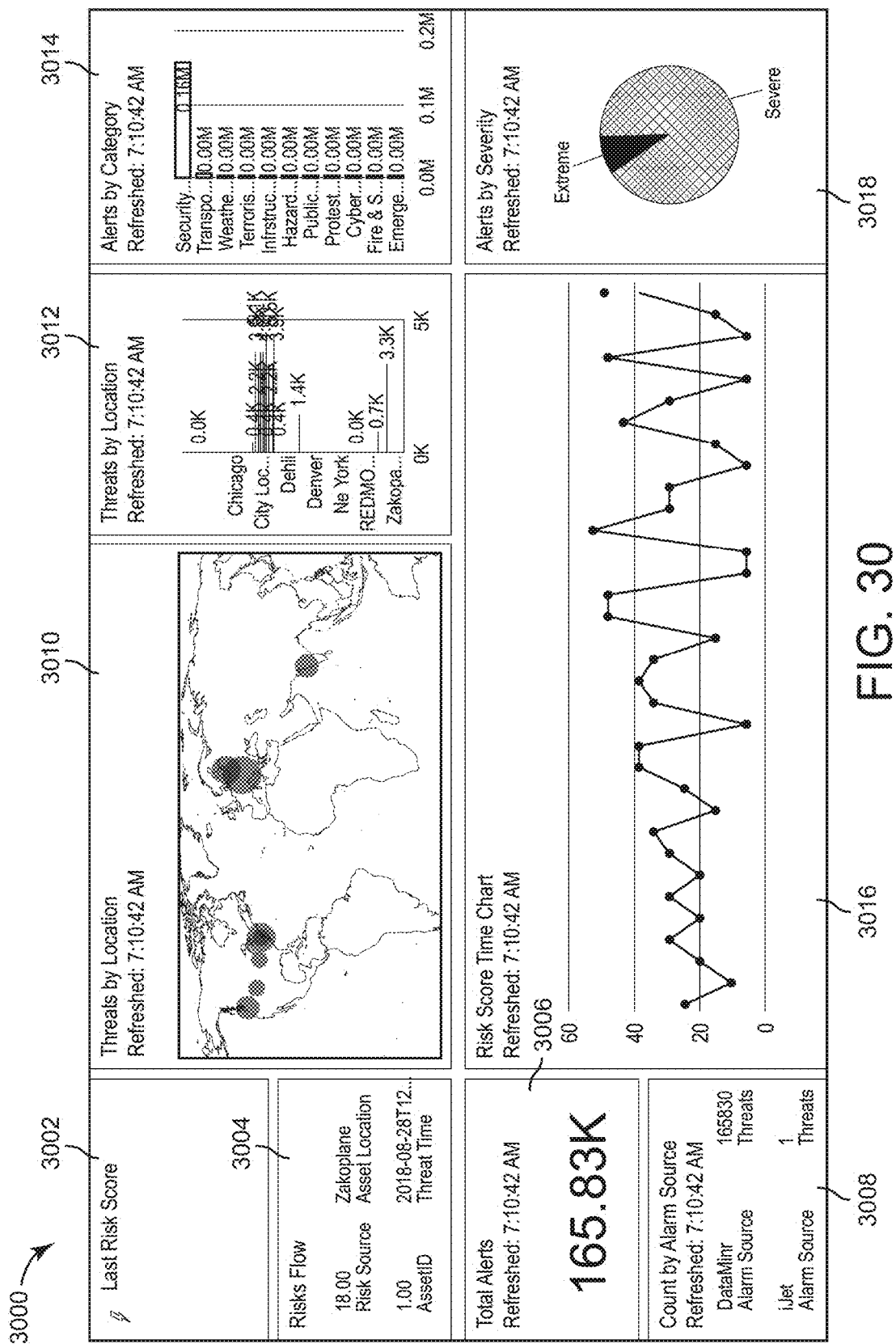
FIG. 30 is a schematic drawing of a user interface for a global risk dashboard including threat metrics, geographic risk, threat information, and asset information, according to an exemplary embodiment.
Figure 31:
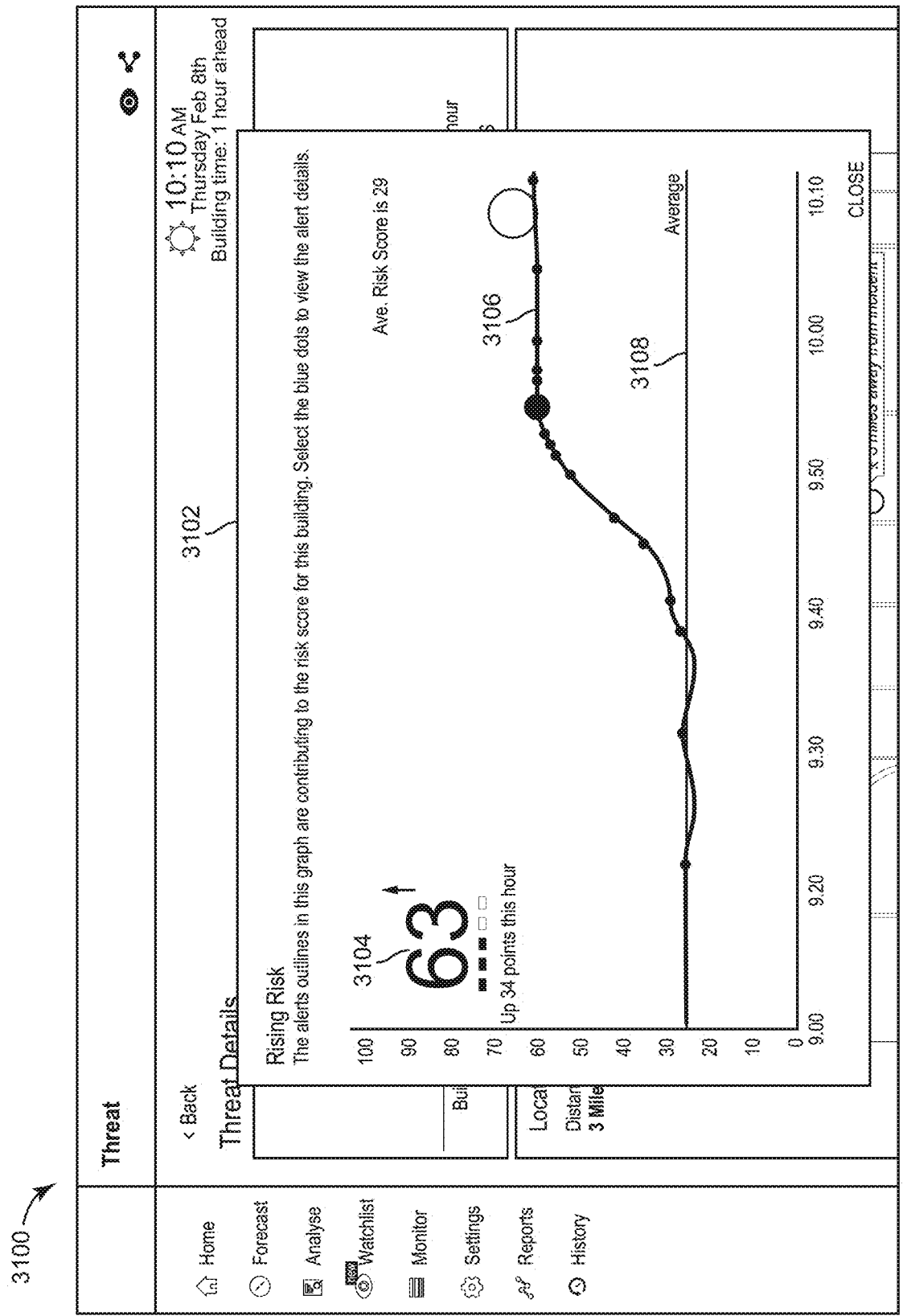
FIG. 31 is a schematic drawing of a user interface including a dynamic risk score trend and a baseline risk score trend, according to an exemplary embodiment.
Figure 32:
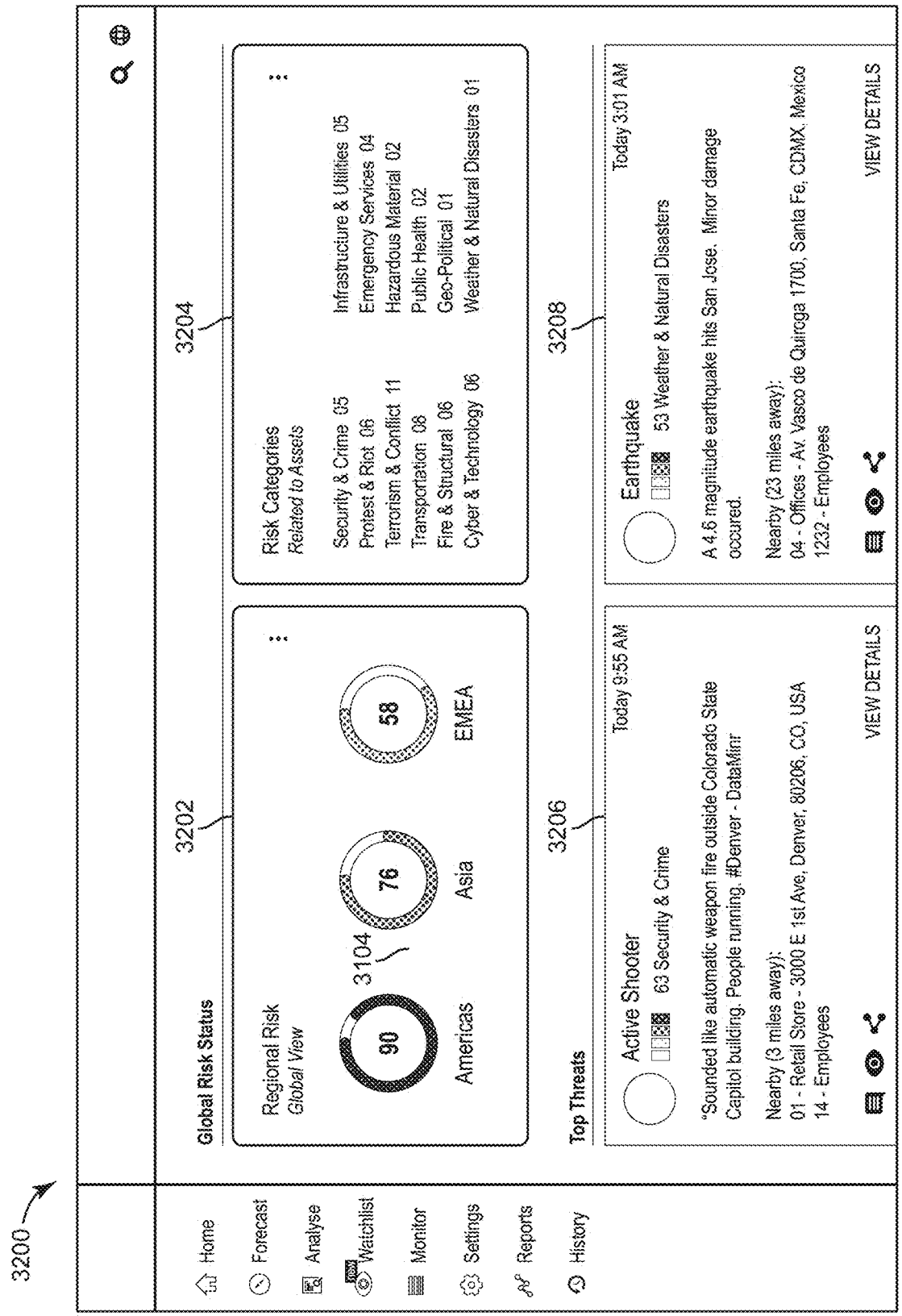
FIG. 32 is a schematic drawing of a user interface of a risk dashboard indicating threats impacting assets by grouping, sorting, and forecasting, according to an exemplary embodiment.
Figure 33:
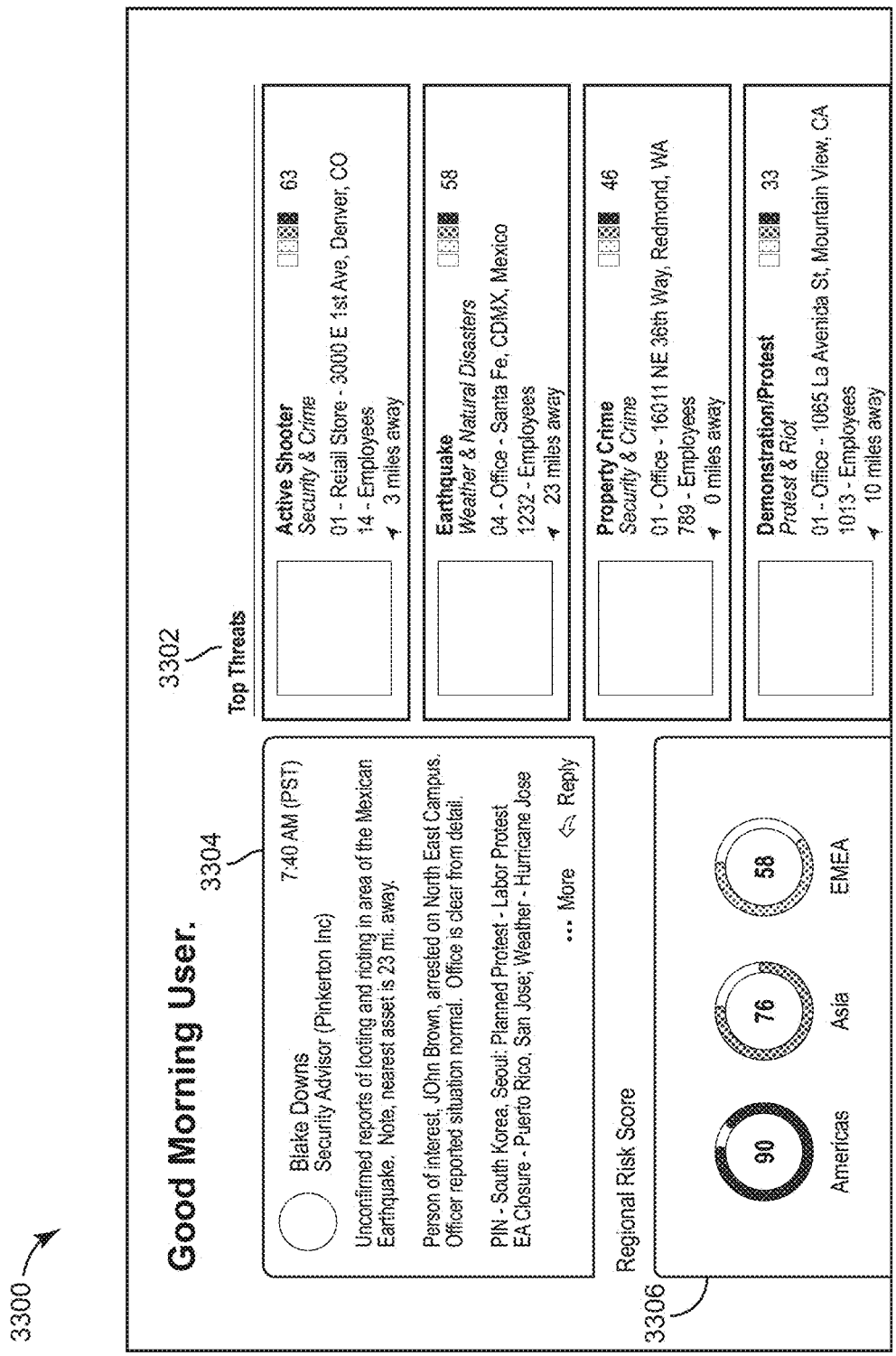
FIG. 33 is a schematic drawing of a user interface including comments from other security advisors and a list of top assets impacted by threats, according to an exemplary embodiment.

The risk applications 126 are shown to include a monitoring client 128 and a risk dashboard 130. The risk dashboard 130 can provide a user with a high level view of risk across multiple geographic locations, e.g., a geographic risk dashboard. An example of a risk dashboard that the risk dashboard 130 can be configured to generate and mange is shown in FIG. 30 and further risk dashboard interfaces are shown in FIGS. 31-33. Monitoring client 128 can be configured to present risk scores and contextual information to a user for monitoring and/or responding to threats of a building or campus. Examples of the interfaces that the monitoring client 128 can generate and/or mange are shown in FIGS. 25-29.

The user devices 108 can include user interfaces configured to present a user with the interfaces generated by the risk applications 126 and provide input to the risk applications 126 via the user interfaces. User devices 108 can include smartphones, tablets, desktop computers, laptops, and/or any other computing device that includes a user interface, whether visual (screen), input (mouse, keyboard, touchscreen, microphone based voice command) or audio (speaker).

Figure 2:
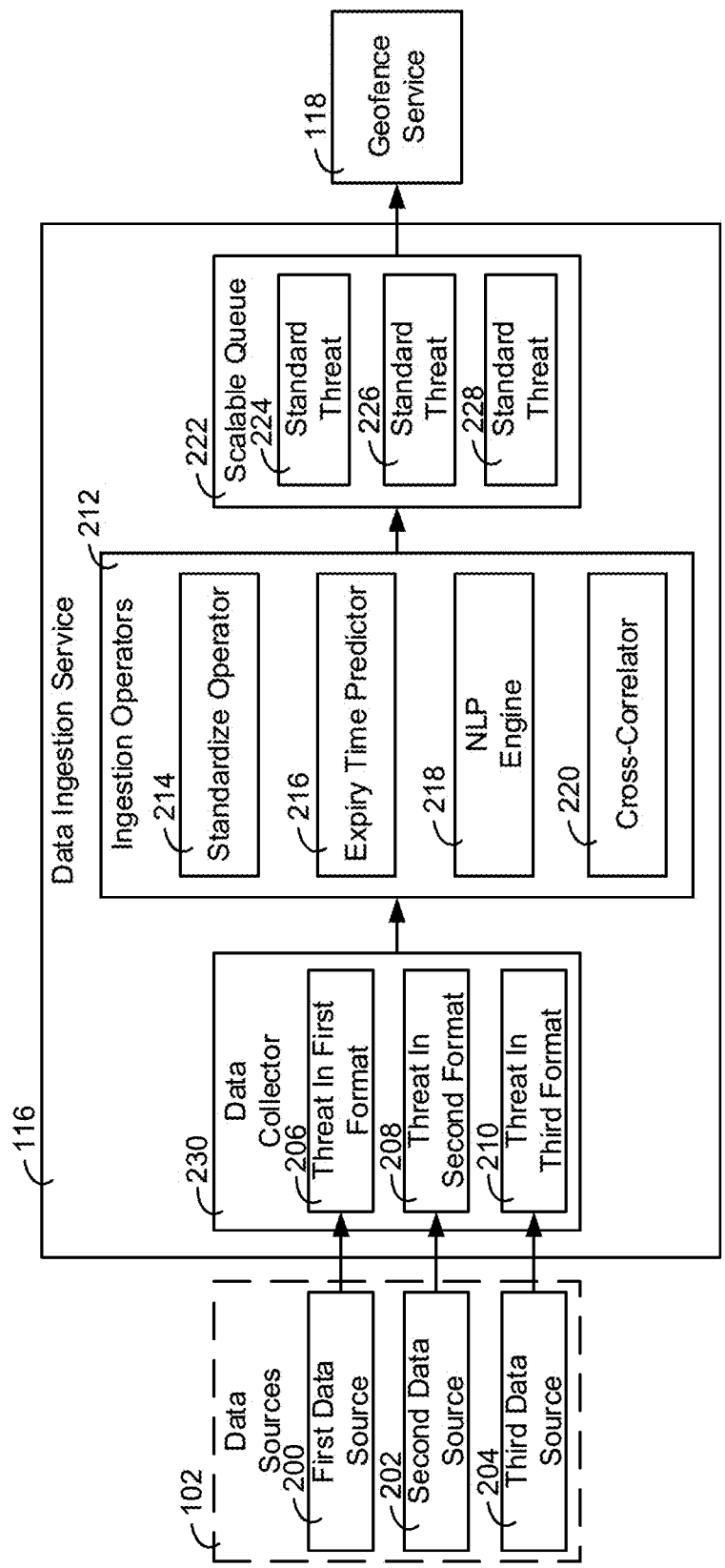
FIG. 2 is a block diagram illustrating the data ingestion service of the risk analytics system of FIG. 1 in greater detail, according to an exemplary embodiment.

Referring now to FIG. 2, the data ingestion service 116 is shown in greater detail, according to an exemplary embodiment. Data ingestion service 116 is shown to include a data collector 230, ingestion operators 212, and a scalable queue 222. The data collector 230 can be configured to receive, collect, and/or pull data (e.g., continuously or periodically pull data) from the data sources 102. As shown, data sources 102 include a first data source 200, a second data source 202, and a third data source 204. The data collector 230 is shown to collect a threat in a first format 206, a threat in a second format 208, and a threat in a third format 210 from the sources 200-204 respectively.

Each of the threats 206-210 is in different schema and the scale of metric (e.g., severity and threat category schema) of the threats 206-210 may be different. For example, the severity levels of the threats 206-210 can be on a 1-5 scale or on a 1-3 scale. Furthermore, the threats 206-210 can have different naming for the fields in their data schema even though they represent the same piece of information like different names for the same threat categories.

The ingestion operators 212 can be configured to perform processing operations on the threats 206-210 to generate standard threats and put the standard threats in scalable queue 222 before forwarding the threats 224-228 to other services (e.g., the geofence service 118). The ingestion operators 212 are shown to include a standardize operator 214, an expiry time predictor 216, an NLP engine 218, and a cross-correlator 220. The standardize operator 214 can be configured to convert the schema (e.g., severity scales, data storage formats, etc.) of the threats 206 to a standard schema and generate corresponding standard threats 224-228 (e.g., defined data objects with particular attributes).

Expiry time predictor 216 can be configured to generate, via various timing models, how long the threats 206-210 will last, i.e., when the threats 206-210 will expire. The expiry time may be added to the standard threats 224-228 as a data element. NLP engine 218 can be configured to categorize the threats 206-210. Since the category included in each of threats 206-210 may be for a different schema, the NLP engine 218 can perform natural language processing on a category and/or summary text of the threats 206-210 to assign the threats to a particular category. The assigned categories can be included in the threats 224-228. The cross-correlator 220 can be configured to group the threats 224-228. Since multiple sources 200-204 are generating the threats 206-210, it is possible that two sources are reporting the same incident. In this regard, the cross-correlator 220 can be configured to perform cross-correlation to group threats 224-228 that describe the same incident so as not to generate duplicate threats.

Where available, a threat expiration time can be extracted by the expiry time predictor 216 from a threat. If the expiration time cannot be extracted from the threat, the expiry time predictor 216 can be configured to use analytics performed on the historical threat data to determine the threat expiration time. For example, a traffic incident may be expected to take a particular amount of time to be responded and handled by the local authorities given the severity, type and location of the threat calculated periodically from similar historical incidents can be used to determine the threat expiration time. If the threat expiration time cannot be identified from the threat parameter database, a static or default threat expiration time can be used. The threat expiration time for the threat and/or asset can be stored in the active threats database 328.

Figure 3:
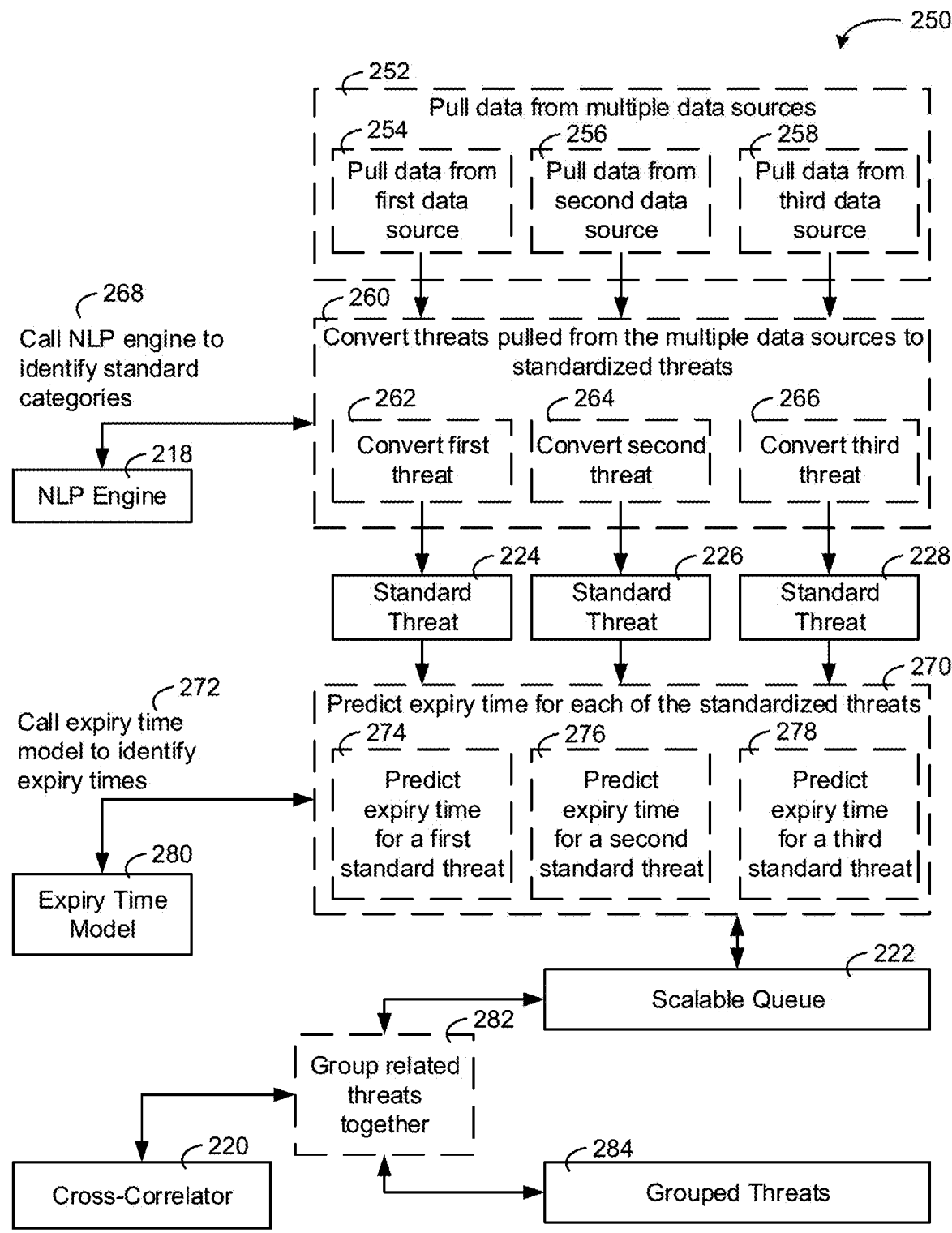
FIG. 3 is a flow diagram of a process that can be performed by the data ingestion service of FIG. 2 to ingest threats received from multiple different data sources, according to an exemplary embodiment.

Referring now to FIG. 3, a process 250 for ingesting data with the data ingestion service 116 is shown, according to an exemplary embodiment. The data ingestion service 116 can be configured to perform the process 250. Furthermore, any computing device (e.g., the risk analytics system 106) can be configured to perform the process 250.

In step 252, the data collector 230 can pull data from the data sources 102. Data collector 230 can implement multiple processes in parallel to pull data from the multiple data sources. In this regard, step 252 is shown to include steps 254, 256, and 258, each of the steps 254, 256, and 258 can include pulling data from a particular data source, e.g., a first data source, a second data source, and a third data source, the data sources 200-204.

In step 260, the standardize operator 214 can convert threats pulled from multiple data sources to standardized threats. More specifically, the standardize operator 214 can convert a first threat to the standard threat 224, a second threat to the standard threat 226, and a third threat to the standard threat 228. Each of the standard threats converted can be received from different data sources and/or the same data source.

Different formats and data schemas might be used by the different data sources and thus each threat may have a different schema. In step 260, the standardize operator 214 can perform multiple operations to convert all the incoming threats to a standard threat objects, the standard threats 224-228. The standardize operator 214 can perform one or multiple (e.g., a series) of static mappings. For example, the standardize operator 214 can adjusting the scales for severity levels of the threats using the same naming for the data fields that present in all the ingested threats like the summary, location info and category. The step 260 is shown to include multiple sub-steps, convert first threat 262, convert second threat 264, and convert third threat 266. The steps 262-266 indicate the steps that the standardize operator 214 can perform (e.g., either in parallel or in sequence) to convert the threats received in the steps 254-258 into the standard threats 224-228.

Part of the conversion of the step 260 into the standard threats 224-228 may include identifying a category for each of the incoming threats, the category being added and/or filled in the standard threats 224-228. The categories can be identified via the NLP engine 218. In this regard, the standardize operator 214 can perform a call to the NLP engine 218 to cause the NLP engine 218 to identify a category for each of the threats received in the step 252. In response to receiving the call to the step 268 (and/or the original threats themselves), the NLP engine 218 can identify a category for each of the incoming threats.

In step 270, expiry time predictor 216 can predict an expiry time for each of the standard threats 224-228. The expiry time may indicate how long it will take a particular threat to expire, e.g., how long it takes for the effects of an incident to be resolved and/or be eliminated. The step 270 can be made up of multiple processes (performed in parallel or performed in series), i.e., the steps 274, 276, and 278, each step including predicting an expiry time for each of the standard threats 224-228. The expiry time predictor 216 may call an expiry time model 280 (step 272) to determine the expiry time for each of the standard threats 224-228. The expiry time model 280 can generate an expiry time for each of the standard threats 224-228 based on the information of the standard threats 224-228 (e.g., the category of the threat, a description of the threat, a severity of the threat, etc.). The expiry time model 280 can be a component of the expiry time predictor 216 or otherwise a component of the data ingestion service 116.

The data ingestion service 116 can add the standard threats 224, 226, and 228 into the scalable queue 222. The scalable queue 222 could have different implementations like Apache Kafka or Azure Event hubs in various embodiments. The queue 222 is designed in a way that it can ingest large volume of incoming messages and is able to scale horizontally. In step 282, the cross-correlator 220 can group related threats together so that threats that describe the same event are de-duplicated. The result of the cross-correlation by cross-correlator 220 can be grouped threats 284 which can include groups of multiple threats reported by different data sources each relating to the same event. The grouped threats 284 can be added back into the scalable queue 222 and/or forwarded on to the geofence service 118. The scalable queue 222 can be implemented via Apache Kafka and/or Azure Event-hubs and can buffer the incoming traffic until the running processes e.g., the steps 260, 270, 282) finish processing them.

Figure 4:
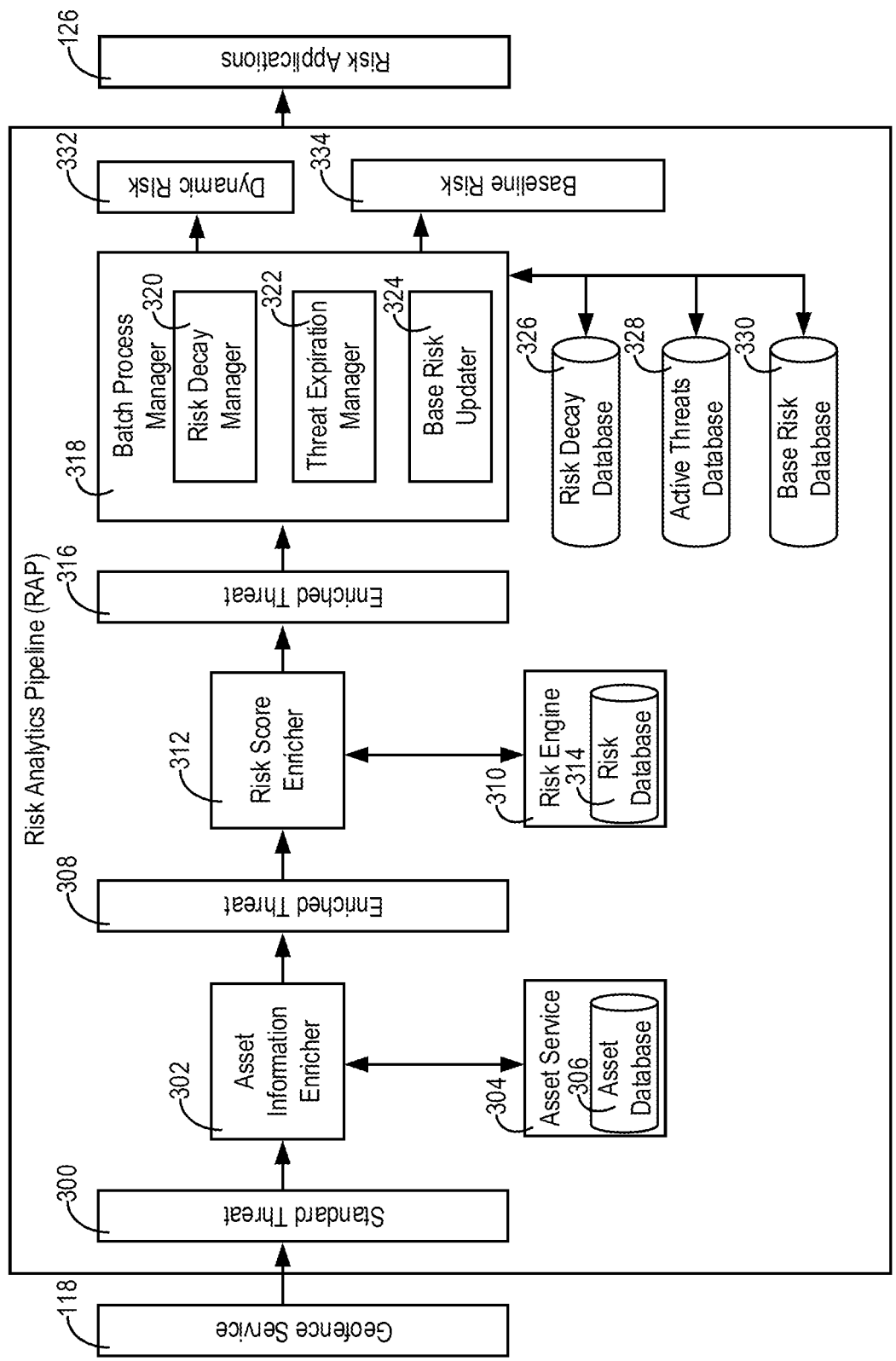
FIG. 4 is a block diagram illustrating the RAP of the risk analysis system of FIG. 1 in greater detail, according to an exemplary embodiment.

Referring now to FIG. 4, the RAP 120 of FIG. 1 is shown in greater detail, according to an exemplary embodiment. The RAP 120 can be configured to receive threats, standard threat 300, from the geofence service 118. The standard threat can be enriched with asset information by asset information enricher 302 (e.g., asset information can be added into the standard threat 300 data object). The RAP 120 is shown to include the asset information enricher 302 and an asset service 304. The asset service 304 is shown to include an asset database 306. The asset database can include information indicating various different types of assets (e.g., buildings, people, cars, building equipment, etc.). Asset information enricher 302 can send a request for asset information for a particular asset affected by the standard threat 300 to asset service 304. Asset service 304 can retrieve the asset information and provide the asset information to asset information enricher 302 for enriching the standard threat 300. The asset database 306 can be an entity-relationship database e.g., the database described with reference to U.S. patent application Ser. No. 16/048,052 filed Jul. 27, 2018, the entirety of which is incorporated by reference herein.

The result of the enrichment by the asset information enricher 302 is the enriched threat 308. The enriched threat 308 can include an indication of a threat, an indication of an asset affected by the threat, and contextual information of the asset and/or threat. The RAP 120 includes risk engine 310 and risk score enricher 312. Risk engine 310 can be configured to generate a risk score (or scores) for the enriched threat 308. Risk engine 310 can be configured to generate a dynamic risk score for the enriched threat 308. The risk score enricher 312 can cause the dynamic risk can be included in the enriched threat 316 generated based on the enriched threat 308.

Batch process manager 318 can implement particular processes that are configured to generate dynamic risk 332 and baseline risk 334 for presentation in a user interface of risk applications 126. Batch process manager 318 is shown to include risk decay manager 320, threat expiration manager 322, and base risk updater 324. Each of the components of batch process manager 318 can be implemented as a batch process and executed by the batch process manager 318. Risk decay manager 320 can be configured to determine and/or decay a dynamic risk score of the enriched threat 316 based on a particular decay model (e.g., a linear decay model, an exponential decay model, a polynomial decay model, etc.). In this regard, the risk decay manager 320 can cause a value of the dynamic risk score to lower over time.

The batch process manager 318 is shown to communicate with databases, risk decay database 326, active threats database 328, and base risk database 330. The risk decay database 326 can store risk decay models and/or associations between particular threats and/or assets and particular decay models. The risk decay manager 320 can call the risk decay database 326 to retrieve particular decay models and/or decay parameters based on an asset and/or threat. The active threats database 328 can store an indication of an expiration time for the threat expiration manager 322. In some embodiments, the active threats database 328 stores models for determining a threat expiration time for a threat and/or asset. The base risk database 330 can store an indication of a base risk value for each of multiple different threat categories for particular assets that the base risk updater 324 can be configured to determine.

The threat expiration manager 322 can be configured to expire, e.g., delete, a threat based on an expiration time. The expiration time can be included within the enriched threat 316 and can be generated by the expiry time predictor 216 as described with reference to FIG. 2. The base risk updater 324 can be configured to generate the baseline risk 334. The baseline risk 334 may be a baseline risk value indicative of a normal baseline risk value for a particular asset and/or a particular threat category for that asset considering the historical data. Baseline risk score provides a good metric to compare different neighborhoods and assets in terms of the "norms" and trends for different threat categories. For example, one neighborhood could have a higher baseline risk score in crime compared to another but has much less score for extreme weather calculated over years of historical data. Providing both the dynamic risk 332 and the baseline risk 334 to the risk applications 126 can enable the risk applications 126 to generate user interfaces that present both a real-time risk value, the dynamic risk 332, for a particular asset but also a baseline risk value, the baseline risk 334, so that a user can understand contextually what the dynamic risk 332 means for a particular asset since the user is able to compare the dynamic risk 332 to the baseline risk 334.

The risk decay manager 320 can be a mechanism for dynamically changing a risk score of an asset over time to more accurately represent the actual significance of an alarm event associated with an asset. The risk decay manager 320 can be configured to apply a decay model that reduces risk score over time. The parameters of the models can be learned by the risk decay manager 320 from historical data making the model adaptive towards ever-changing nature of threats. The decaying asset risk score can be used by the risk applications 116 to sort and filter threats occurring in relation to that asset. The order of the threats displayed (e.g., in a list) can change based on the risk decay performed by the risk decay manager 320.

Figure 23:
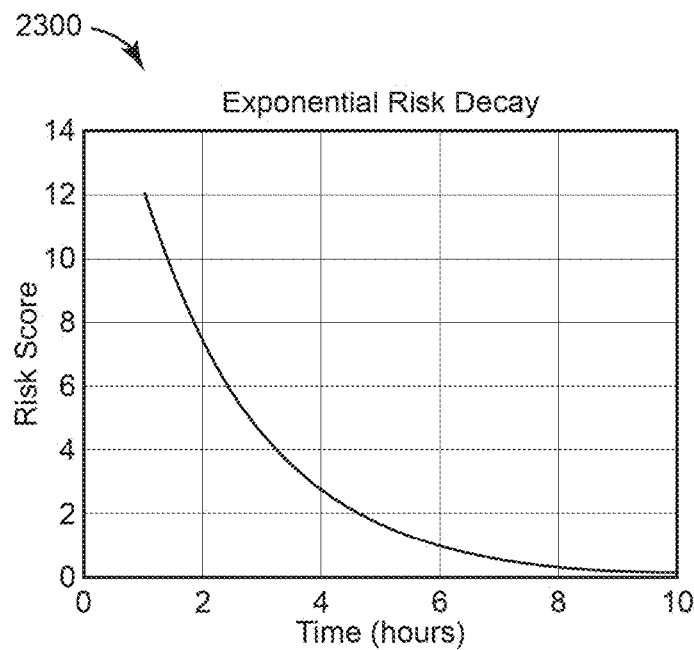
FIG. 23 is a chart illustrating an exponential risk decay model for decaying risk that can be used in the process of FIG. 20, according to an exemplary embodiment.
Figure 24:
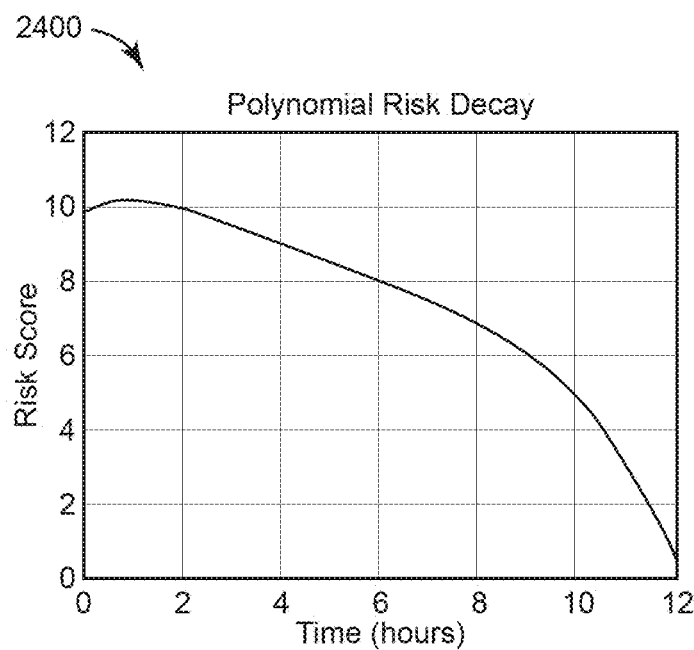
FIG. 24 is a chart illustrating a polynomial risk decay model for decaying risk that can be used in the process of FIG. 20, according to an exemplary embodiment.

The risk decay manager 320 can determine a decay model based the type of threat. The risk decay manager 320 can be implemented in the RAP 120 and/or in the risk applications 126. Decay models define how the risk changes over time and can be tuned for specific applications. Examples of decay models can be exponential decay models, polynomial decay models, and linear decay models. Examples are shown in FIGS. 23-24. The threat may include a risk score determined for the asset by the risk engine 310. The risk score and/or the threat can be stored in the risk database 314. Using the identified decay model and threat expiration time, the risk decay manager 320 can be configured to update the risk score by decaying the risk score. In this way, the risk score is periodically reduced according to the decay model until the contributing threats are closed.

Using the polynomial decay model facilitates a dynamic decay that can be adapted for particular situations. For example, the polynomial could incorporate a factor to account for the time of day that could change the decay curve for night time events. The polynomial model also captures the natural progress of the risk in most scenarios by a slow decay at the beginning of the curve then a fast decay when approaching the estimated threat expiration time for that threat. This behavior is observed in many threats that reflect how the situation is handled after first responders are at the scene. The slope of the curve is configurable for each type of threats to best match the natural dynamic of that threat in specific. The decay models can be automatically selected for different assets, asset types, and threat categories.

Using the decayed risk score and/or other risk scores for other assets, the risk applications 126 can sort and/or filter the threats for display on a user interface. In this regard, one threat may immediately rise to the top of a threat list but over time fall down the threat list due to the decay determined by the risk decay manager 320. An interface could include selectable monitoring zones and threat events. Each threat event may have a type, a date, a time, an identifier (ID) number, an alarm location, and a risk score. The risk score of the event is the risk score associated with the asset under threat. The threats can be sorted by multiple properties including risk scores.

The decay process performed by the risk decay manager 320 can continue until the risk score returns to the baseline asset risk score or the estimated duration is reached. Additionally, the risk of a specific threat can be eliminated if such a notification is received from the original event source. For example, a weather update notifying that the tornado has stopped. The risk score can also be updated by accessing data feeds from external sources. For example, the tornado severity classification is upgraded by another weather service (or multiple sources). The risk score will change and evolve to reflect the actual risk of the event. The result of a risk decay is a more realistic and reflective of how risk scores should evolve.

Figure 5:
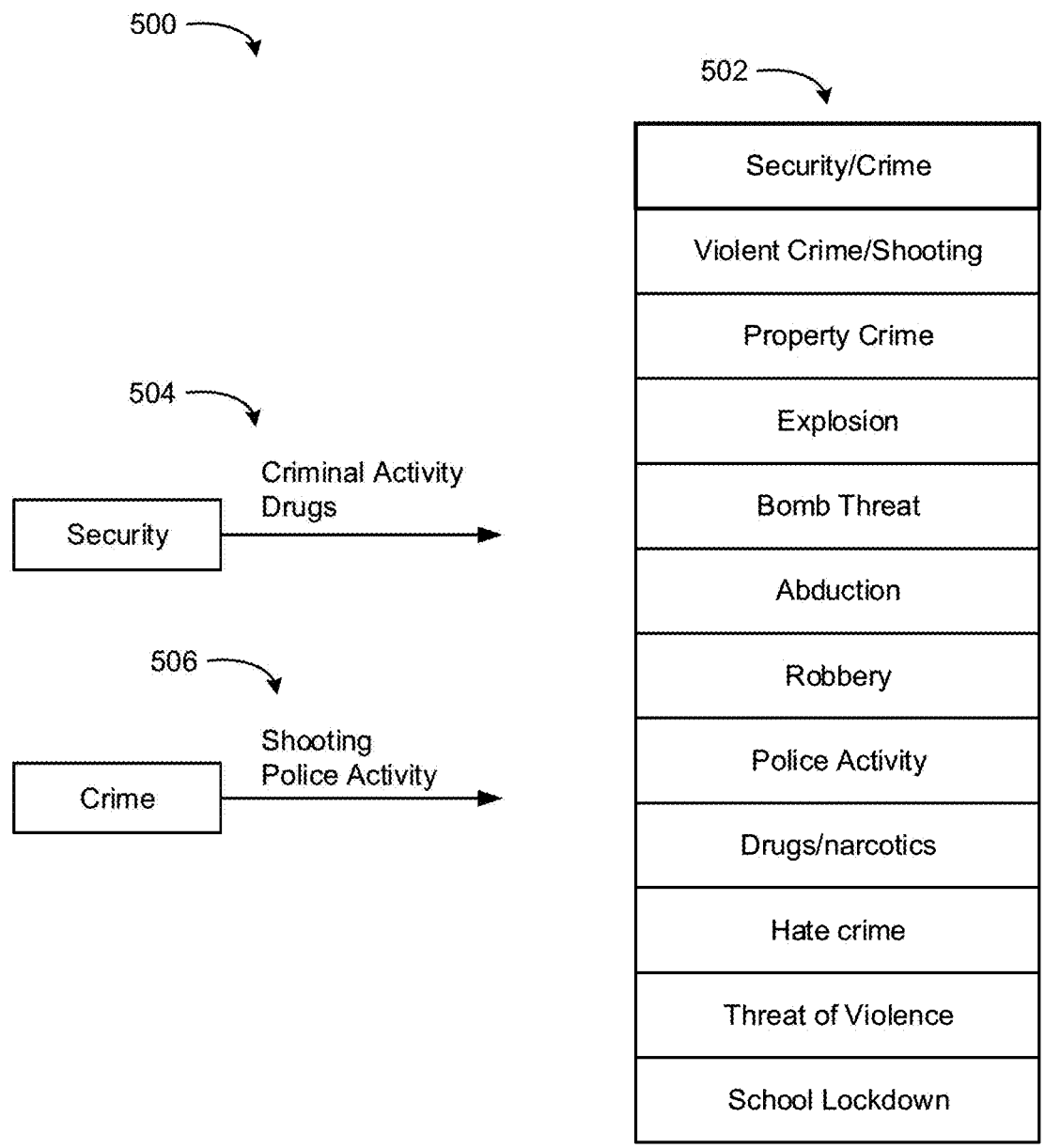
FIG. 5 is a block diagram illustrating the mapping of threats from multiple different data sources to a standardized category format, according to an exemplary embodiment.

Referring now to FIG. 5, a mapping 500 is shown for two exemplary threat categories, category of a data source 504 and categories of a data source 506 into categories of master list 502. Mapping between threat categories to the master threat list can be supported by the threat ingestion service 116. In some embodiments, there is a set of defined threats that the system 106 is configured to protect assets against. This set of known threat list is the master list 502 that the system 106 can be configured to recognize and ingest into the pipeline. The master threat list 502 supported by the system 106 can be updated and/or generated based on vulnerabilities of the assets of a particular building and/or site.

The type of threats might be very different from one asset to another. The master list 502 can act as a union of all the threats that might impact any of the assets of the building and/or the site. With reference to FIGS. 17-18, risk calculation, the TVC model, and the VT matrix are described. In this regard, the mapping shown in FIG. 5 can be implemented in the risk calculation as described elsewhere herein. So knowing the type of the threat coming into the pipeline may be important for the risk calculation that will happen later in the pipeline since asset vulnerabilities depend on threat category.

Many data sources provide the category and sub-category information about the reported threats. In some cases there might be a static mapping between those threats and the master threat list 502. However, a direct static mapping might not exist for all the categories. In FIG. 5, there are two data sources, the data source 504 and the data source 506 for reporting crime and security related threats. The data source 504 two categories of security criminal activity and drugs and the data source 506 has a category for crime that includes police activity and shootings. However the master list 502 supported in the system that has been identified in this scenario includes much more detailed sub-categories for crime.

It can be seen that there is a static mapping for some categories and sub-categories but for example for criminal activity there is no direct mapping to any of the sub-categories on the master list. To be able to accurately identify the sub-category of the crime discussed in the threat summary, the NLP engine 218 can be configured to process the textual summary of the threat to find the closest sub-category on the master list that will be a good representation of the topic for that threat.

Figure 6:
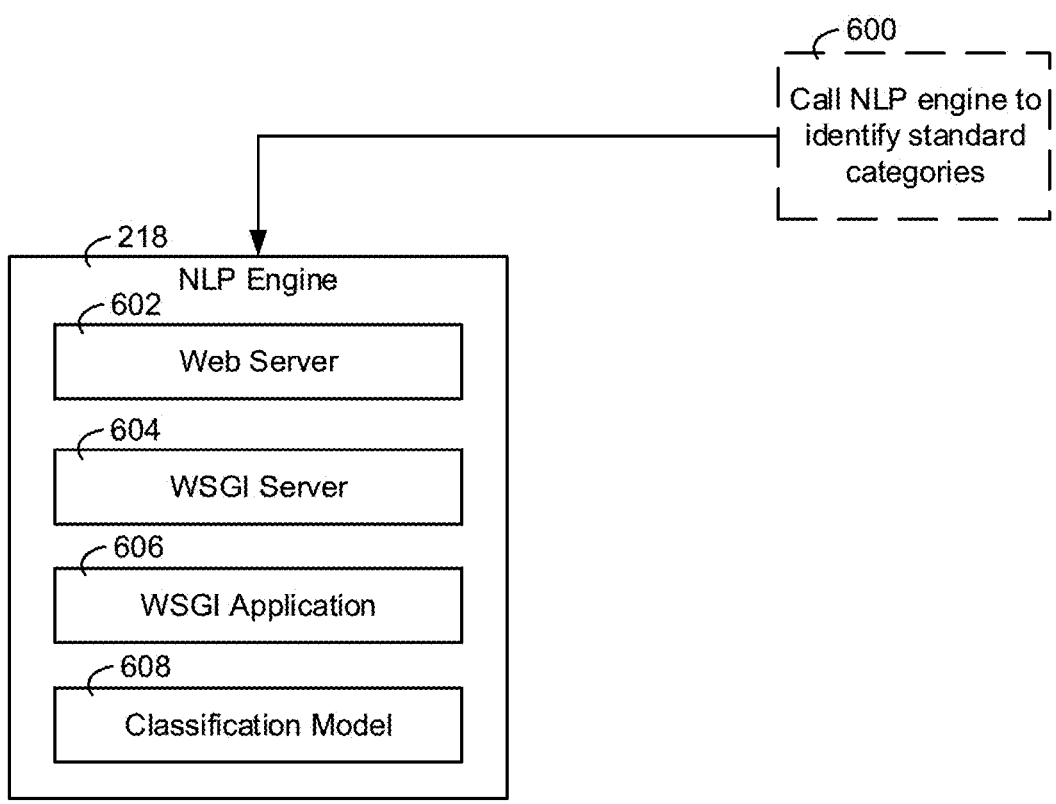
FIG. 6 is a block diagram of a natural language processing (NLP) engine of the data ingestion service of FIG. 2, according to an exemplary embodiment.

Referring now to FIG. 6, the NLP engine 218 as described with reference to FIG. 2 is shown in greater detail, according to an exemplary embodiment. The NLP engine 218 can include a RESTful interface (the web server 602, the WSGI server 604, and the WSGI application 606) and a classification model 608. The NLP engine 218 can be configured to categorize a threat into the standard categories supported by the system (e.g., the master list 502 as described with reference to FIG. 5). The service can be made up of an Application Programming Interface (API) layer on top of a machine learning model that represent the classifier trained to understand the standard categories.

The process 600 can be the operation performed by the standardize operator 214 and/or a message (an HTTP request) sent from the standardize operator 214 to the NLP engine 218 to get the threat category for the new incoming threats. The standardize operator 214 can talk to a high-performance web server, the web server 602, that can be configured to work as a reverse proxy relaying all the incoming requests to the underlying WSGI server 604.

It is the reverse proxy implemented via the web server 602 that exposes the NLP engine 218 to the outside world (e.g., the standardize operator 214). This provides solid security and scalability built-into the NLP engine 218. The web server 602 can be different in different embodiments but can be Nginx web servers and/or Apache web servers. The WSGI server 604 can be a scalable server that can process requests in parallel. There are many different options for WSGI servers. For example, the WSGI server 604 can be a Gunicorn server. The WSGI server 604 can be configured to communicate with the underlying WSGI application 606 in order to do the calculations and return the results of the classification. The classification model 608 can be a Machine Learning model that is used by the WSGI application 606 to do the categorization of the threats.

Figure 7:
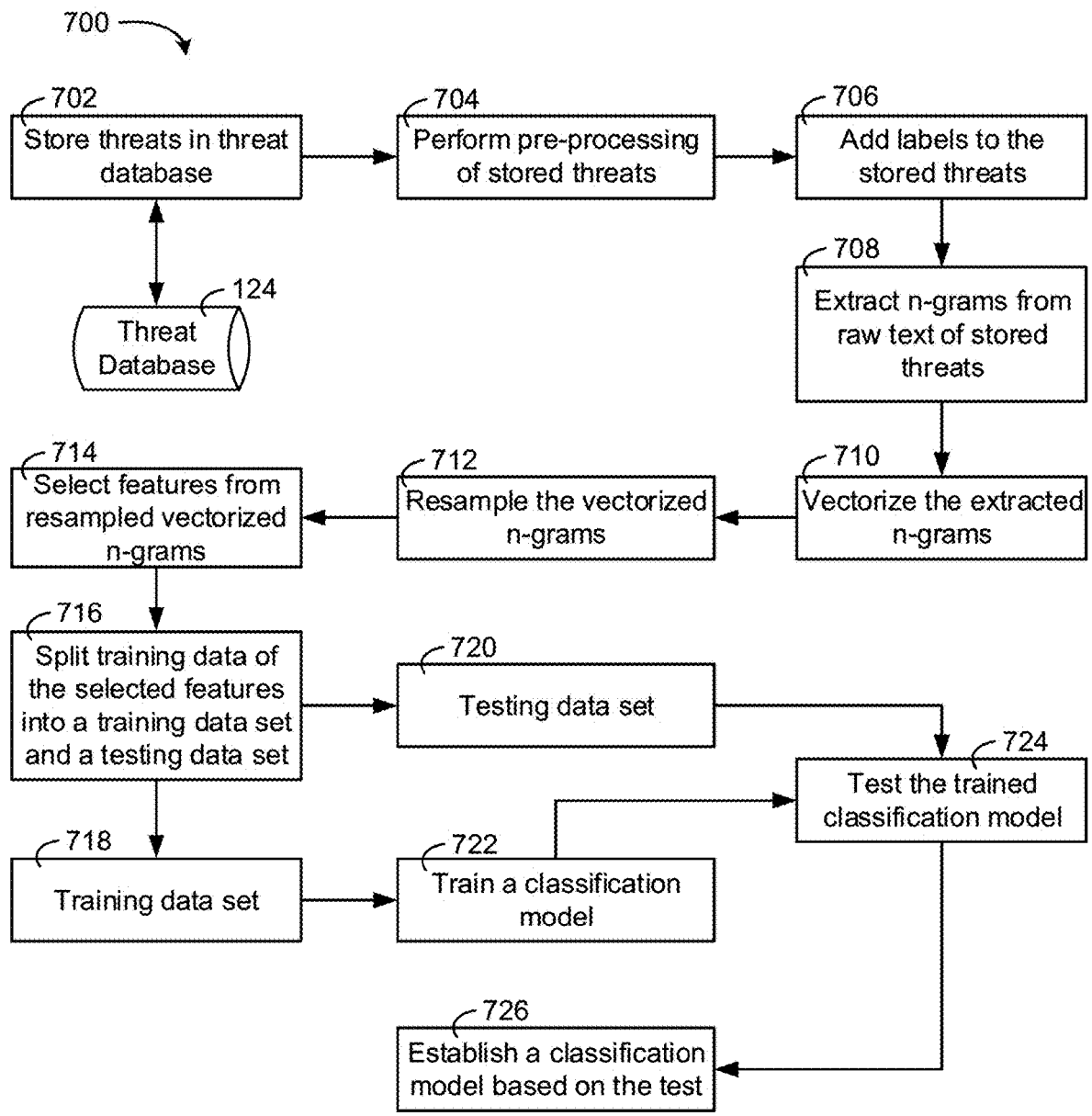
FIG. 7 is a flow diagram of a process that can be performed by the NLP engine of FIG. 6 of training a classification model for the NLP engine, according to an exemplary embodiment.

Referring now to FIG. 7, a process 700 for generating the classification model 608 via the NLP engine 218 is shown, according to an exemplary embodiment. The process 700 illustrates supervised methods for generating the classification model 608. However, in some embodiments, unsupervised methods can be performed to generate the classification model 608. The risk analytics system 106, more specifically, the data ingestion service 116 and/or the threats service 122 can be configured to perform the process 700.

Furthermore, any computing device as described herein can be configured to perform the process 700.

In step 702, the threats service 122 can store historical threats coming into the system 106 in the threat database 124. All the threats can be ingested and stored for analytics by the threats service 122. The ingested historical threat data stored in the threat database 124 can be utilized to develop a language model.

In step 704, the NLP engine 218 can perform pre-processing on the stored threats. Pre-processing can include the initial steps in the NLP pipeline. The text summary of the threats coming in might include a lot of noise, links, and characters that do not have any significant meaning for the purpose of risk modeling. In this step, the NLP engine 218 can remove the links, text words or phrases which are too short or too long, and/or the stop words along with the special characters (e.g., "&," "!," etc.).

In step 706, after filtering out some of the threats in the pre-processing step 704, the NLP engine 218 can label a small portion of the threats with the corresponding standard categories that the system supports, e.g., the categories as shown in the master list 502 of FIG. 2. The labeling step 706 can include requirements in order to make sure high quality data is generated for training the classification model 608. The requirements can include that threats be reviewed by a human to correctly identify the right category for that threat. The requirements can include that only the threats that clearly fall in that category need to be labeled otherwise they are skipped. Furthermore, labeling can be done by multiple users to avoid bias and personal opinions and minimize human errors. The requirements can include that multiple categories can be applied to a single threat. For example if there is "police activity" and "drugs" on the master threat list 502 then they both might apply to the incidents that report police presence at a drug related bust. In this regard, the NLP engine 218 can handle multiple labels for each threat.

The requirements can further include having good coverage on all the categories on the list of the threats that are picked from the historical threat store should be distributed among all the categories. For example, there may need to be example labelled threats in every category. A minimum 20 examples in each category may be required to cover all the categories in the model. Furthermore, considering the preceding requirement, the distribution of the threats that are picked up for labeling should not disturb the natural frequency of threats in categories drastically. This means that the ingested data by nature has more threats on crime category than weather incidents for example. The sampling strategy can respect this bias and have more samples in crime category picked for labeling.

In step 708, after the labeling is performed in the step 706, n-grams can be extracted from the raw text of the labeled threats by the NLP engine 218. Going beyond bigrams may have has little to no value added for the increased complexity of the model. In this regard, the n-grams may be limited to unigrams and bigrams. Examples of unigrams and bigrams may be specific highly occurring words for word groups. For example, bigrams (2-grams) could be "Police Shooting," "Gas Fire," and "Armed Robbery" while examples of unigrams (1-grams) can be "Police," "Fire," and "Robbery."

In step 710, the NLP engine 218 can vectorize the extracted n-grams (e.g., the unigrams and bigrams). The extracted n-grams can be vectorized in a high-dimensional vector space. Vectorizing the n-grams enables the NLP engine 218 to work with numbers instead of words. The NLP engine 218 can be configured to utilize bag of words and/or count-vectorizer to vectorize the n-grams. Vectorizing may indicate the frequency at which particular words occur, in the example of bag-of words vectorization, a bag-of-words data structure could be, BoW={"Fire": 40, "Shooting": 20, "Rain": 3, "Heavy Rain": 2};

which indicates that the unigrams "Fire," "Shooting," and "Rain" occurred 40, 20, and 3 times respectively and the bigram "Heavy Rain" occurred twice.

In some embodiments the class imbalance in the data might be too big to ignore. In response to detecting a class imbalance, the NLP engine 218 can perform, in step 712, over-sampling of the minority classes and/or under-sampling of majority classes. The NLP engine 218 can perform resampling (over-sampling and/or under-sampling) based on the Imbalanced-learn Python library.

In some cases, the number of features for the classifier is very large. Not all the features have the same level of importance in training a model. The features that are not strongly relevant to the classification can be removed by the NLP engine 218 with minimal impact on the accuracy of the classification model 608. For this reason, in step 714, the NLP engine 218 can select the most importance features for classification. The NLP engine 218 can be configured to perform a statistical relevance tests like $\chi^2$ (Chi-Squared) test can be used as a measure of importance of a feature. Scikit-learn library for Python can be implemented by the NLP engine 218 to perform the selection. In some embodiments, the NLP engine 218 can select a predefined number (e.g., the top 10 percent) of the most importance features. Selected features can be particular n-grams that are important.

In step 716, the NLP engine 218 can split the data set of the selected features of the step 714 into a test data set 720 and a training data set 718. The ratio between test and training data might be different in different applications. In some embodiments, the training data set 718 is larger than the testing data set 720. In some embodiments, the training data set includes 80% of the data set while the testing data set includes 20% of the data set.

The NLP engine 218 can train the classification model 608 using the training data set 718 in step 722. The classification model 608 can be one or multiple different classifiers. The classification model 608 can be a Naïve Bayes and/or Random Forest model. Naïve Bayes may be not as accurate as Random Forest but it has the speed advantage compared to Random Forest. Depending on the size of the data and number of features, Naïve Bayes can be much faster to train compared to Random Forest. However, if pure accuracy is the ultimate goal Random Forest may be the best choice.

In step 724, the testing data set 720 can be used by the NLP engine 218 to test the trained classification model 608 and make sure the classification model 608 provides satisfactory performance. Precision and Recall per class needs to be calculated to evaluate the model. If the trained classification model 608 is successfully tested (e.g., has an accuracy above a predefined accuracy level), the NLP engine 218 establishes the classification model 608 by deploying the classification model 608 on the WSGI application 606 within in the NLP engine 218 (step 726). If the classification model 608 is not good enough (has an accuracy below the predefined accuracy level), the training process needs to repeat with more data, different features and different model parameters until the satisfactory results are achieved (e.g., repeat the process 700 again any number of times).

Figure 8:
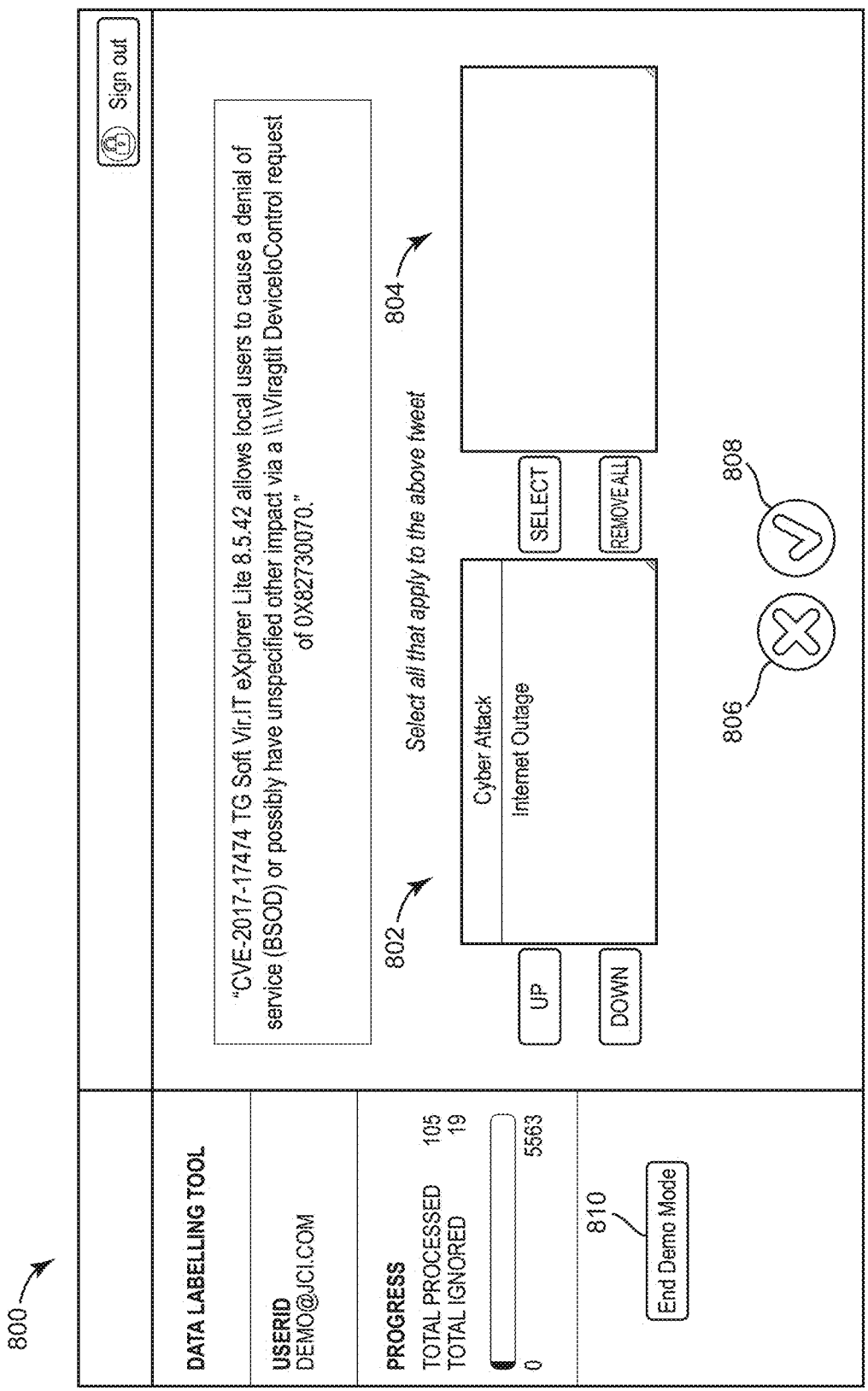
FIG. 8 is a schematic diagram of an interface for labelling data for training the NLP engine of FIG. 6, according to an exemplary embodiment.

Referring now to FIG. 8, an interface 800 for a data labeling tool is shown, according to an exemplary embodiment. The data labeling tool can be used to perform the step 706 of the process 700. Furthermore, the data labeling tool can meet all of the requirements for the step 706. The data labeling tool is user friendly tool that can be used to label data for developing supervised machine learning models, e.g., the classification model 608.

The labeling tool can be a component connected to the threats service 122 and can be configured to load the threats stored in the threat database 124, apply the pre-processing to filter out the noisy threats and then provides the threats one by one to the user via the interface 800 to generate labels for each threat based on user input indicating the labels. In interface 800, a potential threat that has been reported from social media (e.g., TWITTER, FACEBOOK, etc.) has been loaded and the possible labels for that tweet are suggested as options to be picked for the user in element 802. The user selects all the labels of the element 802 that apply to that threat and then accepts the labels by pressing the checkmark button 808. This causes the selected labels to be moved from element 802 to a list in element 804. In case the threat loaded is not suitable for labeling (e.g., it does not have clear relevance to the threat categories) the user can skip that threat and go to the next threat by pressing the "x" button 806. The buttons 806 and 808 can be included in the interface 800 to satisfy the requirement that only threats that clearly fall into a category are labeled otherwise they are skipped.

The interface 800 is shown to include demo mode element 810 which can include text "Demo Mode" and "End Demo Mode." The demo mode enables new users to get familiar with the labeling tool without generating inaccurate labels on the system. This feature helps the users to quickly interact with the tool and feel confident about what they will be doing with the tool before the actual labeling begins.

The master list of all the threats that are supported by the system, e.g., the master list 502 as described with reference to FIG. 5, can be long depending on the assets and their vulnerabilities that the system 106 is monitoring against. It can be very tedious and unpractical to populate the page with all the threats to choose from for the user of the tool. In this regard, the tool can be configured to automatically recommend potential categories for each threat, e.g., a subset of the total master list 502 and therefore the list presented to the user is much shorter than the master list 502. The recommendations are presented to the user based on a cosine similarity analysis of sentence embeddings as described with reference to FIG. 10.

Figure 9:
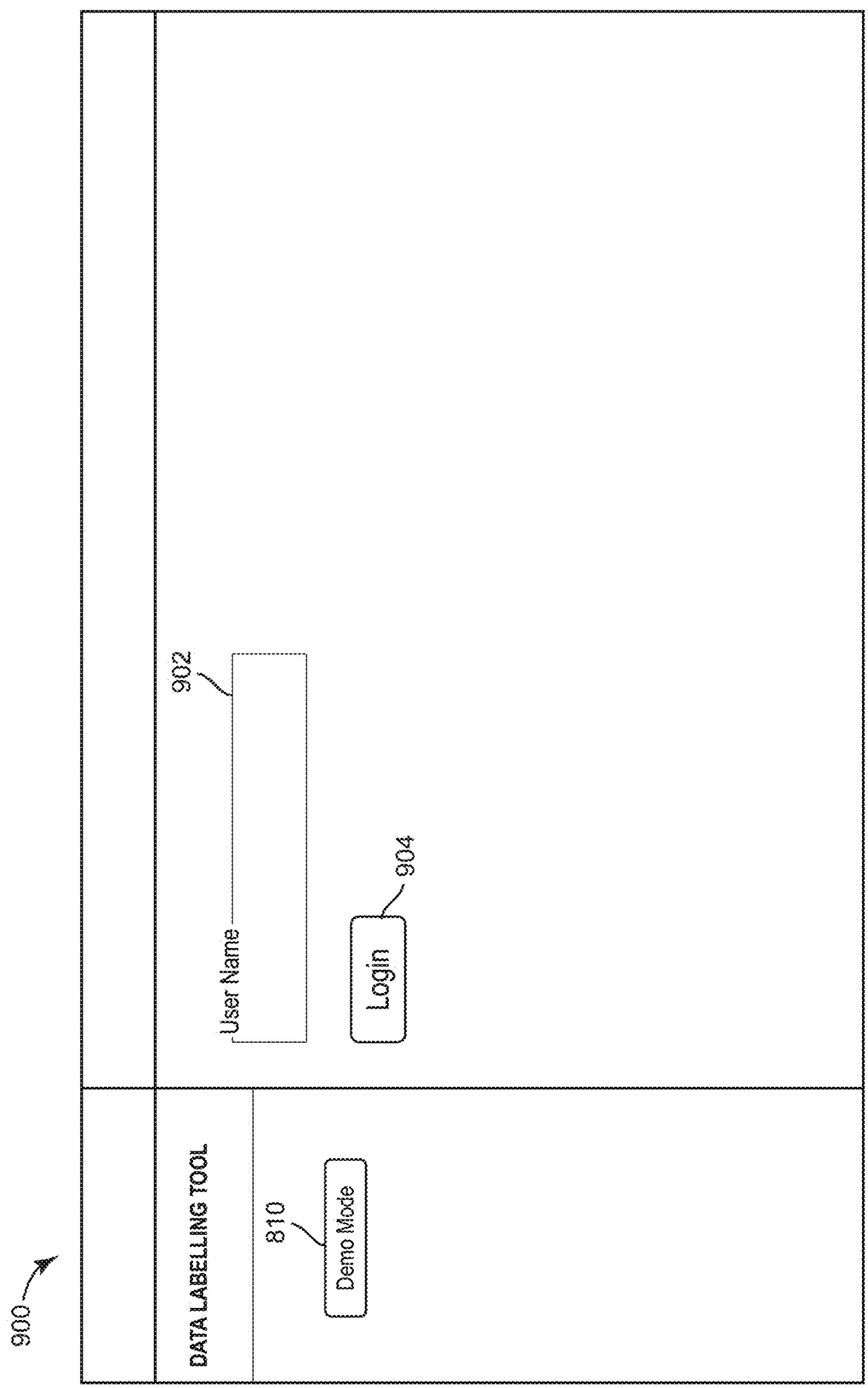
FIG. 9 is a schematic diagram of an interface for logging a user into a labelling tool for tracking the labeling of users for training the NLP engine of FIG. 6, according to an exemplary embodiment.

Referring now to FIG. 9, an interface 900 for a login page of the labeling tool is shown, according to an exemplary embodiment. The interface 900 can satisfy the requirement for data labeling that labeling must be done by multiple users to avoid bias and personal opinions, minimizing error. This login interface 900 ensures an extra security layer for the labeling tool and also making sure that multiple users and sessions work with the labeling tool. The user can enter their user name via the input box 902 and press the login button 904 to login with the user name. In some embodiments, the labeling tool determines, based on the users that have logged in and/or based on how many labels the particular user has performed, whether an appropriate diversity of user inputs has been received. In some embodiments, all the labeling activities are tied to the user that has performed the labeling. In this regard, if a particular user is identified as not properly labeling the threats, those labeling activities tied to the identified user can be removed from the dataset used to train the classification model 608.

Figure 10:
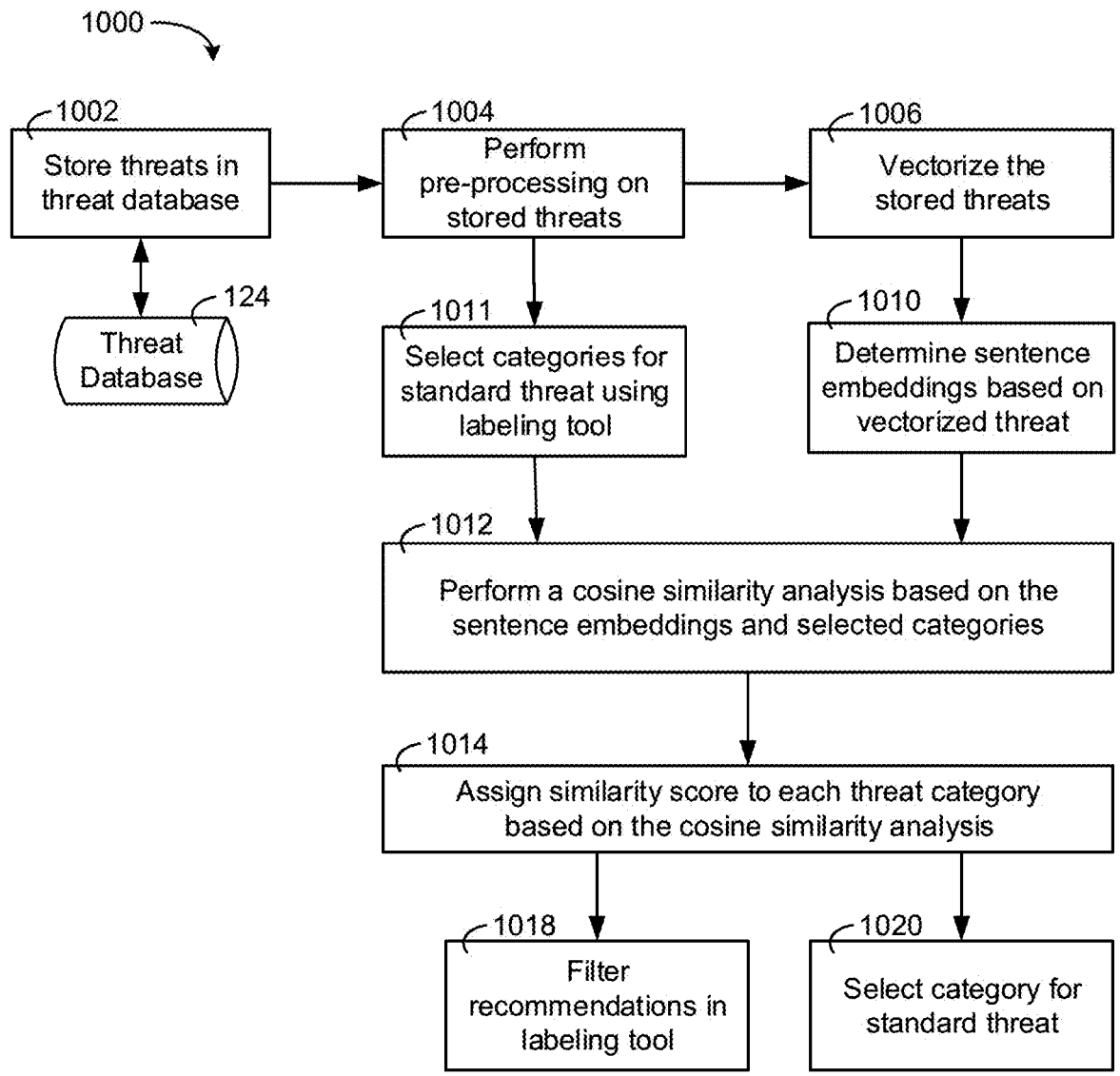
FIG. 10 is a flow diagram of a process for assigning threats to threat categories by performing a similarity analysis that can be performed by the NLP engine of FIG. 6, according to an exemplary embodiment.

Referring now to FIG. 10, a process 1000 is shown for performing a similarity analysis of threats for threat categories for use in the labeling tool as described with reference to FIGS. 8-9 is shown, according to an exemplary embodiment. The NLP engine 218 and/or alternatively the labeling tool can be configured to perform the process 1000. The similarity analysis of the process 1000 can be used to determine how similar two words or sentences are. With the recent developments in Word Embeddings there have been efficient algorithms developed to build language models out of any large corpus. Word2Vec and GloVe are the two algorithms to obtain high-dimensional vector representations of words in a corpus. The developed vector models are different for different texts because of the differences in the context and the type of expressions used specifically in that context. For example, the type of the words and expressions frequently used in on twitter are very different than the language used in a newspaper or a book. For the purpose of risk and threat modeling the language is very specific to the security operations and the specific models described herein can be used to collect and analyze the threats.

In step 1002, the threat service 122 stores received and ingested threats in the threat database 124, e.g., historical threats. The step 1002 may be the same as and/or similar to the step 702 as described with reference to FIG. 7. In step 1004, the stored threats can be pre-processed by the NLP engine 218. In some embodiments, the pre-processing includes removing stop words, periods, etc. The step 1004 can be the same as and/or similar to the step 704 as described with reference to FIG. 7.

The stored threats, in step 1006, can be vectorized by the NLP engine 218. For example, the stored threats can be fed by the NLP engine 218 into the Word2Vec. The step 1006 can be the same and/or similar to the step 710 as described with reference to FIG. 7. Word2Vec can generate a high-dimensional vector representations for the words used in the context of threats. One implementation of Word2Vec may be performed with the Python module Gensim.

The word vectors that result from perform the step 1006 can be used to obtain sentence embeddings by the NLP engine 218 in step 1010. There are multiple ways (e.g., calculating averages) to determine a sentence embedding. In some embodiments, the sentence embedding is determined according to the process described in Y. L. T. M. Sanjeev Arora, "A SIMPLE BUT TOUGH-TO-BEAT BASELINE FOR SENTENCE Embeddings," in *International Conference on Learning Representations (ICLR)*, Toulon, France, 2017.

In step 1011, a user can select one or multiple categories for a threat using the labeling tool. Based on the sentence embeddings of the step 1010 and the selected categories of the step 1018, the NLP engine 218 can, in step 1012 perform a similarity analysis (e.g., a cosine similarity analysis) to determine and assign (in step 1014) a score for each of the categories for each of the threats. For example, each threat can include a score for each of the categories.

In step 1018, the labeling tool can use the similarity score to filter which labels are recommended to a user for confirming which labels are appropriate for particular threats (e.g., suggest categories with a score above a predefined amount and/or select a predefined number of the highest scored categories). After the initial labels are put on some data that labeled data (the step 1011) that is used to calculate the similarity of those labels to the new coming threats. The most relevant labels are shown to the user and the rest of the categories are dropped from the list. This helps the user to be able to quickly identify the potential labels without getting inundated with all the possible labels. In step 1020, the NLP engine 218 can select the category and/or categories for a particular threat based on the scores (e.g., select the highest score). Using the similarity score to select the label for a threat can be used as an alternative and/or together with the classification model 608.

Figure 11:
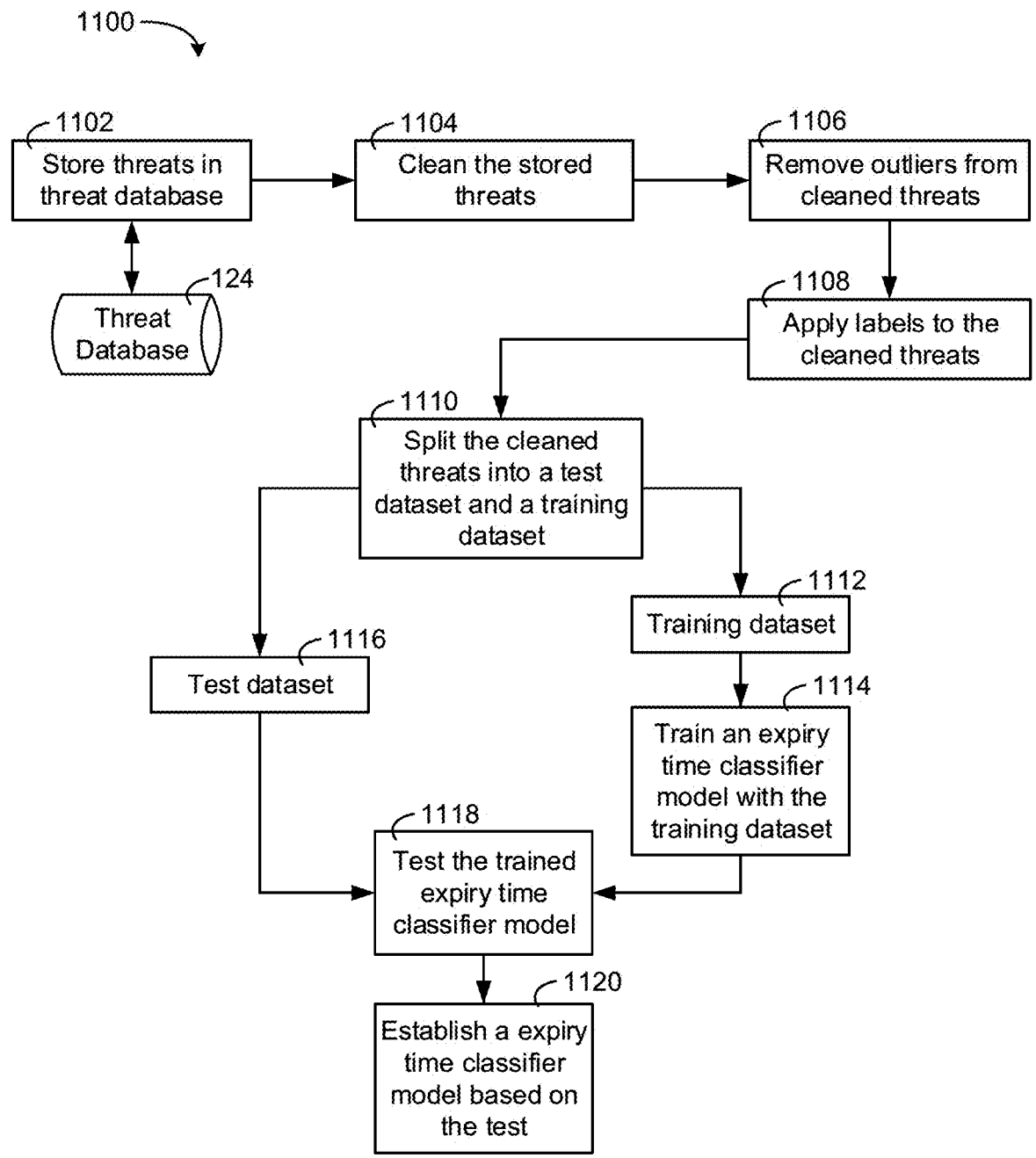
FIG. 11 is a flow diagram of a process for training a model for predicting an expiry time for a threat that can be performed by the data ingestion service of FIG. 2, according to an exemplary embodiment.

Referring now to FIG. 11, a process 1100 is shown for training the expiry time model 280 according to an exemplary embodiment. The expiry time predictor 216 and/or any other computing system as described herein can be configured to perform the process 1100. Threats can be expired after their immediate impact has been eliminated. For example, a traffic accident might have been reported by one of the data sources and then police arrive at the location of the traffic accident and deal with the situation and after few hours everything is back to normal. In the system 106, an increase in the risk score associated with that incident may be seen since the risk score may cause some delays in the transportation to one or more facilities. However, after it is completed, the system 106 can update the risk score and then remove that threat from the list of active threats.

Many data sources send out updates about the threats as they develop. After the incident has been closed, the data sources set the status of that threat to closed. This information is sometimes sent out as updates (push model) and some other times, an explicit call is required to get the status updates is needed. Depending on the data source API the implementation of the process that pulls data can be different. However, in the threat database 124 of the system 106 the records of the times when an incident was first reported and the time that it was closed or updated. Using that historical data on the incidents that are monitored, the expiry time predictor 216 can build a machine learning model that can be used for predicting the expiry time of the incidents the moment they come into the pipeline. This predicted expiry time can be used by the risk decay manager 320 and can enable users to have forecasting capability on the incidents that come in by knowing approximately how long it will take to be closed or dealt with.

In step 1102, threats are stored as historical data in the threat database 124 by the threat service 122. In step 1104, the expiry time predictor 216 can prepare the stored threats. Cleaning the stored threats can include removing the data that has missing fields, removing the data that has zero or negative expiry time. The expiry time is calculated by subtracting the time the threat was reported and the time that the threat was closed/updated. In practical applications there are always cases in which the data provided includes some inaccuracies and mistakes. The expiry time predictor 216 can verify that those are removed before using that data for training.

Other than the data that include fields that are inaccurate, there are some extreme cases that are considered outliers and those usually do not represent the trends and insights about the data. So by removing those outliers in the step 1106 by the expiry time predictor 216 it can be ensured that high quality data is used in training. A simple example for this type of data can be a false incident report. If there was a bomb threat reported by mistake but after few seconds it was removed or closed by the analyst who posted it to avoid the confusion. Those types of threats will appear with a very short expiry time which is very unusual to the other valid incidents. Thus those threats are removed by the expiry time predictor 216 is removed from further processing. The techniques used can be Modified Z-Score and Inter Quartile Range (IQR).

Regarding expiry time, the output can range from very small positive values (minutes) to very large values e.g., days. This can correspond to a variety of factors for example the type of the threat. Minor traffic incidents might take only a few minutes to be cleared but a major wild fire might take days to be dealt with. In order to build a model that predicts the exact time of the expiration, there may need to be a limit on the possible classes that a threat can belong to. By defining a set of labels based on the percentile of the expiry time the expiry time predictor 216 can label the data in step 1108. This can create many (e.g., hundreds) different type of classes that each threat can belong to. In some applications there might be less and in some there might be more classes defined. For example, a 10 class labeling distribution (e.g., a histogram analysis of expiry time) is shown in FIG. 12.

After applying the labels the data can be split in step 1110 by the expiry time predictor 216 between the training data set 1112 and the test dataset 1116. The training data set 1112 can be used to train the expiry time classifier model using supervised machine learning algorithms like Support Vector Machine, Random Forest and so on in step 1114. The test dataset 1116 can be used to test and validate the performance of the expiry time classifier model in step 1118. This process repeated until an expiry time model with satisfactory performance is determined (step 1120).

Figure 12:
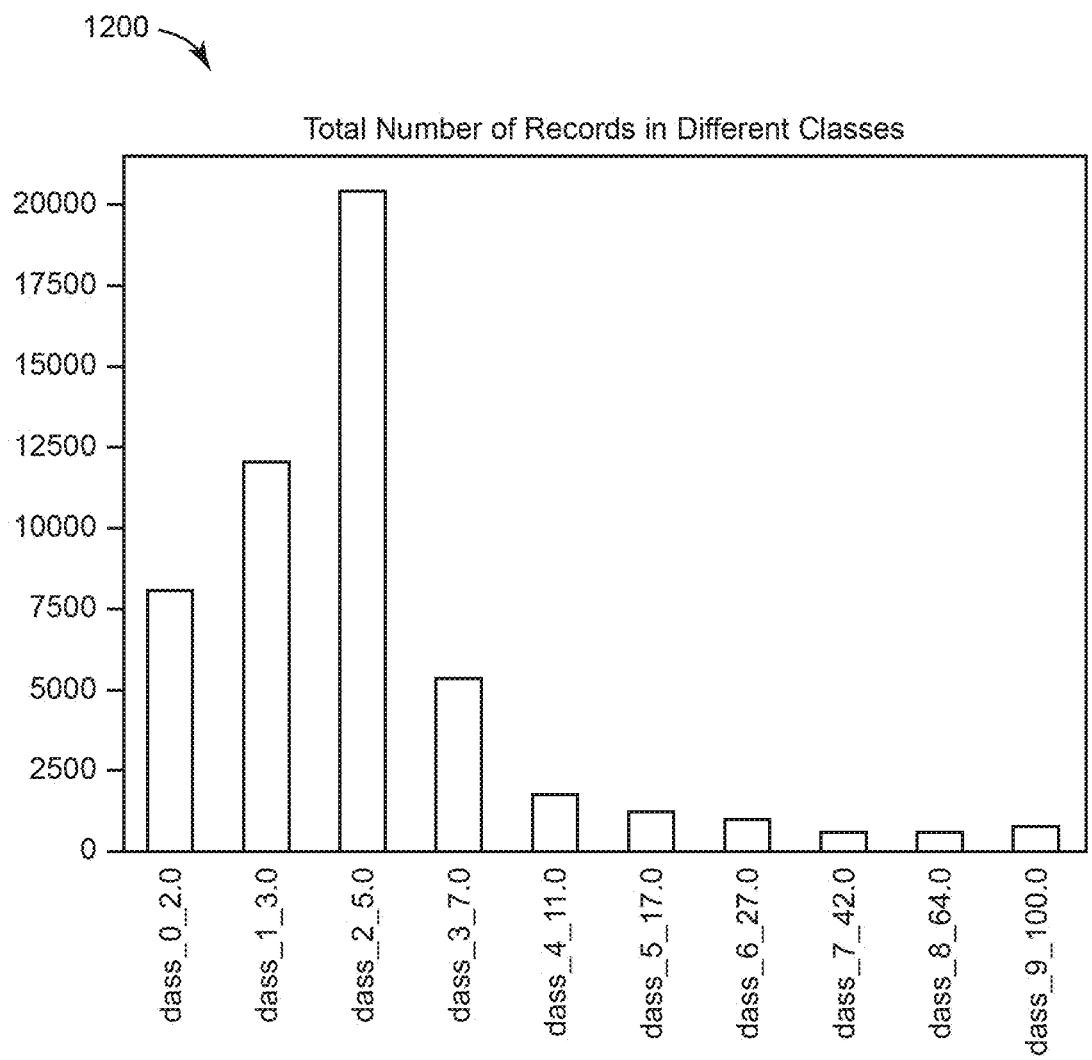
FIG. 12 is a chart illustrating a number of recorded threats with different expiry time classes, according to an exemplary embodiment.

Referring now to FIG. 12, a chart 1200 of a distribution of threats in different classes is shown, according to an exemplary embodiment. In chart 1200, 10 classes are defined based on expiry time range. For example the first class represents all the threats that have been closed less than two hours. The second class are the threats expired between 2 and 3 hours and the last classes shows the threats that expired between 64 and 100 hours.

Figure 13:
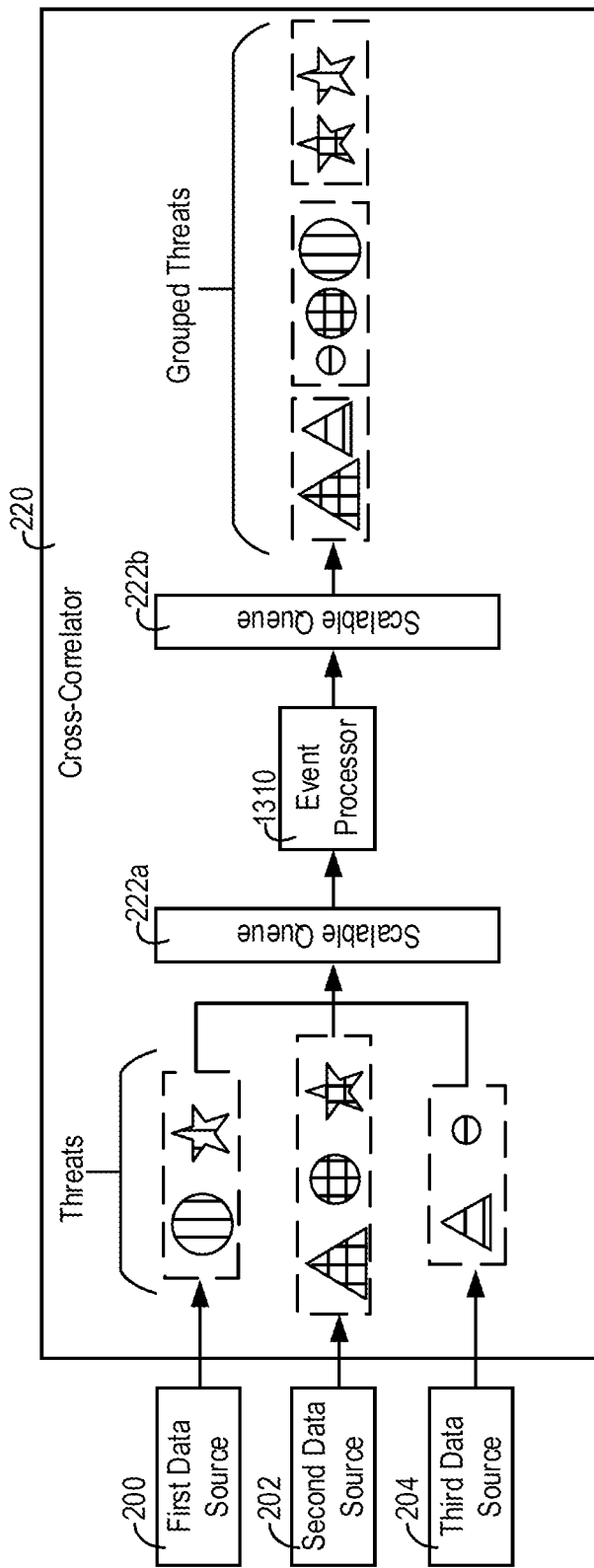
FIG. 13 is a block diagram of a cross-correlator of the data ingestion service of FIG. 2 grouping similar threats reported by different data sources, according to an exemplary embodiment.

Referring now to FIG. 13, the cross-correlator 220 is shown in greater detail, according to an exemplary embodiment. Having multiple data sources, the data sources 200-204, reporting on the incidents adds a lot of benefits on the coverage and response time. However, it also has the potential of having so many duplicate or related threats coming from multiple different channels. If the threats are not properly grouped together each incident will be treated as a new threat and will cause noise and a poor user experience for the users of the system 106. The cross-correlator 220 can be configured to identifying the related threats reported from different data sources and then grouping the threats together. This creates a unique opportunity to the applications and presentation layers to show one incident in a timeline and all the reported threats associated with that incident even if they were reported from different data sources. The cross-correlator 220 as described with reference to FIG. 13 can be scalable and can be implemented for various numbers of data sources.

Threats are reported from multiple different data sources 200-204. Although the threats are reported from three different data sources, any number of data sources can be used. The threats reported by the data sources 200-204 can be buffered in the scalable queue 222a. The threats of the data sources 200-204 are shown as different shapes to represent different threats. The circle threats reported by the data sources 200-204 each represent the same incident. Similarly the start shaped threats reported by the data sources 200 and 202 represent the same threat and likewise the triangle threats reported by the data sources 202 and 204 represents the same threat.

The cross-correlator 220 is shown to include an event processor 1310. The event processor 1310 can be configured to read the threats from the scalable queue 222a and processes the incoming threats in real-time and store them in scalable queue 222b. The event processor 1310 can be configured to implement an instance of in-memory cache to store the most recent threats. The cache provides high speed lookups and read/write capability which is required to be able to processes thousands of incoming threats reported from all the data sources. The windows of time to keep the threats in the cache can be configurable. In some embodiments, the window can be six hours of time.

The event processor 1310 can be configured to group threats together based on information of each of the threats. For example, the event processor 1310 can be configured to analyze a time that each threat was reported, a location of each threat, and a category of each threat to determine whether to group threats together or not. If all the time, location, and/or category match any of the cached threats, those threats can be grouped with the cached threats.

For the time and location a certain amount of tolerance is defined (e.g., threats with a timestamp falling within a predefined length of time from each other can be considered occurring at the same time). The tolerances can be different for different data sources 200-204, different for different types of threats, and/or based on the particular implementation of the cross-correlator 220. The event processor 1310 can implement a threat-specific tolerance for time and location. For example weather related threats may have a higher tolerance than traffic incidents. An earthquake might be reported by multiple sources more than a mile difference in the location. However, an urban traffic incident should have much less than quarter of a mile in difference.

Figure 14:
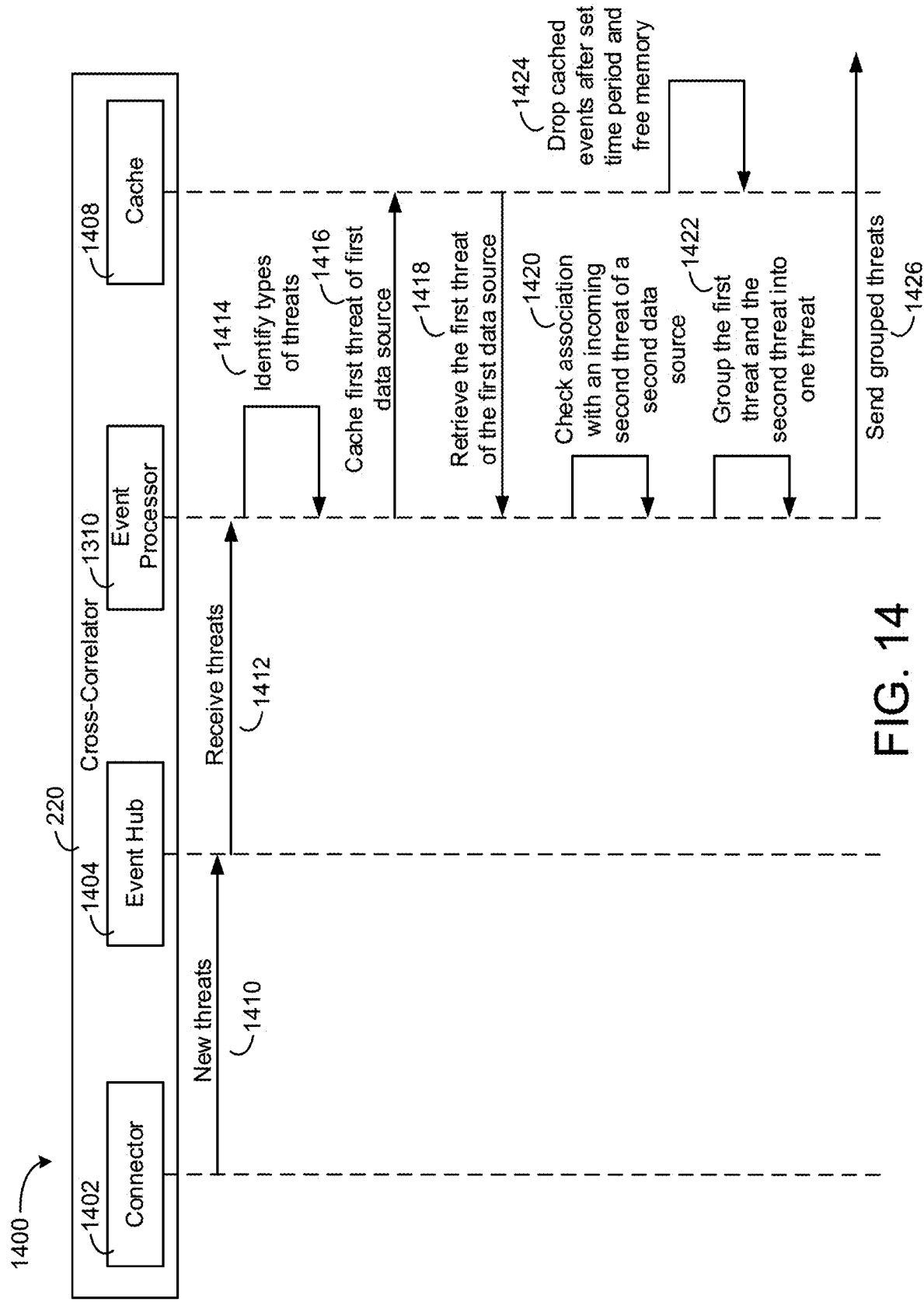
FIG. 14 is a flow diagram of a process for cross-correlating similar threats reported by different data sources that can be performed by the cross-correlator of FIG. 13, according to an exemplary embodiment.

Referring now to FIG. 14, a process 1400 is shown for grouping the same threats together, according to an exemplary embodiment. The cross-correlator 220 can be configured to perform the process 1400. The sequence of events that happen after data is received from two separate data sources; a first data source and a second data source are shown in FIG. 14. Various components of the cross-correlator 220 are shown in FIG. 14, a connector 1402, an event hub 1404, a stream processor 1406, and a cache 1408 (e.g., a redis cache or any other type of cache) can be configured to perform the steps of the process 1400.

In step 1410, the connector 1402 can receive new threats from the data sources 200-204 and forward the new threats to an event hub 1404. The event hub 1404 can provide the new threats to the event processor 1310 in step 1412. The event processor 1310 can identify, in step 1414, a type of each of the threats. The threats received by the event processor 1310 may be standard threats that have been processed by the data ingestion service 116 and can include an indication of the identity of each of the threats.

In step 1416, the event processor 1310 can store the threats in the cache 1408. Particularly, the event processor 1310 can store a first threat of the first data source 200 in the cache 1408. In step 1418, the event processor 1310 can retrieve the first threat from the cache 1408. The step 1418 can be performed periodically and/or in response to receiving a second threat from the second data source 202. In step 1420, the event processor 1310 can compare the second threat with the first threat to determine if there is an association, i.e., both threats describe the same incident. The event processor 1310 can determine whether both threats describe the same threat type. The association can be determined by analyzing a time of occurrence of each threat. The event processor 1310 can determine whether the threats occur within a predefined length of time from each other. The length of the predefined time can be dependent on the type of threats of each of the threats.

Furthermore, the event processor 1310 can analyze the location of the threats. If the threats have a reported location that is within a predefined distance from each other, the threats can be considered to have occurred at the same location. For example, the predefined distance can be a half mile, a mile, ten miles, etc. The distance can be different for different types of threats. In response to determining that the type, time, and/or location of the first threat and the second threat are the same, the event processor 1310 can determine that the threats are the same threat and should be associated and grouped.

In step 1422, the event processor 1310 can group the threats together into a single threat. The grouped threats can be added back into the cache 1408 and/or forwarded on to other components of the system 106, e.g., the geofence service 118 in step 1426. The grouped threats can be again compared to new threats so that two or more threats can be grouped together. In step 1424, cached threats can be dropped after a set period of time occurs and the cache memory can be set to free memory. In some embodiments, each of the threats has an expiry time or otherwise there is a set expiry time for the cache 1408. In response to the time occurring, the threat can be dropped from the queue.

Referring again to FIG. 1, the geofence service 118 can be configured to route potential threats that are geographically in the close range of assets. The geofence service 118 can process the incoming threats in real-time. For every reported threat ingested by the data ingestion service 116 and provided by the data ingestion service 116 to the geofence service 118, the geofence service 118 can, for that threat for all assets are retrieved to be checked, to find if there is any asset that has a geofence that has been violated by that threat. If no geofence has been violated, the geofence service 118 can be configured to drop the threat and not forward the threat to the risk analytics pipeline 120. Instead, the geofence service 118 can store the threat as a historical threat within the threat database 124. However, if there was any asset that was close enough to the threat, i.e., the geofence of the asset was violated by the threat, the geofence service 118 can be configured to route the threat to the RAP 120 and/or store the threat within the threat database 124. In case of multiple assets impacted by a threat, the geofence service 118 can be configured to duplicate the threat for each of the multiple assets and send the multiple threats to the RAP 120 so that the RAP 120 can processes one threat per asset at a time.

The geofence settings can be different for each asset for different threats. Some threats are considered "far" if the distance between the threat and the asset is more than 10 miles and some other threats to be considered "far" that setting might be 40 miles for example. Natural disasters usually have much larger range of impact than minor urban incidents. That is why the geo-fences defined for assets can be per threat type.

Figure 15:
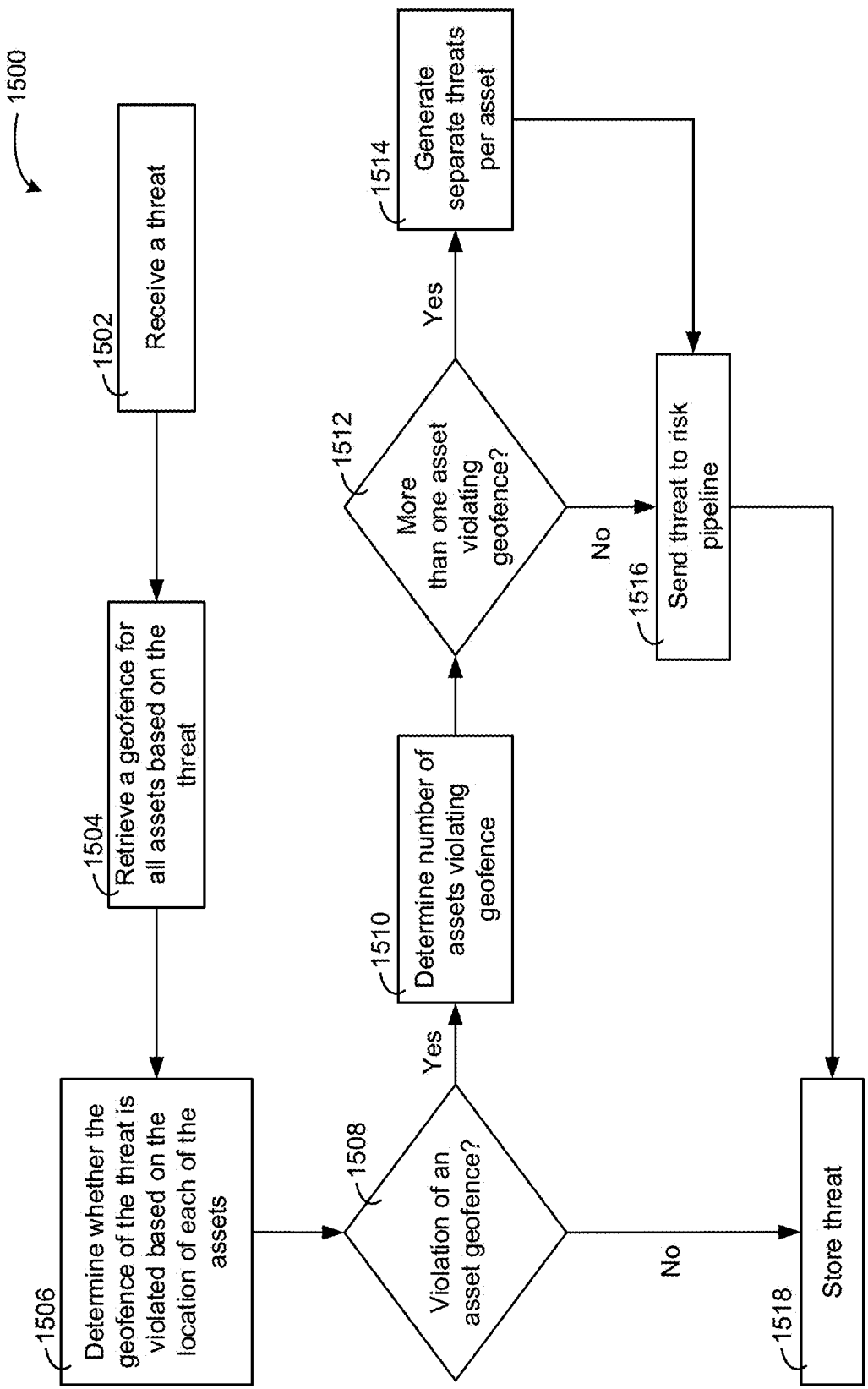
FIG. 15 is a flow diagram of a process for performing geofencing to determine whether a threat affects an asset that can be performed by the geofence service of FIG. 1, according to an exemplary embodiment.

Referring now to FIG. 15, a process 1500 is shown for determining whether a threat affects a particular asset, according to an exemplary embodiment. The geofence service 118 can be configured to perform the process 1500. Furthermore, any computing device as described herein can be configured to perform the process 1500. In step 1502, the geofence service 118 can receive a threat. The threat can be received by the geofence service 118 from the data ingestion service 116.

In step 1504, the geofence service 118 can retrieve a geofence for each of a collection of assets based on the threat. The geofence service 118 may store, or otherwise retrieve from a different data store, a particular geofence for each of multiple assets. The geofence may be particular to both the threat and the asset itself. For example, the geofence may be a particular size and/or geometric based on a severity of the threat, a type of the threat, a type of the asset, and/or a vulnerability of the asset to the particular threat. The geofence may be a particular geographic boundary surrounding each of the assets.

In step 1506, the geofence service 118 can determine whether a geofence of each of the assets is violated by a location of the threat. Since the threat can include an indication of location, the geofence service 118 can determine whether each of the geofences of the assets is violated by the location of the asset, i.e., whether the location of the threat is within the geofence of each of the assets. The result of step 1506, the determination whether each of the asset geofences are violated by the threat, can cause the geofence service 118 to perform steps 1508-1516 for each of the assets.

Considering a particular asset, if, in step 1508, there is a determination by the geofence service 118 (step 1506) that the threat violates the geofence of the particular asset, the process moves to step 1510. If the geofence of the particular asset is not violated by the threat, the process moves to step 1518. In step 1518, the geofence service 118 stores the threat. Storing the threat can include, causing, by the geofence service 118, the threats service 122 to store the threat in the threat database 124. The geofence service 118 may only perform the step 1518 if none of the assets have a geofence violated by the threat.

In step 1510, the geofence service 118 can determine the number of geofences of assets that are violated by the threat. If, more than one asset has a geofence violated by the threat, step 1512, the geofence service 118 can perform step 1415. If only one asset is associated with a geofence that has been violated, the process can proceed to the step 1516.

In step 1514, the geofence service 118 can generate separate threats for each of the assets that have a geofence violated by the threat. For example, each of the threats can be paired with a particular asset to form an asset-threat pairing. In step 1516, the geofence service 118 can send all the threats, either original or generated in the step 1514, to the RAP 120.

Figure 16:
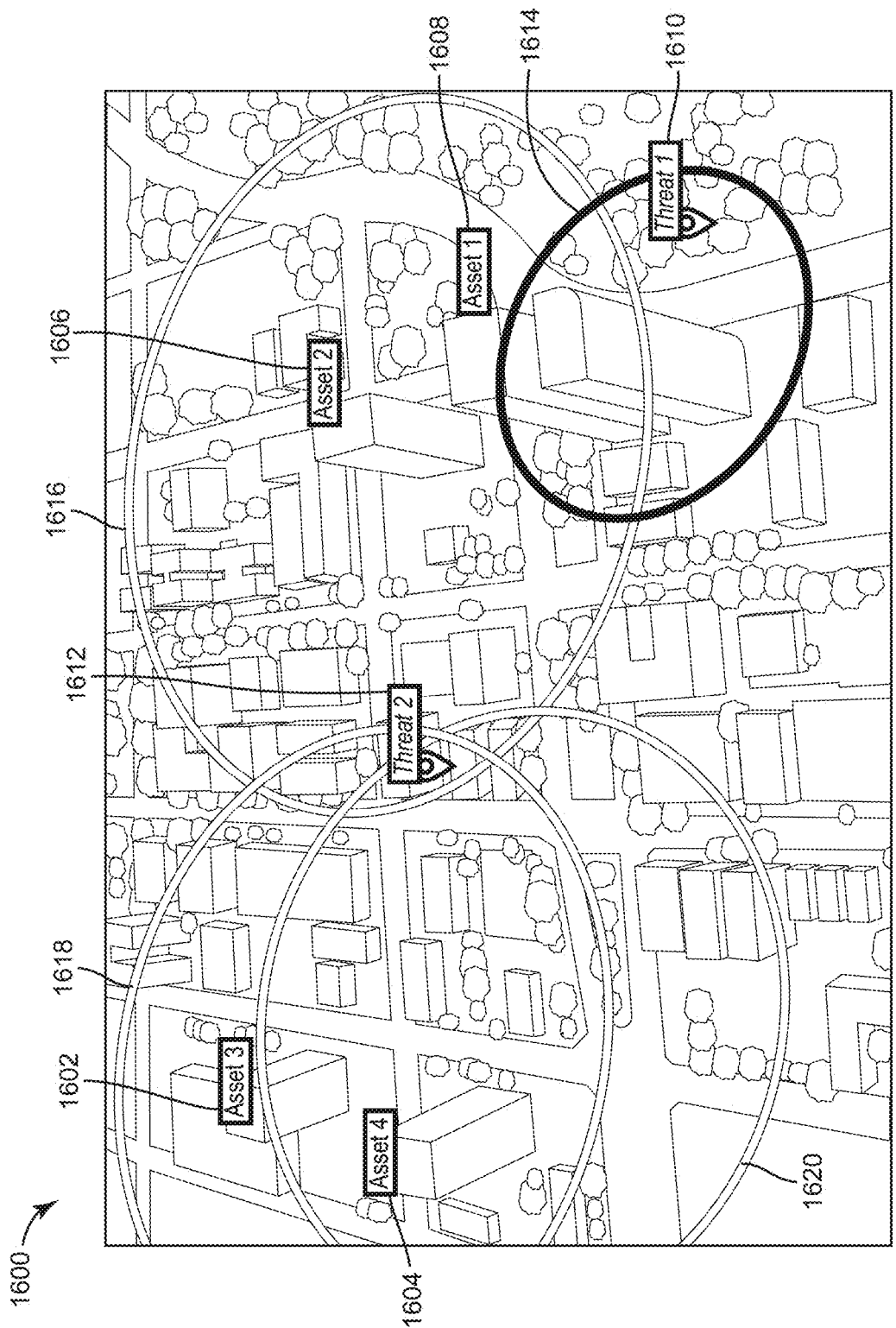
FIG. 16 is a schematic drawing of a city with multiple assets and threats, each asset being associated with a geofence, according to an exemplary embodiment.

Referring now to FIG. 16, a drawing 1600 of a city including multiple building assets and two different threats is shown, according to an exemplary embodiment. As shown in FIG. 16, asset 1602, asset 1604, asset 1606, and asset 1608 are each associated with a respective geofence, the geofences 1618, 1620, 1616, and 1614 respectively. The geofences 1614-1620 are shown to be various sizes. The sizes of each of the geofences can be associated with the type of the particular asset, the type of a particular threat (e.g., the threat 1612 and/or the threat 1610), a severity of the threat, a type of the threat, and/or a vulnerability of the asset to the threat. In some embodiments, where there are multiple threats, the geofence can depend in size based on a combination of the multiple threats.

Threat 1612 is shown to violate the geofences 1618, 1620, and 1616. In this regard, the geofence service 118 can replicate the threat 1612 so that there is a corresponding threat for each of the assets 1602, 1604, and 1606. Furthermore, the threat 1610 is shown to violate a single geofence, the geofence 1614 but no other geofences. In this regard, the geofence service 118 does not need to replicate the threat 1610 but can pair the threat 1610 with the asset 1608.

In some embodiments, the threats 1612 and/or 1610 can be associated with their own geofences. The geofences can be included within the threats 1612 and/or 1610 and can be extracted by the geofence service 118. In some embodiments, the geofence service 118 can generate the geofences for the threats 1612 and/or 1610 based on a severity of the threat and/or a type of the threat. The geofence service 118 can determine what asset geofences intersect with the threat geofences. The area of intersection can be determine by the geofence service 118 and used to determine whether the asset is affected by the threat and/or whether the severity of the threat should be adjusted for the threat. In some embodiments, if the intersection area is greater than a predefined amount (e.g., zero), the threat can be considered to violate the geofence. However, based on the area of the intersection, the severity of the geofence can be adjusted. For example, particular areas can be associated with particular severity levels and/or particular adjustments to an existing severity level so that the severity level of a threat can be tailored specifically to each of the assets associated with geofences that the threat violates.

Referring again to FIG. 4, the RAP 120 is shown for performing risk analytics on threats and/or assets. Processing and enrichments that are performed after the enrichment performed by the geofence service 118 can be performed by the RAP 120. The RAP 120 can be configured to generate risk scores for the threats based on features of the threats and/or assets and/or relationships between the threats and/or the assets.

The risk engine 310 of the RAP 120 can be configured to generate risk scores for the threats via a model. The model used by the risk engine 310 can be based on Expected Utility Theory and formulated as an extended version of a Threat, Vulnerability and Cost (TVC) model. The risk engine 310 can be configured to determine the risk scores on a per asset basis. The threats can all be decoupled per asset in the processing pipeline as well as the calculation of the risk. For example, if a protest or weather condition is created alerts towards multiple buildings, separate alerts per building will be generated based on the geo-fences of the building and the detected alert. This will insure that the RAP 120 can horizontally scale as the threats are introduced to the system. The model used by the risk engine 310 can be, $$Risk_{Asset}(t) = \left( \sum_{i=1}^{n} |S_i(t) \times T_i(t) \times D_i \times V_i(threat_i, Asset)|^p \right)^{\frac{1}{p}} \times C_{Asset} \times \rho(t)$$

where, $T_i(t)$ is the probability of threat or attack threat at time t, $S_i$ is the severity of the $threat_i$ at time t, $V_i(threat_i, Asset)$ is the vulnerability index of that Asset against threat_i, $C_{Asset}$ is the cost or consequence of losing that asset, $p \geq 1$ is a positive value associated with the p-norm, and $D_i$ is the weight corresponding on the geographical proximity (distance) of the threat i to the asset. $\rho(t)$ is the decay factor for the risk score.

There can be two sets of parameters in the formula for risk calculation. The first set of parameters can be from the threat and the second is about the asset impacted by that threat. The list of the threat categories can be different in different applications. But some of the most popular categories are Weather, Terrorism, Life/Safety, Access/Intrusion, Theft/Loss, Cybersecurity, and Facility. The model is not limited to specific type of threats and can be updated as new sources of threats are introduced. There are certain threat parameters that play an important role on the level of risk they potentially impose on the assets.

Severity of the threat refers to the intensity of reported incidents independent of the impact on assets. Notice that other measures like geographical distance will play a role on the risk besides the severity. However, severity is focused on the intensity of the threat itself. For example in case of a hurricane its severity can be measured by the category level of the hurricane. It might not even be a major risk if it is too far from assets or if the assets are tightened with protective measures.

One of the parameters in the threat is the probability of actually threat occurring ($T_r(t)$). This topic brings us to the concept of predictive and reactive risk. If the time in the risk formulation refers to a future time, that risk is considered to be predictive. To be able to estimate or predict the risks in a future time, the system 106 should be configured to predict the parameters involved in the calculation specially the potential threats and their severity in a future time. Some data sources that report the threats include threats that are expected to happen in future. Threats like planned protests, threats of violence or attacks and so on fall under the category of predictive risk. Those predictive threats will be used to train ML models to estimate the validity of the threats. On the other hand, the threats that have already happened and reported fall under reactive risk.

Referring now to FIG. 17, a VT matrix 1700 is shown, according to an exemplary embodiment. Each asset might be vulnerable towards one or multiple different threats. Studying the assets to understand the vulnerabilities and the threats impacting the asset is one of the first major tasks in the real implementation of a risk analytics project. For example, if it is assumed that different buildings are the assets, one might find some buildings are by the water and they are vulnerable towards flooding. But, another building might not have this vulnerability because of the measures taken into account in the construction or basically the location of that building. The risk model as described above takes into account the specific characteristics of the assets in terms of vulnerabilities against each of the threats that are supported in the system. For practical implementations the VT matrix 1700 can be developed and/or stored all assets.

The matrix will include all the threats that are supported in the system. VT matrix will be a n×m matrix for, m assets exposed to n different threats. The values can be between 0-1 showing no vulnerability to full vulnerability. In some embodiments this can be further simplified to a binary matrix considering only values of 0 and 1. But, in some other embodiments any range between [0, 1] can be applied.

Regardless of the imminent threat and its nature, the value of the asset is important in evaluating the risk to the owner. The asset value becomes more important when a company has multiple types of assets with different functionality and responsibilities. Some of them might be strategic and very valuable. But, others might be smaller and less valuable compared to the others. Asset assessment includes the asset cost estimation besides vulnerability assessment. The result of the asset value assessment is translated to a number between 1 to 10 in the risk model to represent the least to most valuable assets.

In any given point in time an asset might be exposed to multiple threats. There might be heavy rain and major traffic accidents at the same time. To be able to combine the effect of the threats the formulation includes a p-norm to combine the threats. p could be any positive integer in the formula. Here, 2 and infinity are considered as possible values. 2-norm might not be a good metric for analyzing the multiple sources of threats since it will decrease the impact of the highest threats. ∞-norm can be a good or the best option, since it focuses on the highest degree of the risk.

The calculated risk can corresponding to dynamic risk score. The risk score can gradually decay until the threats are expired. $\rho(t)$ can be the decay factor that is multiplied to the risk score based on a decay model.

Figure 18A:
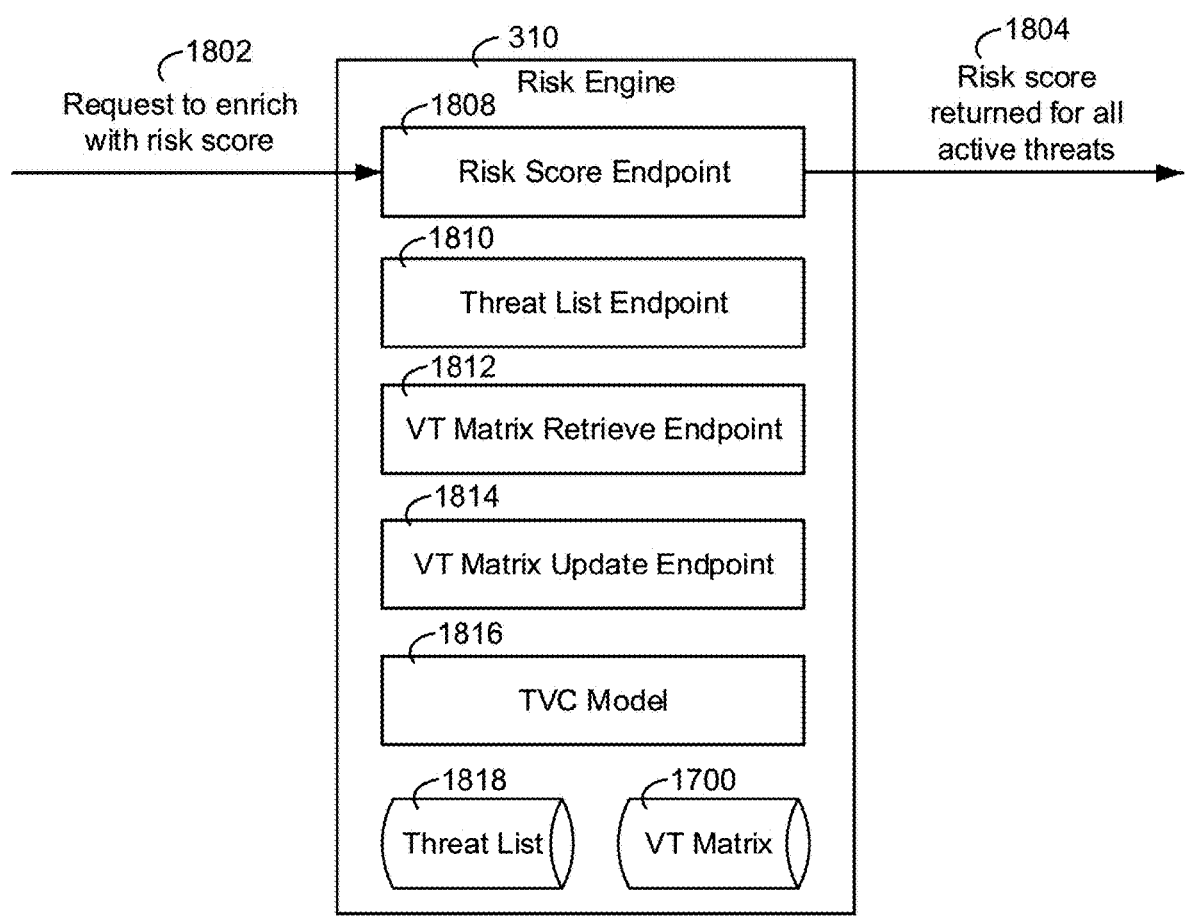
FIG. 18A is a block diagram of a risk engine for determining risk values with a threat, vulnerability, and cost (TVC) model, according to an exemplary embodiment.

Referring now to FIG. 18A, the risk engine 310 is shown in greater detail, according to an exemplary embodiment. The risk engine 310 is shown to receive a request to enrich an asset with a risk score, message 1802, and can generate and/or return a risk score in response to the request, i.e., response 1804.

The risk engine 310 is shown to include a TVC model 1816. The TVC model 1816 can be the TVC model as shown and described above. The risk engine 310 can expose the TVC model 1816 to the outside world via an API. The API can be a REST API. The API can provide four endpoints; a risk score endpoint 1808, a threat list endpoint 1810, a VT matrix retrieve endpoint 1812, and a VT matrix update endpoint 1814.

The risk score endpoint 1808 can be an endpoint used to return the risk score for the incoming threats. At this stage of the pipeline the threats are identified to be at the vicinity of at least one of the assets and also they are enriched with the asset details. The threat list endpoint 1810 can retrieve the list of all the threats that are recognized by the risk engine. The list is the master list of all the threats from all the data sources that report threats to the system. The VT matrix endpoints can be two endpoints here to retrieve and modify the VT matrix settings. The risk engine 310 is shown to include a threat list 1818 and a VT matrix 1700. The threat list 1818 can be a list of all the threats that the risk engine 310 needs to processes. The VT matrix 1700 can be a matrix of the vulnerability parameters for specific threats, e.g., as shown in FIG. 17. The risk engine 310 can query the VT matrix 1700 with an indication of a threat and an asset to retrieve the vulnerability parameter for the particular asset and threat.

Referring again to FIG. 4, RAP 120 is shown generating the dynamic risk 332 and the baseline risk 334. The dynamic risk 332 can represent the real-time activities and the possible risk on the assets. The baseline risk 334 can provide an indication of the long-term risk scores for an asset or a geographical area. The baseline risk 334 reveals the trends in the historical data. For example, the baseline risk 334 can be used to analyze which assets or neighborhoods are exposed to natural disasters like Hurricanes or areas that are more crime prone. A good combination of the two scores provides a good understanding for analyzing risk. The dynamic risk 332 can provide situational awareness while the baseline risk 334 score can be used for analyzing long term trends on an asset or neighborhood. Baseline risk is calculated by the running batch processes and the dynamic risk is calculated by the risk engine.

Figure 21:
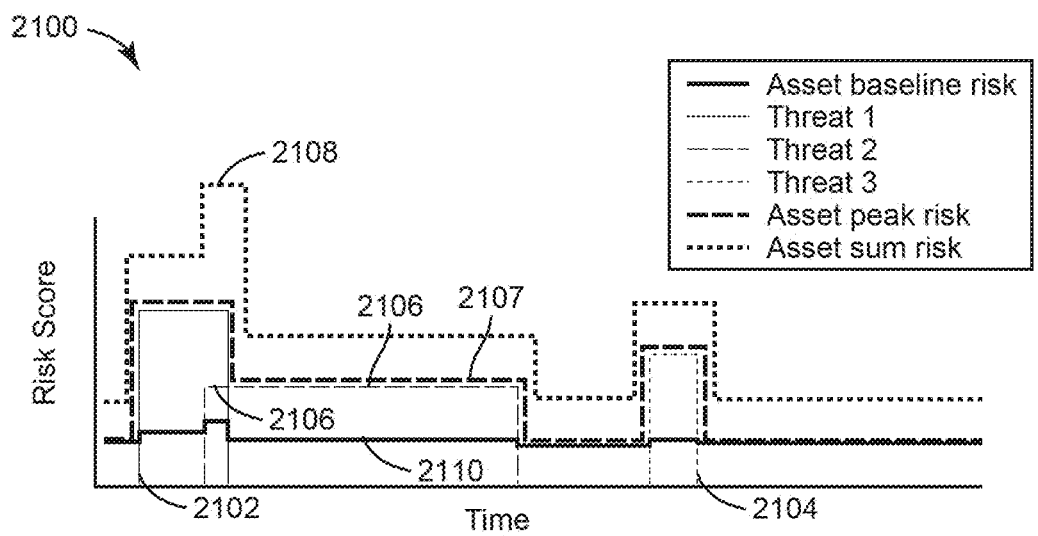
FIG. 21 is a chart illustrating risk scores over time without decaying the risk values, according to an exemplary embodiment.
Figure 22:
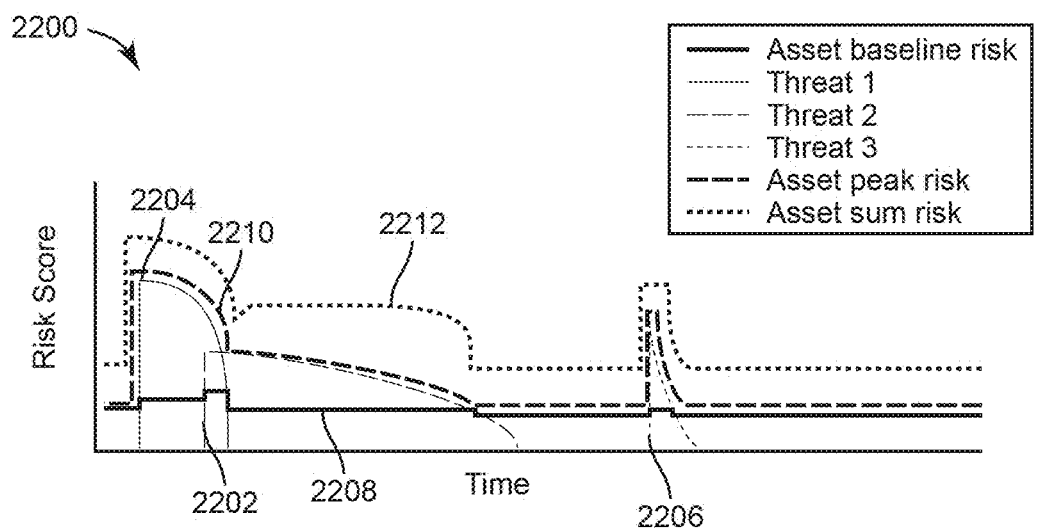
FIG. 22 is a chart illustrating risk scores being decayed over time, according to an exemplary embodiment.

Still referring to FIG. 4, RAP 120 is shown to include the risk decay manager 320 and the threat expiration manager 322 which can be configured to decay risk scores over time and expire risk scores. The dynamic risk 332 can keep track of all the active threats that have an impact on the assets in any given point in time. Many data sources only provide information on the binary state of a threat that is reported. The threat can be "open" or "closed." There is no information on the predicted duration of the threat to remain active before it is closed. The RAP 120 can be configured to develop machine learning models to enable predicting the expiry time for any threat (e.g., via the threat expiration manager 322). The expected duration for any threat can be used by the RAP 120 to reflect this information to a security analyst by showing the transition period to a closed state. This gradual decay can be performed by the risk decay manager 320 by applying a decay model that suits the nature of that threat. FIGS. 21 and 22 provide an illustration of risk decay for three threats impacting an asset along with the dynamic risk score resulted from each threat with and without risk decay.

Referring generally to FIGS. 18B-18F, systems and methods are shown for dynamically analyzing weather data to generate asset risk scores, according to various exemplary embodiments. Weather data can be used to generate a risk score by analyzing and contextualizing weather data (e.g., temperature, humidity, wind speed, snow fall, rain fall, etc.) and to dynamically model correlations between multiple weather threats, and/or between one or more weather threats, non-weather threats, and/or one or more other types of threats, and estimate weather and/or non-weather related risks. In some implementations, the systems and methods may determine anomalous weather conditions based on historic weather data.

The systems and methods discussed with reference to FIGS. 18B-18F can analyze weather data and generate (or receive) weather threat events for extreme environmental conditions. Extreme environmental conditions may be conditions where an environmental value exceeds a predefined amount or are outside a predefined range (e.g., a high humidity, a high or low temperature, etc.). As an example, a temperature below 40 degree Fahrenheit (or 10 degrees Fahrenheit, 0 degrees Fahrenheit, −10 degrees Fahrenheit, etc.) or above 130 degree Fahrenheit (or 100 degrees Fahrenheit, 110 degrees Fahrenheit, 120 degrees Fahrenheit, etc.) can be considered an extreme temperature which may be dangerous for humans. Such a threat event can contribute to a high risk score. Similarly, wind speed higher than 30 miles per hour (mph) or 40 mph could also be treated by the systems and methods discussed herein as extreme an weather condition. Furthermore, snow fall or rain fall in an amount greater than a predefined amount can be treated as an extreme weather condition.

The systems discussed with reference to FIGS. 18B-18F can be configured to analyze combinations of extreme weather events, i.e., weather events that occur simultaneously. For example, the systems described with reference to FIGS. 18B-18F can be configured to determine, for a very low temperature and a simultaneously occurring very high snow fall, a risk score greater than a risk score determined for the temperature or snow fall individually. The systems and methods can determine, for two, three, or more simultaneous weather related threat events a compounded threat event score based on the correlations between the simultaneously occurring threat events.

Furthermore, the systems and methods discussed herein can be configured to analyze historical data to determine if there is a weather related condition occurring that would not normally occur. A facility or city may not be prepared to respond to an extreme weather related condition if the extreme weather related condition rarely occurs at the facility. The systems and methods could determine whether a weather condition is abnormal based on analyzing historical data (e.g., historic temperature ranges, snow fall amounts, etc.) for a predefined amount of time in the past (e.g., the past five years). If the weather condition is abnormal, a risk score can be generated based on the abnormal weather condition such that the value of the risk score is increased due to the abnormality of the weather condition. For example, if it has not snowed in Atlanta in the month of October in past 5 years, and suddenly for a particular year it does snow in Atlanta in October, the systems and methods described herein could generate an increased risk score for the snow fall since the city of Atlanta may not have the infrastructure (e.g., snow plows, response personnel, etc.) to handle the snow fall.

Furthermore, weather data can be enriched or cross-correlated with non-weather related events. For example, if there is a major event at a building (e.g., a party, a large meeting, etc.) and there is a high snow fall, a risk score for the building or and occupants of the event can be compounded to account for additional dangers which may occur due to the high population being subjected to the weather event.

Figure 18B:
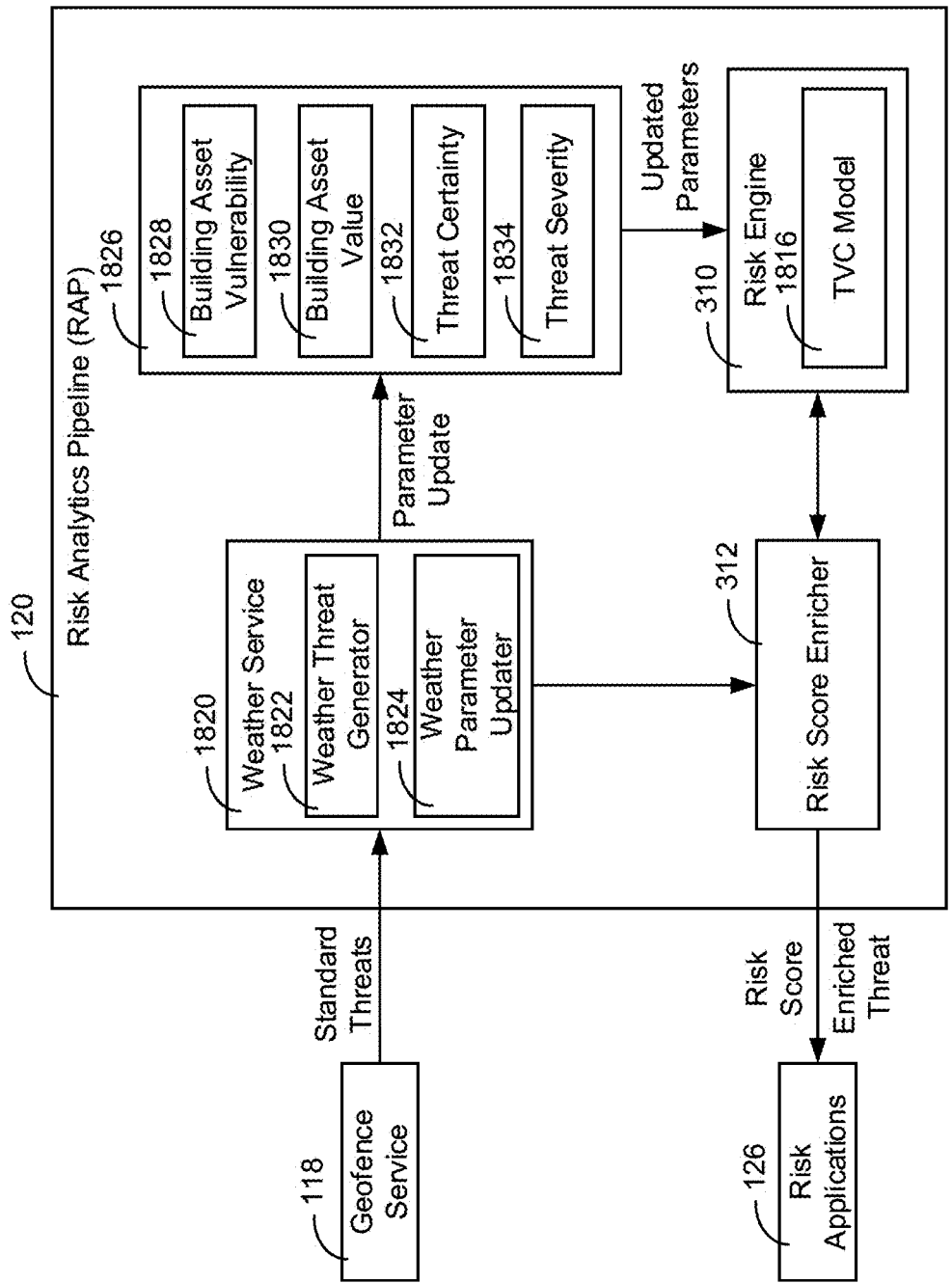
FIG. 18B is a block diagram of the RAP of FIG. 1 including a weather service configured to adjust threat parameters of dynamically generated risk scores based on weather data, according to an exemplary embodiment.

Referring more particularly to FIG. 18B, the RAP 120 is shown in greater detail for dynamically generating risk scores by adjusting risk score parameters 1826 based on weather data, according to an exemplary embodiment. The RAP 120 is shown to receive standard threatsd from the geofence service 118 (e.g., threats received from third party data sources, building data sources, etc. Based on the received data, the RAP 120 can be configured to generate risk scores for an asset based on weather related threat events and further based on correlations between multiple simultaneously occurring weather based threat events and/or other non-weather related threat events.

The standard threats received from the geofence service 118 can be threats originally generated by the data sources data sources 102 and can be weather threats such as high or low temperature, a hurricane, a tornado, a snow storm, etc. and/or any other threat e.g., a riot, a protest, etc. The data sources 102 can be a weather service data source (e.g., Accuweather).

In some embodiments, the data received by the RAP 120 is not directly a threat event. In some embodiments, the weather threat generator 1822 can analyze weather data to generate weather threat event. For example, the weather threat generator 2208 can determine if a temperature of received weather data is above or below predefined amounts (e.g., above 130 degrees Fahrenheit or below 40 degrees Fahrenheit or 0 degrees Fahrenheit). This may be indicative of an extreme temperature condition and the weather threat generator 2208 can generate a weather threat event. Similarly, if wind speed is above or below predefined amounts, an extreme wind speed threat event can be generated by the weather threat generator 1822. For example, if wind speed is above 30 or 40 miles per hour, an extreme high wind speed threat event can be generated. Similarly, if an air quality metric (e.g., an AQI) for a city or area is worse than (e.g., above) a predefined amount, an extreme high air quality index threat event can be generated.

The weather threat generator 1822 can be configured to analyze the weather threat event data and update parameters of the parameters 1826 based on the received data via a weather parameter updater 1824. The weather parameter updater 1824 can be configured to analyze one or multiple weather related threats together to determine whether one threat event increases the severity of another threat event. For example, if one threat event indicates that there is heavy snow precipitation and another threat event indicates that there are extremely low temperatures, a particular building asset (e.g., a person, a building, etc.) may be at a high risk. Therefore, the weather service 1820 can increase a risk score of an asset by increasing the threat severity parameter 1834 so that the threat severity of the heavy precipitation increases to account for both heavy snow and extremely low temperatures.

The weather parameter updater 1824 can be configured to correlate various extreme weather related conditions together to determine whether the risk score should be compounded based on the presence of multiple extreme weather conditions. For example, if there is high temperature and/or high humidity in addition to poor air quality, a high temperature threat event may have an increased risk score since the high humidity and/or poor air quality can increase the danger of the high temperature. Based on combinations of extreme weather conditions, the parameters 1826, specifically the threat severity 1834 can be adjusted so that the risk score generated by the risk engine 310 is increased (e.g., compounded) based on the presence of multiple threat events indicating extreme weather conditions.

The risk engine 310 can, for each of multiple assets, be configured to generate a risk score with the TVC model 1816. The risk engine 310 can be configured to generate a risk score for the asset based on multiple simultaneously occurring threat events. For each threat event for the asset, the risk engine 310 can be configured to generate a set of risk scores. The risk score enricher 312 can be configured to select the risk score with the highest value from the set of risk scores and use the highest valued risk score as the asset risk score. The asset risk score can be provided to the risk applications 126 for presentation to an end user. Based on the TVC model 1816 and parameters 1826, a risk score for each threat event of a particular asset can be determined.

In some embodiments, the RAP 120 can be configured to analyze risk scores or other received data over a period of time (e.g., a year) to identify trends in the asset risk scores, identify anomalies in the trends, generate a new alarm (e.g., a synthetic event), determine risk scores averaging, and/or perform risk score forecasting (e.g., predictions). Examples of analyzed risk scores are shown in FIGS. 18D-18E.

Figure 18C:
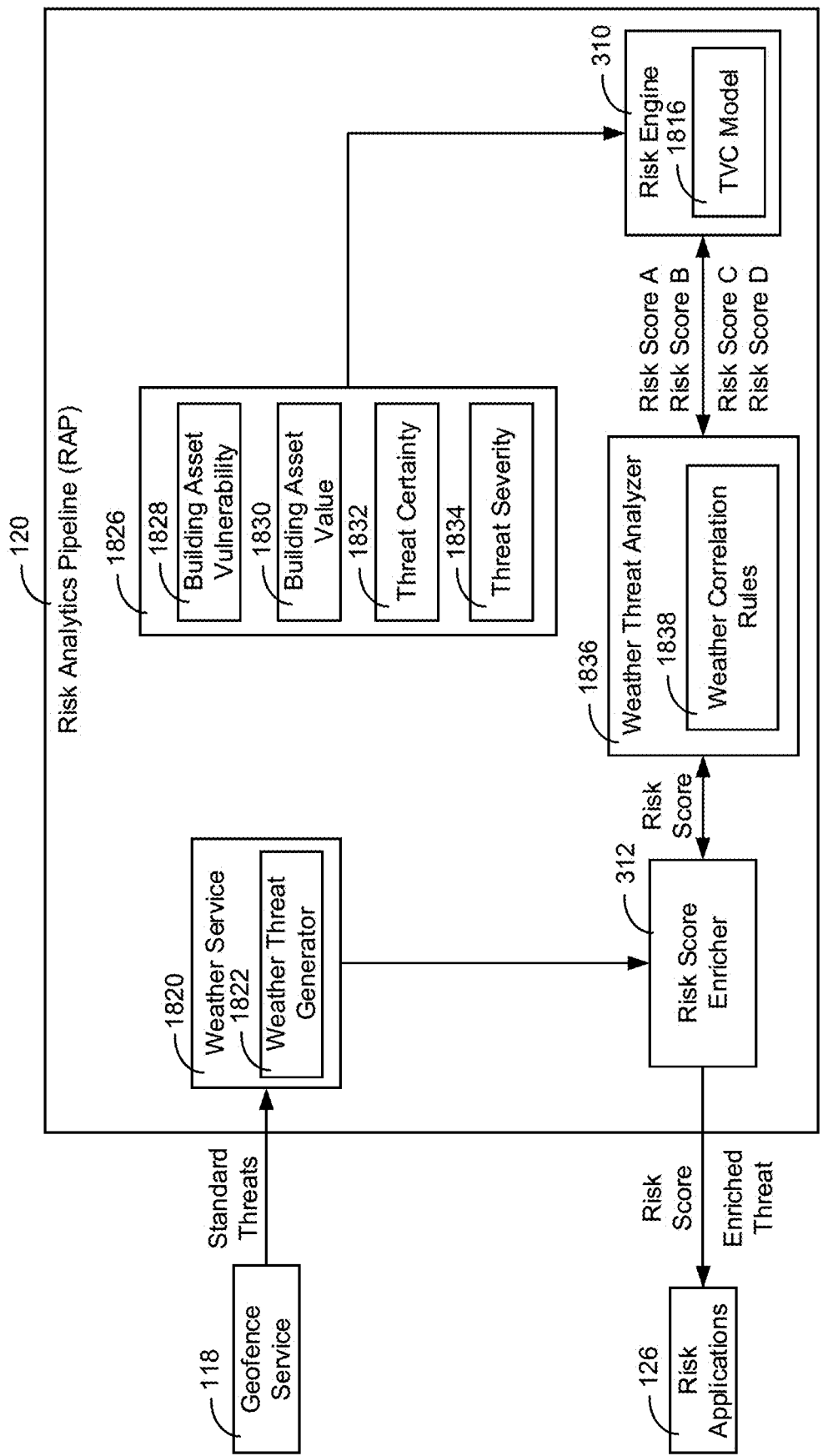
FIG. 18C is a block diagram of the RAP of FIG. 1 including the weather service of FIG. 18B and a weather threat analyzer, the weather threat analyzer configured to generate a combined risk score for multiple weather threat, according to an exemplary embodiment.
Figure 18D:
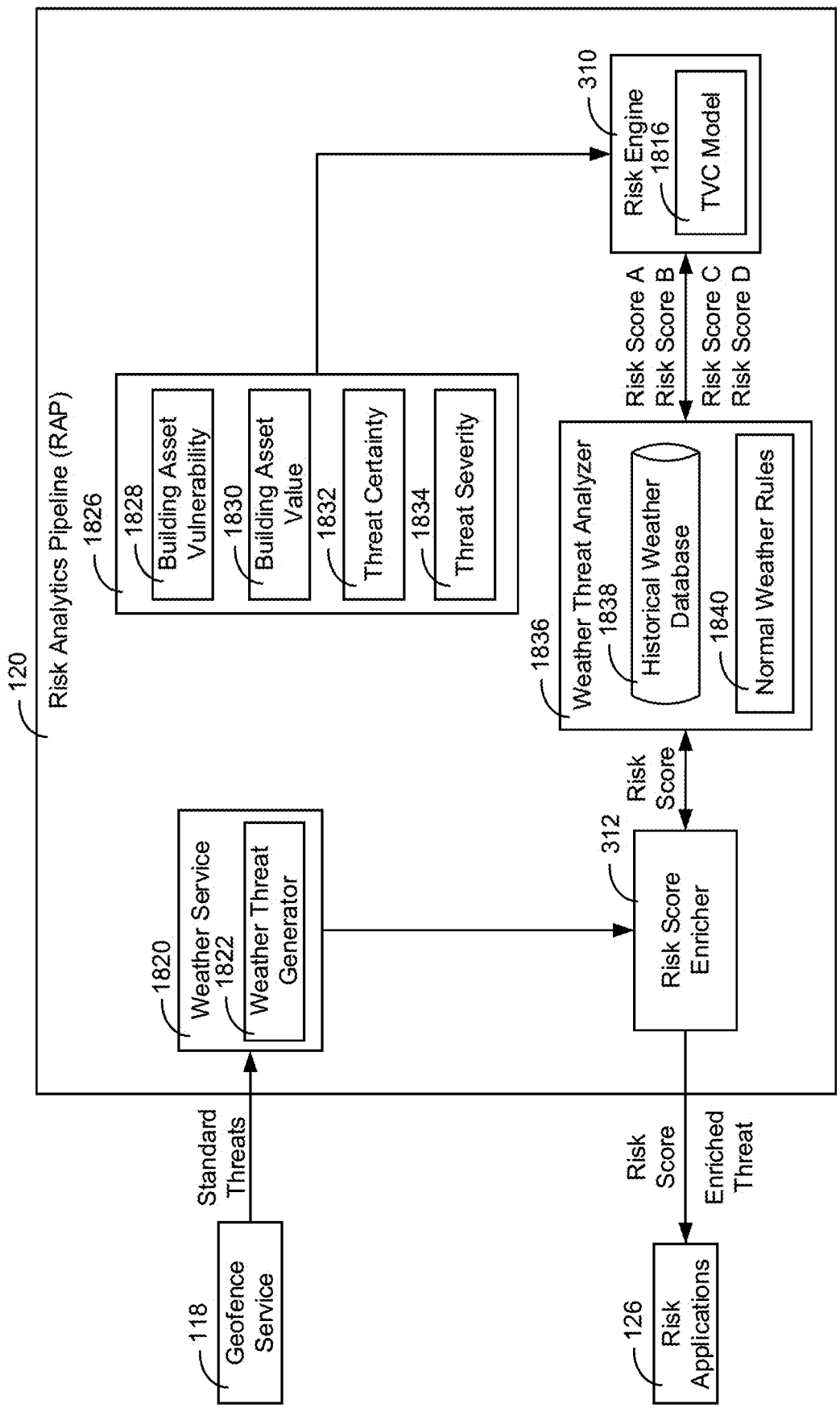
FIG. 18D is a block diagram of the RAP of FIG. 1 including the weather service of FIG. 18B and a weather threat analyzer, the weather threat analyzer configured to analyze historical data to generate a risk score for anomalous weather threat events, according to an exemplary embodiment.
Figure 18E:
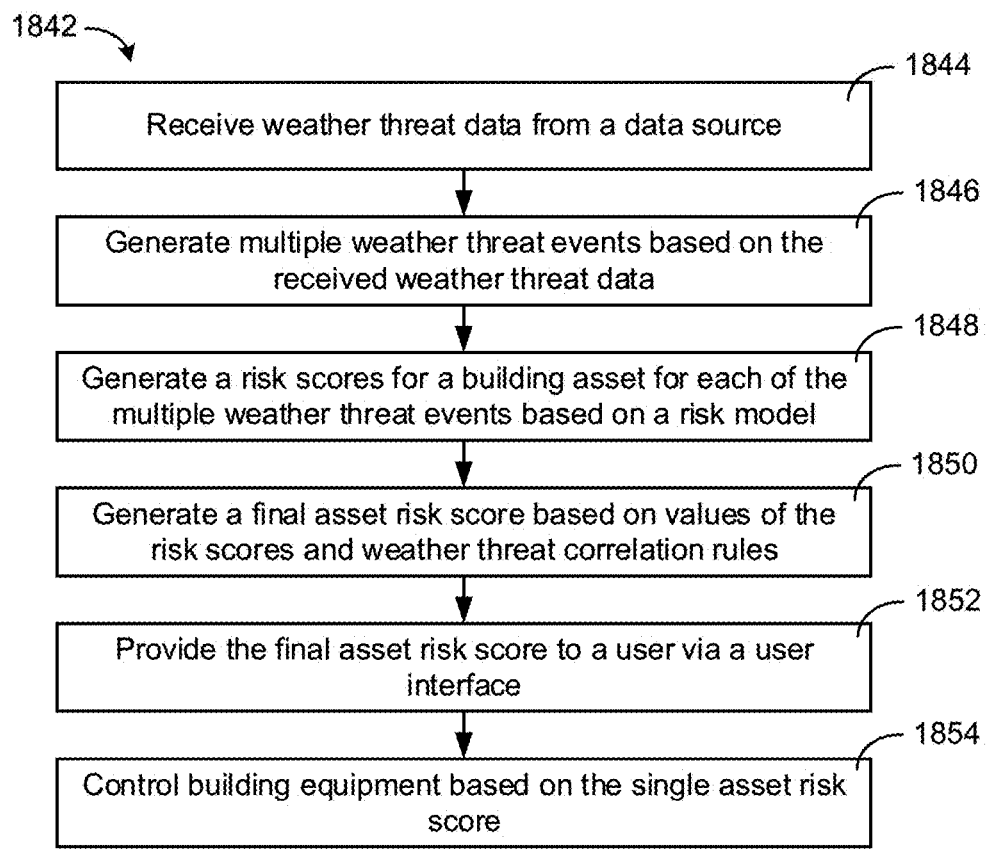
FIG. 18E is a flow diagram of a process for generating a risk score based on multiple weather threat events that can be performed by the weather service of FIG. 18B, according to an exemplary embodiment.

Referring now to FIG. 18C, the RAP 120 is shown in greater detail to include a weather threat analyzer 1836 for analyzing risk scores for various weather threats determined by the risk engine 310, according to an exemplary embodiment. In FIG. 18C, the risk engine 310 is shown to generate multiple risk scores for a particular asset. The weather threat analyzer 1836 is shown to receive the risk scores and use weather correlation rules 1838 to generate a final risk score, the final risk score being based on the multiple risk scores and correlations between weather threat events (or other types of threat events). The weather correlation rules 1838 may indicate that particular threat events are related and thus a final risk score should be generated based on the risk scores for the threat events.

One rule for the weather correlation rules 1838 may be that for a high temperature threat event associated with a score above a predefined amount and a poor air quality threat event with a risk score above a predefined amount, a final risk score should be generated as a function of both risk scores since high temperature and poor air quality may result in a dangerous situation. An example of a determination for a final risk score based on two threat events for poor air quality and high temperature may be, Final Risk Score=$\theta_1$AssetRiskScore$_{High\ Temperature}$+$\theta_2$AssetRiskScore$_{Poor\ Air\ Quality}$ where $\theta_1$ and $\theta_2$ may be multipliers for determining that risk score based on two separate risk scores. For example, if the high temperature risk score is 70 and the poor air quality risk score is 52 and the weighting parameters $\theta_1$ and $\theta_2$ are 0.8 and 0.6 respectively, a final risk score could be determined based on, Final Risk Score=(0.8)(70)+(0.6)(52)=87.2

Each weighting parameter may be predefined such that combinations of weather threat events result in particular final risk score values. A generalized equation for weighting risk scores together may be, $$\text{Final Risk Score} = \sum_i^n \theta_i AssetRiskScore_i + \theta_{i+1} AssetRiskScore_{i+1} \ldots \theta_n AssetRiskScore_n$$

In other embodiments, the risk score may be determined by applying a multiplier to a greatest of the component risk scores. For example, in the example above, where the high temperature risk score is 70 and the poor air quality risk score is 52, the overall risk score for the asset may be determined by applying a multiplier (e.g., 1.2) to the highest component score of 70, which may, for example, result in an overall risk score of 84.

Referring now to FIG. 18D, the weather threat analyzer 1836 is shown in greater detail to include a historical weather database 1838 and normal weather condition rules 1840 for determining how severely particular weather related threat events affect a building or area which may not be properly prepared for responding to a particular weather related threat event, according to an exemplary embodiment. As an example, a building or city may be located in an area where snow fall is not frequent. If there is an abnormally high snow fall one winter for the city, the city may not be properly prepared to handle the high snow fall. For example, there may not be a sufficient number of snow plow trucks or snow removal personal for handling such a snow fall. Therefore, a risk score for a building or city can be adapted to indicate that anomalous weather related threat events result in higher risk.

The weather threat analyzer 1836 can be configured to store risk scores generated by the risk engine 310 in a historical weather database 1838. The historical weather database 1838 may store days, months, years, and/or decades of risk score data. The historical weather database 1838 can be configured to store historical data for generated risk scores for high temperature threat events, risk scores for low temperature threat events, risk scores for tornados, hurricanes, etc. The historical weather database 1838 may indicate the frequency at which particular weather related threat events occur and their severity (e.g., their risk score for particular assets). Furthermore, the historical weather database 1838 can be configured to store raw environmental data. For example, the historical weather database 1838 could store an indication of every snow fall in the past ten years and the amount of snow for each snow fall. Furthermore, the historical weather database 1838 can be configured to store temperature trends over the past two decades.

The weather threat analyzer 1836 can be configured to generate the normal weather rules 1840 based on the historical threat events and/or the raw environmental data stored by the historical weather database 1838. The weather threat analyzer 1836 can be configured to implement various forms of machine learning, e.g., neural networks, decision trees, regressions, Bayesian models, etc. to determine what a normal threat event risk score would be for a particular threat event (e.g., a risk score range), a normal environmental condition (e.g., an environmental condition range), or other rules for identify abnormal environmental conditions.

Based on the normal weather rules 1840, the weather threat analyzer 1836 can compare new risk scores for threat events to the normal weather rules 1840. For example, if a high temperature risk score is normally between 30-40 but a new risk score is at 70, this may indicate that a substantially higher temperature than usually encountered by an asset is present. In this regard, the weather threat analyzer 1836 can increase the final risk score to account for the fact that the asset may be experiencing a weather related threat event that it is not prepared to endure. For example, for an area where tornados are not usually present, a threat event for a tornado may be 170. However, if based on the frequency of tornado threat events and risk scores associated tornados the weather threat analyzer 1836 identifies a threat event risk score range of 100-150, the weather threat analyzer 1836 may multiply the tornado threat event risk score by a multiplier to increase the value for the tornado threat event.

As another example, a weather threat event may be for a temperature at a particular high value for a day, e.g., for 100 degrees Fahrenheit. The normal weather rules 2404 may indicate that normal temperatures for a city are between 30 degrees Fahrenheit and 70 degrees Fahrenheit. The threat event of 100 degrees Fahrenheit may be outside the range and, thus, may be an anomalous weather threat event.

In some embodiments, the multiplier may be selected based on a frequency or value of the threat event. For example, a threat event may occur at a rate of 0.1%. The lower that threat event rate, the higher the multiplier may be. Furthermore, if the threat event corresponds to a value range, for example, temperature between 80 and 100 degrees Fahrenheit is normal during summer months, a multiplier may be selected based on how high above the temperature range a current threat event is associated with.

Referring now to FIG. 18E, a process 1842 is shown for determining a risk score based on a correlation between multiple simultaneously occurring weather or non-weather related threat events, according to an exemplary embodiment. The analytics service RAP 120 can be configured to perform the process 1842. Furthermore, a processing circuit, e.g., a processor and/or memory, can be configured to perform the process 1842. Any computing device described herein can be configured to perform the process 1842.

In step 1844, the RAP 120 and/or the data ingestion service 116 can receive weather threat data from a data source. The RAP 120 can receive weather threat data from the local or third party data sources (e.g., 102) or can receive processed threats from the geofence service 118 originally received and processed by the data ingestion service 116 and/or the geofence service 118.

In step 1846, the RAP 120, the data ingestion service 116, and/or the geofence service 118 can generate multiple weather threat events based on the received data of the step 1846. In some embodiments, the received data is raw data, e.g., temperatures, wind speeds, etc. In some embodiments, the received data is a threat event. In some embodiments, the RAP 120, the data ingestion service 116, and/or the geofence service 118 can generate one or more weather threat events and one or more non-weather threat events based on the received data of the step 1844. For example, in some embodiments, the RAP 120, the data ingestion service 116, and/or the geofence service 118 can generate one threat event based on high temperatures and another threat event based on an unusually large population in or near a building or site, such as due to a conference or other gathering.

In the step 1848, the RAP 120 can generate risk scores for a particular building asset (e.g., a building, a geographic area, an occupant of the building, equipment within the building, etc.). The risk scores may be a risk score for a particular asset determined based on each of the threat events received in the step 1844 or determined in the step 1846. In this regard, if there is a high snowfall threat event and a low temperature threat event, two separate risk scores can be determined each for the two threat events. Similarly, if there is a high temperature threat event and large population threat event, two separate risk scores can be determined for those events.

In the step 1850, the RAP 120 can determine a final risk score for the building asset based on the risk scores determined in the step 1848 and based on weather threat correlation rules. The correlation rules may be the weather correlation rules 1838. The correlation rules 1838 may indicate that particular weather related threat events should have combined risk scores since both of the weather threat events together may indicate a situation more dangerous that the weather threat events on their own. The correlation rules may indicate a particular weighting factors such that a final risk score can be generated based on the values of the correlated weather related threats.

For example, in the step 2508, for multiple threat events, the analytics service 628 can use the Equation 6 to generate a final risk score. In some embodiments, the analytics service 628 can use the weather correlation rules 2304 to determine a final risk score based on one or more weather threat events and one or more non-weather threat events. For example, in some implementations, the analytics service 628 can determine a final risk score based on a first risk score for a high temperature threat event and a second risk score for a large population threat event, where the weather correlation rules 2304 may indicate that the final risk score should be higher than the individual risk scores due to the combination of the high temperature and the larger than normal population leading to a higher level of risk.

In step 1852, the RAP 120 can provide the final risk score to a user interface e.g., the risk applications 126. In some embodiments, the risk score can be provided and displayed in the user interface described with reference to FIGS. 27-33. Furthermore, the RAP 120 can, in step 1854, control various pieces of building equipment based on the risk score. In some embodiments, building equipment could control an environmental condition (e.g., temperature) to be unusually high if a risk score for a low temperature threat event is determined. In some embodiments, the building control equipment could issue warning or alerts (e.g., evacuate a building, take cover, move to a basement area, etc.).

Figure 18F:
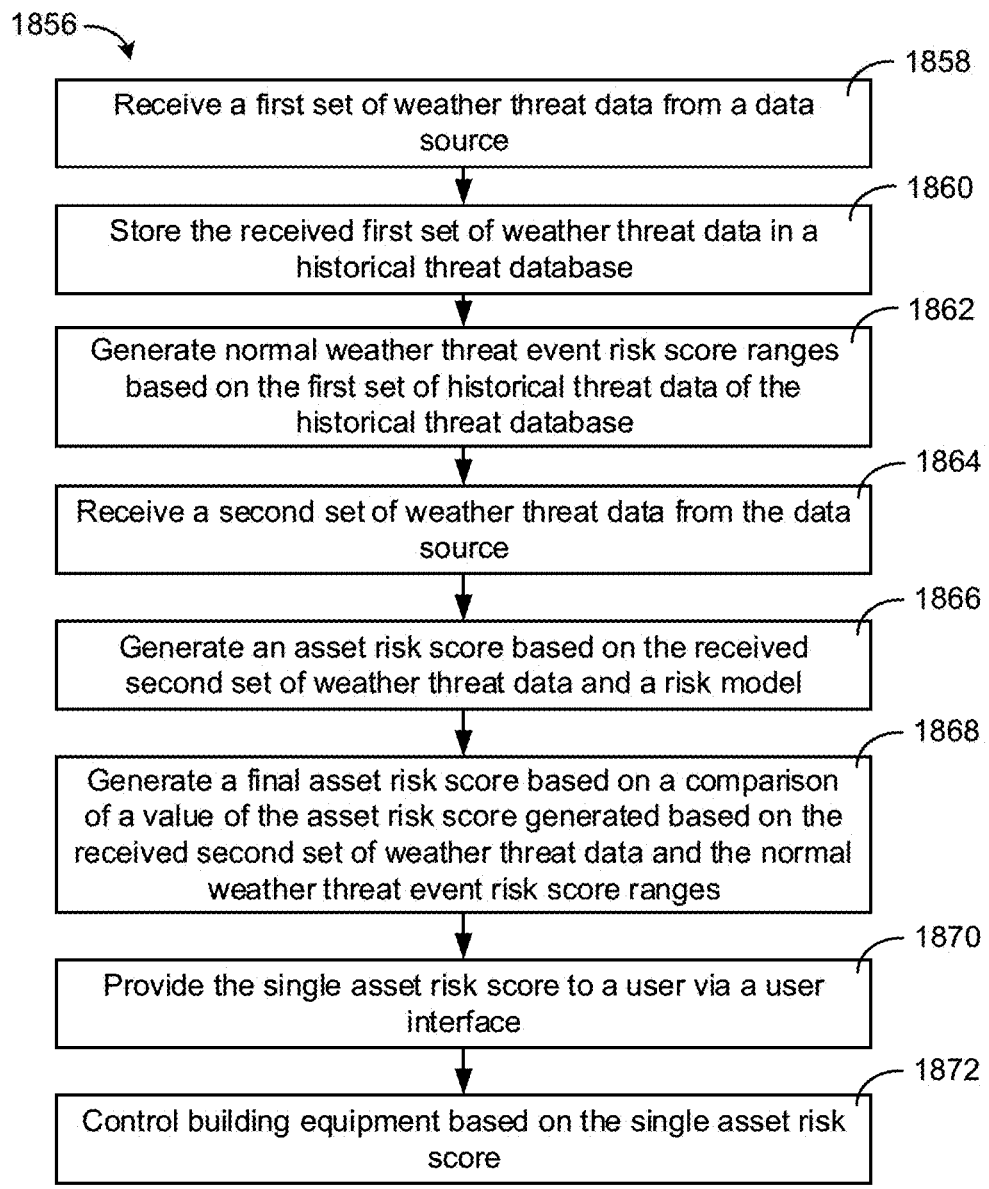
FIG. 18F is a flow diagram of a process for generating a risk score for an anomalous weather threat event based on historical data analysis that can be performed by the weather threat analyzer of FIG. 18D, according to an exemplary embodiment.

Referring now to FIG. 18F, a process 1856 for using historical weather data to determine risk scores is shown, according to an exemplary embodiment. The RAP 120 can be configured to perform the process 1856. Furthermore, a processing circuit, e.g., a processor and/or memory, can be configured to perform the process 1856. Any computing device described herein can be configured to perform the process 1856.

In step 1858, the RAP 120 can receive a first set of weather data. The received first set of weather data can be weather threat events, ambient temperatures, humidity values, air quality values, etc. In some embodiments, the stored data includes risk scores for various weather threat events that have occurred over a past decade. This first set of data can be stored in the historical weather database 1338 in step 2604. Over time, the analytics service 628 can collect and store the data in the historical weather database, i.e., perform the steps 2402 and 2604 iteratively for days, months, years, decades, etc.

In step 1862, based on the receive historical data, the RAP 120 can generate normal weather rules (e.g., the normal weather rules 1840). The normal weather rules may indicate the normal weather conditions of a particular area. The rules may be a temperature range, a snowfall amount range, etc. Furthermore, the ranges can be risk score ranges of the normal value of a risk score for a particular weather threat event. If a winter temperature is between 50 degrees Fahrenheit and 65 degrees Fahrenheit, a temperature of a threat event for 5 degrees Fahrenheit may indicate an abnormally cold threat event. Furthermore, the rules may indicate risk score ranges for various weather threat events. For example, air quality risk scores for air quality threat events may be risk scores between 30 and 40. An air quality risk score outside of the risk score range may indicate that an abnormal air quality condition is present.

In step 1864, the RAP 120 can receive a second set of weather threat data from the data source. The second set of weather threat data may be current threat data for the data source. In step 2610, the analytics service 628 can generate an asset risk score based on the received second set of data. The analytics service 628 can generate the risk score based on the building asset risk model 1812.

In step 1868, the RAP 120 can generate a final asset risk score based on comparing the value of the asset risk score determined in the step 1864 to the normal weather rules generated in the step 1862. If the rules indicate that the weather threat event is abnormal, e.g., outside a usual temperature range, is a threat event that rarely occurs, etc., the RAP 120 can increase the asset risk score. In some embodiments, a multiplier is chosen or retrieved for increasing the risk score. The multiplier can be multiplied with the risk score to generate the final risk score.

In some embodiments, the multiplier is dynamic, i.e., based on the threat event, a multiplier can be generated and utilized to increase the risk score. For example, the frequency at which a threat event occurs (e.g., of the threat event rules), can determine the multiplier. A threat event that occurs less than a predefined amount may be associated with a first multiplier. The process 1856 can proceed to 1870 and/or 1872, both of which are described with further reference to FIG. 18E.

Referring now to FIG. 19, an interface 1900 is shown for managing the VT matrix 1700, according to an exemplary embodiment. The interface 1900 may be an administrator dashboard that can be configured to update the settings of the VT matrix 1700. The ability to modify the settings of the VT matrix 1700 provides a unique capability to the site managers to control the risk ratings for their assets. The administrator for a building which is the asset in this case can change the settings both individually for each asset or make a bulk update based on the type of the assets. The VT matrix 1700 is assumed to be binary in this example for simplification. However, the values of the VT matrix 1700 can be anything between [0, 1] to show zero to full vulnerability of the asset towards a particular threat.

The interface 1900 includes selections to update the VT matrix 1700 in bulk and/or for a single asset via selecting option 1910. The interface 1900 includes a select asset category dropdown 1902. The dropdown 1902 allows a user to select all assets of a particular category. "Tactical" is shown as the selected category but any other category "Human," "HVAC Equipment," and/or any other category can be included in the dropdown 1902.

If the user is operating in a "Single Update" mode, particular assets can be selected via dropdown 1904. The assets in the dropdown 1904 can be numbered with an identifier, e.g., "1," "2," etc. and/or with a name "Building Lobby," "Grand Hotel," and/or any other asset. Particular threat categories can be enabled for an asset and/or group of assets. For example, dropdown 1906 can provide a user with a list of threat categories that are enabled for asset and/or asset group. A "Disease Outbreak" threat category is shown but any other type of threat "Shooting," "Rain," "Flooding," etc. can be included in the list. If the user interacts with the button 1912, the selected threat from the list can be disabled and removed from the list.

The dropdown 1908 can allow a user to view threat categories (threat categories not already in the dropdown 1906) to the dropdown 1908. If a user selects a particular threat category via the dropdown 1908 and interacts with the button 1914, the threat category can be added to the list of threats that the asset and/or assets are vulnerable to, e.g., the selected threat is added to the dropdown 1906.

The user can enter a particular value for a threat and/or asset vulnerability. In response to interacting with the button 1916, the group of assets selected via the interface 1900 can be updated with the entered value. If the user interacts with the button 1918, the particular singular asset selected by the user via the interface 1900 can be updated. Based on the selection via option 1910, the button 1916 and/or 1918 can be enabled and/or disabled to be interacted with (in bulk update mode the button 1916 can be enabled while in single update mode the button 1918 can be updated).

Figure 20:
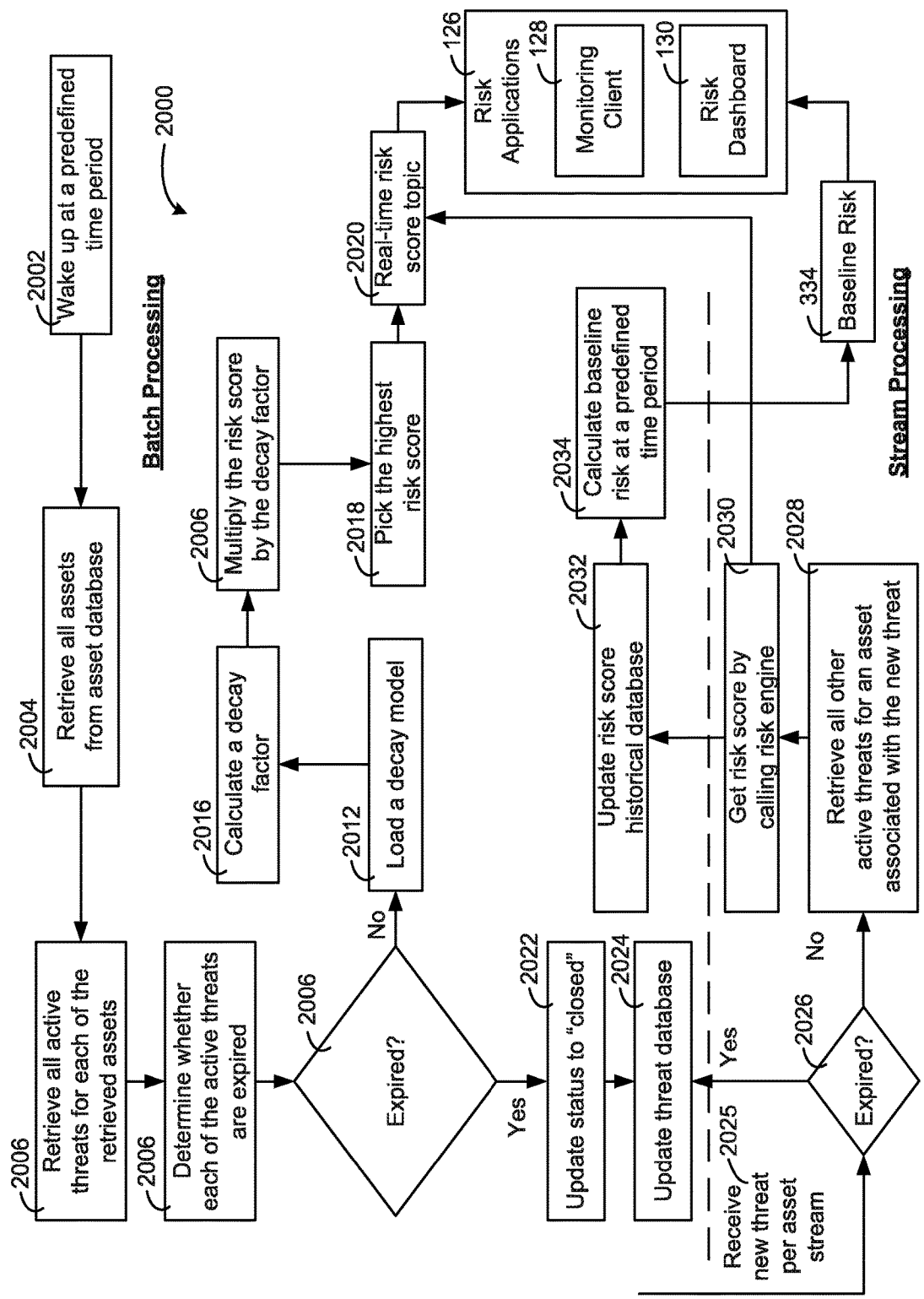
FIG. 20 is a flow diagram of a process for decaying risk values over time and determining a baseline risk value that can be performed by the RAP of FIG. 4, according to an exemplary embodiment.

Referring now to FIG. 20, a process 2000 is shown for performing risk decay and threat expiry batch processing and risk updating for streaming new threats, according to an exemplary embodiment. The RAP 120 can be configured to perform the process 2000; furthermore, the risk decay manager 320, the threat expiration manager 322, and/or the base risk updater 324 can be configured to perform the process 2000. The process 2000 is shown to be divided into two sets of steps, the batch processing steps, steps 2002-2024, 2032, and 2034, and the stream processing steps, steps 2025-2030.

The stream processing steps can update risk score in real-time. After the threats are identified to be at the vicinity of an asset by the geofence service 118 they are enriched with the asset information. The RAP 120 can check to make sure the threat is not expired by checking the current time and the expected expiry time. If the event is expired it will be persisted to the database. If it is not expired then it will be sent to the risk engine along with all the other active threats for that specific asset to generate a risk score. The generated risk score will be pushed to the real-time risk score topic 2020 to be consumed by the monitoring client 128 and the risk dashboard 130. It will also be persisted to the database of historical risk scores.

The batch processing steps for risk decay and threat expiry can be handled by a set of batch processes. The batch processes may be a continuously running process that wakes up at a predefined interval (e.g., every 10 minutes) and retrieve all the assets from the database. Then for each asset all the active threats are queried. Active threats are the threats with status set to "open". The database used within the risk analytics pipeline stores the threats after the threats have been enriched after the geofence service 118 and asset service 304 call. Therefore the threats are stored with asset information and also one threat per asset at a time. The current time will be compared with the expiry time predicted value. If the current time exceeds the predicted expiration time then the threat will be considered to be expired. The expired threat then can be pushed to the database for storage. If the threat is not expired the risk score from that threat can be decayed. This can be done by loading the right decay model (polynomial function for example) and calculating the decay factor from the equations as described with reference to FIGS. 23-24 by replacing the parameters t, a in the formula representing the time has passed from the beginning of the threat creation and the expected duration of the threat.

The risk score then can be multiplied by the decay factor. This will repeat for all the active threats for that specific asset and then the highest risk score will be selected as the risk score for that specific asset. This process can repeat for all the assets until all the risk scores are updated. The updated risk scores cab be pushed to a real-time risk score topic (e.g., a Kafka topic) from which the monitoring client 128 and the risk dashboard 130 fetch the risk score updates.

Baseline risk score is another batch processes that updates the baseline risk every particular interval (e.g., every ten minutes). The baseline risk score can be calculated by aggregating all the risk scores generated for that asset over the historical period (the longer the better). The aggregate scores will be grouped per category and those scores will be pushed to the historical/baseline topic to be consumed by the applications.

Referring more particularly to FIG. 20, in step 2002, the RAP 120 wakes up at a predefined interval to perform the batch processing steps 2004-2024, 2032, and/or 2034. In some embodiments, the batch process manager 318 wakes up at the predefined interval to perform the batch processing steps. In some embodiments, the interval is a ten minute interval but can be any period of time.

In step 2004, the RAP 120 can retrieve all assets from the asset database 306. The assets can be all assets currently stored in the asset database 306. In step 2006, based on the retrieved assets, threats for each of the retrieved assets can be retrieved by the RAP 120. For example, the threats may be stored in the risk database 314 and thus the RAP 120 can retrieve the threats for each asset from the risk database 314. In some embodiments, only threats marked as "active" are retrieved by the RAP 120.

In step 2008, the RAP 120 can determine whether each of the active threats retrieved in the step 2006 are expired. Each of the threats retrieved in the step 2006 may be marked as active or closed. If the threat is marked as active, the RAP 120 can determine if an expiry time associated with the threat has passed. In step 2010, if the expiry time has passed as determined in the step 2008, the process can continue to step 2022 but if the expiry time has not passed, the process can continue to step 2012.

In step 2012, the RAP 120 can load a decay model for the threats retrieved and determined to not be expired in the steps 2006-2010. The decay model can be specific to each of the threats and/or for each of the assets. In this regard, for a particular combination of a threat and an asset, a specific decay model can be selected. In this regard, the appropriate decay, modeling the response to an incident, for a particular threat affecting a particular asset can be modeled.

In step 2014, based on the loaded decay models, decay factors can be determined for the threats by the RAP 120. In step 2016, the decay factors can be multiplied by the RAP 120 against the risk score of the threats to generate a decayed risk score. In some embodiments, where a particular asset is associated with multiple different threats, a risk score can be determined and/or decayed for that asset. The RAP 120 can compare the multiple risk scores against each other for the asset and select the highest risk score in the step 2018. The highest risk score selected in the step 2018 can be set to the real-time risk score topic and the risk applications 126 (the monitoring client 128 and/or the risk dashboard 130) can read the real-time risk score topic 2020 to retrieve the highest risk score for a particular asset and cause the highest risk score to be displayed in a user interface.

If one or multiple threats have expired, determined in the steps 2008-2010, the RAP 120 can update the status of the threat to "closed" to indicate that the threat is no longer active in step 2022. In step 2024, the threat database 124 can be updated by a threat database (e.g., the threat database 124) to include the new "closed" statuses for the threats that have been determined to have been expired.

In step 2025, the RAP 120 can receive a new threat from one of the data sources 102. Since the threat may be new, the step 2026, 2028, and/or 2030 can be performed as stream processing, i.e., in response to receiving the new threat. Since the new threat may be associated with an expiration time, the RAP 120 can determine, based on the expiration time, whether the new threat has already expired. In response to determining that the new threat has already expired, the process can proceed to the step 2024. In response to determining that the new threat has not yet expired, the process can move to the step 2028.

In step 2028, the RAP 120 can retrieve all other active threats for the asset affected by the new threat. In step 2030, based on the new threat and/or all the other active threats retrieved in the step 2028, the RAP 120 can determine a risk score for the asset by calling the risk engine 310 to determine the risk score for the new threat (or the other active threats retrieve din the step 2028). The RAP 120 can compare the score of the new threat and the other threat scores and select the highest score to be the score for the asset.

In step 2032, the RAP 120 can update a historical database of risk scores for the asset. The historical database of risk scores can indicate risk scores for the asset for a particular time and/or for particular times over an interval (e.g., a window of time). In step 2034, the historical risk scores of the historical database can be used to calculate a baseline risk score. The baseline risk score can be generated by averaging risk scores over a particular time period, the risk scores retrieved from the historical database. The result of the calculation of the step 2034 may be the baseline risk 334. The baseline risk 334 can be saved as an endpoint that the risk applications 126 can query to retrieve the baseline risk 334 and present the baseline risk 334 to a user via the monitoring client 128 and/or the risk dashboard 130.

Referring now to FIG. 21-22, two charts illustrating risk scores for a particular asset over time are shown, chart 2100 not including risk decay and chart 2200 including risk decay, according to an exemplary embodiment. Three threats 2102, 2104, and 2106 and the dynamic risk scores for each threat are shown in the chart 2100 with no risk decay model being applied to the risk scores. Asset sum risk 2108 is shown to be a trend of all asset risk scores summed together. The asset peak risk 2107 can track the highest risk score based on each of the threat asset risk scores 2102-2106. Furthermore, the asset baseline risk 2110 is shown tracking the baseline (e.g., average over a predefined previous time period) for the asset. In some embodiments, the risk presented to end users and/or used to cause an automated workflow to occur is the peak risk score and/or sum risk score.

As shown in the chart 2100, the threat risk scores 2102-2106 have a beginning time and an expiration time. However, the value for each of the threat risk scores 2102-2106 ends suddenly; there is no decay of the score. In many instances, setting the risk score to zero for one of the threat risk scores 2102-2106 does not properly model an incident since the risk score associated with the incident may decrease over time. In this regard, the risk decay as described elsewhere herein can be applied to the risk scores to more accurately model how risk behaviors and incidents are responded to and resolved. Chart 2200 provides an example of risk decaying over time.

There is not information about the decay if focus is put on the two states of a threat "open" and "closed". An analyst will have no expectation on how long a threat is going to last until suddenly the score goes down. But with risk decay, the score goes down gradually according to the expiry time predicted by a machine learning model developed on the historical data and thus the analyst has an idea of how long the risk is expected to last.

In chart 2200, three threat risk scores 2202-2206 are shown where a risk score is decayed over time. The threats are the same as the threat risk scores 2102-2106 of chart 2100 but the risk is decayed with a decay model. The threats 2202 and 2204 are decayed with a polynomial decay model while the threat 2206 is decayed with an exponential risk model. The different threats can be decayed with different models based on a combination of the particular asset and/or the particular threat. Since the threat risk scores 2202-2206 are decayed over time, the asset sum risk 2212, which is a summation of all risk scores, is shown to also be decayed while the asset peak risk score 2210, which is the highest current decayed risk, is also decayed since it is based on the decayed risk scores 2202-2206. The baseline 2208 is shown to be the same as the baseline 2110 since the baselines can be determined based on the raw risk values, not the decayed risk values. In some embodiments, the baseline risk score is based on the decayed risk values.

Referring now to FIG. 23-24, a chart 2300 of an exponential risk decay model and a chart 2400 of a polynomial risk decay model are shown, according to an exemplary embodiment. There are different types of risk decay models to apply to the dynamic risk (polynomial, exponential, linear, etc.). Two useful decay functions for the risk decay model, $\rho(t)$, are shown in the FIGS. 23-24.

The two proposed decay functions of FIGS. 23-24 both provide the gradual decay operation with different properties. The exponential decay function, shown in FIG. 23, has a very fast decay at the beginning but then becomes slow at the end of the curve. This type of decay function is appropriate for representing the cases that has a sudden impact and expires fast but it lingers for some time because of the possible consequences on peoples and public view. For example a bomb threat can be a high risk but it quickly decays because they find out it was a false alarm however, the police remains vigilant and ask public to be aware until the risk is completely gone away. The exponential decay is aggressive (more than 80% of the risk will be eliminated half way thru the life span of that threat in exponential decay) and should be applied only in cases that has a good justification.

The polynomial decay function, as shown in FIG. 24, has a slow decay at the beginning of the curve but close to the end of the curve it becomes a faster decay. This model which is suitable for the majority of the threats provide a better transition since it preserves the impact of the threat for the most part of the predicted active period. A minor accident for example needs to stay active and decay slow until police shows up and deals with the situation. Then the traffic goes to normal very quickly. Polynomial decay function can be very useful in those scenarios.

The polynomial decay function parameters can be determined from Theorem 1.

Theorem 1 (Polynomial Risk Decay Function)

Given a quartic function with a degree-4 polynomial for the decay model, $$f(x)=a_4x^4+a_3x^3+a_2x^2+a_1x+a_0$$

the polynomial coefficients for a quarterly interpolation points of [1, 0.95, 0.80, 0.60, 0.05] can be uniquely calculated as, $$a_0=1$$

$$a_1=0.4167\alpha^{-1}$$

$$a_2=-3.767\alpha^{-2}$$

$$a_3=6.133\alpha^{-3}$$

$$a_4=-3.73\alpha^{-4}$$

where $\alpha$ is a positive real number representing the expected expiry time of the threat in minutes.

Proof

Applying the interpolation points $\{(0, 1), (0.25\alpha, 0.95), (0.5\alpha, 0.8), (0.75\alpha, 0.6), (\alpha, 0.05)\}$ to the equation $f(x)=a_4x^4+a_3x^3+a_2x^2+a_1x+a_0$ leads to the linear system of equations below, $$a_1(0.25a)+a_2(0.25a)^2+a_3(0.25a)^3+a_4(0.25a)^4=-0.05$$

$$a_1(0.5a)+a_2(0.5a)^2+a_3(0.5a)^3+a_4(0.5a)^4=-0.2$$

$$a_1(0.75a)+a_2(0.75a)^2+a_3(0.75a)^3+a_4(0.75a)^4=-0.4$$

$$a_1a+a_2a^2+a_3a^3+a_4a^4=-0.95$$

$$a_0=1$$

Using the Cramer's Rule, as described in greater detail in I. Reiner, *Introduction to matrix theory and linear algebra*, Holt, Rinehart and Winston, 1971, $$a_1 = \frac{\begin{vmatrix} -0.05 & (0.25a)^2 & (0.25a)^3 & (0.25a)^4 \\ -0.2 & (0.5a)^2 & (0.5a)^3 & (0.5a)^4 \\ -0.4 & (0.75a)^2 & (0.75a)^3 & (0.75a)^4 \\ -0.95 & a^2 & a^3 & a^4 \end{vmatrix}}{\begin{vmatrix} 0.25a & (0.25a)^2 & (0.25a)^3 & (0.25a)^4 \\ 0.5a & (0.5a)^2 & (0.5a)^3 & (0.5a)^4 \\ 0.75a & (0.75a)^2 & (0.75a)^3 & (0.75a)^4 \\ a & a^2 & a^3 & a^4 \end{vmatrix}} = 0.4167\alpha^{-1}$$

$$a_2 = \frac{\begin{vmatrix} -0.25a & -0.95 & (0.25a)^3 & (0.25a)^4 \\ 0.5a & -0.2 & (0.5a)^3 & (0.5a)^4 \\ 0.75a & -0.4 & (0.75a)^3 & (0.75a)^4 \\ a & -0.95 & a^3 & a^4 \end{vmatrix}}{\begin{vmatrix} 0.25a & (0.25a)^2 & (0.25a)^3 & (0.25a)^4 \\ 0.5a & (0.5a)^2 & (0.5a)^3 & (0.5a)^4 \\ 0.75a & (0.75a)^2 & (0.75a)^3 & (0.75a)^4 \\ a & a^2 & a^3 & a^4 \end{vmatrix}} = -3.767\alpha^{-2}$$

-continued $$a_3 = \frac{\begin{vmatrix} 0.25a & (0.25a)^2 & -0.05 & (0.25a)^4 \\ 0.5a & (0.5a)^2 & -0.2 & (0.5a)^4 \\ 0.75a & (0.75a)^2 & -0.4 & (0.75a)^4 \\ a & a^2 & -0.95 & a^4 \end{vmatrix}}{\begin{vmatrix} 0.25a & (0.25a)^2 & (0.25a)^3 & (0.25a)^4 \\ 0.5a & (0.5a)^2 & (0.5a)^3 & (0.5a)^4 \\ 0.75a & (0.75a)^2 & (0.75a)^3 & (0.75a)^4 \\ a & a^2 & a^3 & a^4 \end{vmatrix}} = -6.133\alpha^{-3}$$

$$a_4 = \frac{\begin{vmatrix} 0.25a & (0.25a)^2 & (0.25a)^3 & -0.05 \\ 0.5a & (0.5a)^2 & (0.5a)^3 & -0.2 \\ 0.75a & (0.75a)^2 & (0.75a)^3 & -0.4 \\ a & a^2 & a^3 & -0.95 \end{vmatrix}}{\begin{vmatrix} 0.25a & (0.25a)^2 & (0.25a)^3 & (0.25a)^4 \\ 0.5a & (0.5a)^2 & (0.5a)^3 & (0.5a)^4 \\ 0.75a & (0.75a)^2 & (0.75a)^3 & (0.75a)^4 \\ a & a^2 & a^3 & a^4 \end{vmatrix}} = -3.73\alpha^{-4}$$

where |M| denotes the determinant of matrix M.

Referring generally to FIGS. 25-29, interfaces that the monitoring client 128 can be configured to generate and cause the user devices 108 to display and/or receive interface interactions from are shown according to various exemplary embodiments. The interfaces of FIGS. 25-29 can provide alarm handling integrated with risk scores, asset information, and/or threat information. Security operations often involve dealing with a high volume of alarms generated from cameras, sensory devices, controllers, Internet of Things (IoT) devices, fire & security system, badge in/out reports and door forced open incidents and so on. Handling alarms in such a large volume requires assigning significant resources to monitor the alarms and make the appropriate decision to take actions based on the current situation. Prioritizing alarms, providing contextual information about assets and the threats involved and filtering/sorting alarms are very important to reduce the time and improve the user experience on the alarm monitors. The interfaces of FIGS. 25-29 provide integrated risk and threat analysis into a single user interface and/or user interface system.

Figure 25:
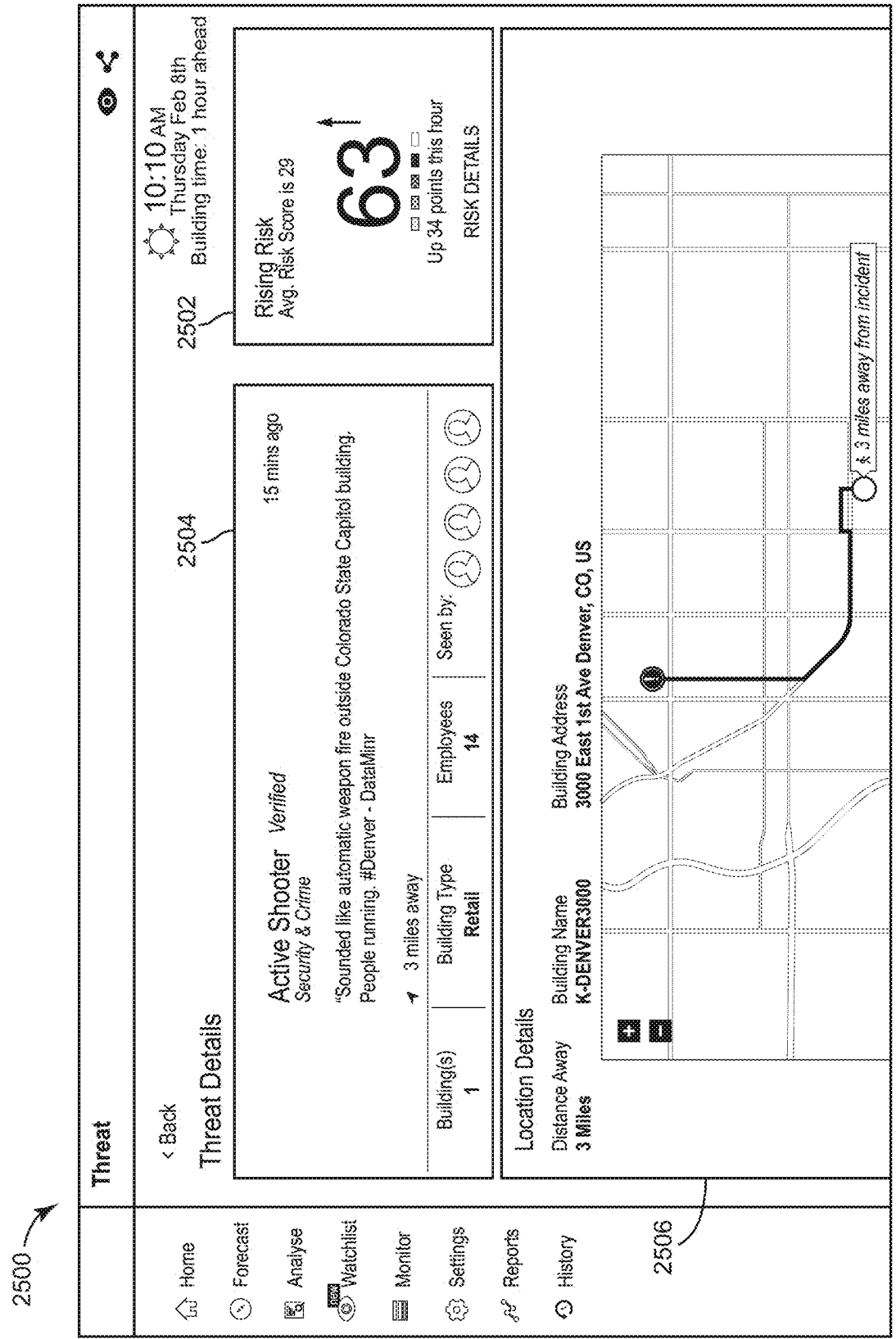
FIG. 25 is a schematic drawing of a user interface including information for an asset and a threat, a dynamic risk score, and a baseline risk score, according to an exemplary embodiment.
Figure 26:
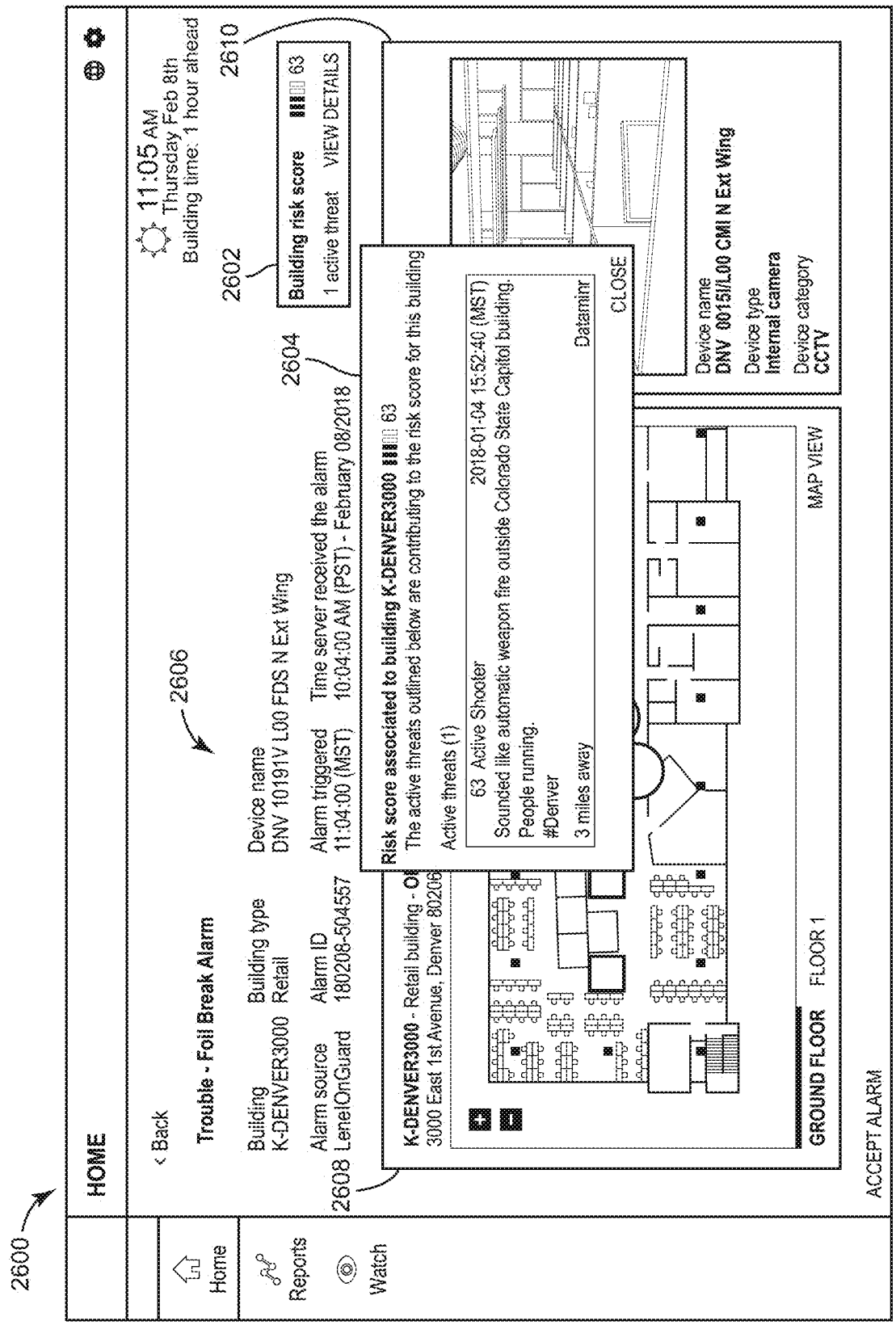
FIG. 26 is a schematic drawing of a user interface providing information for an asset and threats affecting the asset, according to an exemplary embodiment.
Figure 27:
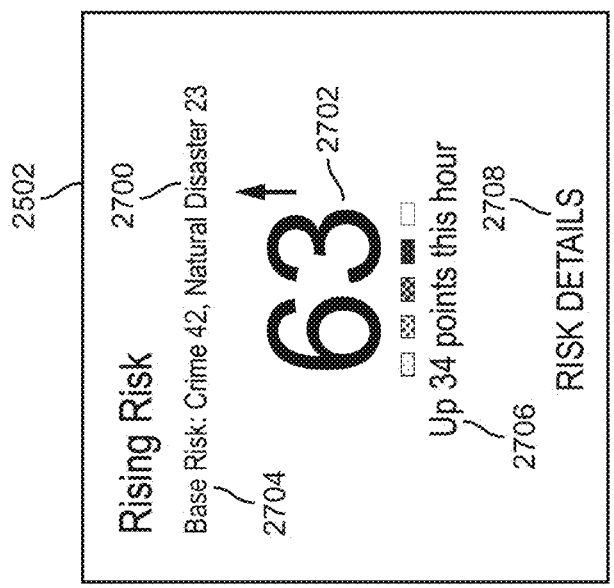
FIG. 27 is a schematic drawing of a risk card for a user interface, the risk card indicating dynamic risk score and a baseline risk score, according to an exemplary embodiment.

Referring now to FIGS. 25-27, interfaces are shown with risk score and active threats as contextual information for responding to incidents, according to an exemplary embodiment. In FIG. 25, a risk card 2502 is shown, the risk card illustrates both dynamic and baseline risk for an asset. The risk card 2502 is described in greater detail in FIG. 27. Interface element 2504 is shown to provide information regarding a particular threat received from one of the data sources 102 and that the risk analytics system 106 standardizes. The element 2504 provides an indication of the threat ("Active Shooter") a threat category ("Security & Crime"), a brief explanation of the threat (can be the raw summary text received from the data sources 102 and used to perform NLP on), an indication of the data source itself ("Data-Minr"), an indication of the distance away from a particular asset ("3 miles away") and an indication of the assets affected by the threat (i.e., number of buildings and/or employees affected by the threat). The element 2504 allows a user to view the type of building affected by the threat; in element 2504 the building affected by the threat is a retail building. Finally, the users that are logged into the monitoring client 128 that have viewed the element 2504 are recorded and provided as part of the element 2504. In this regard, a building operator can quickly gain an understanding of what building personal are aware of a particular threat and can more quickly respond to a threat since the operator may not need to notify a building person who has already seen the threat.

Element 2506 of the interface 2500 provides information pertaining to the asset affected by the threat described in the element 2504. The asset affected by the threat in this example is a retail building. The retail building is shown on a map interface along with a distance of the building from the threat, a name of the building, and an address of the building. The map illustrates both the location of the threat and the location of the building. Furthermore, a navigation route from the building of the threat is provided.

In FIG. 26, an interface 2600 provides information for another threat and information for an asset affected by the threat. Interface 2600 is shown to include threat details 2606. The details 2606 indicate a type of threat, in this case a "Foil Break Alarm," an indication of a building name, an indication of a building type, the equipment which picked up the threat, an alarm source, an alarm identifier, a time that the alarm was triggered, and a time that the risk analytics system 106 received the alarm.

Element 2602 provides a dynamic risk score for the building affected by the threat, an indication of a number of threats currently affecting the building, and an element to view additional details regarding the building. Element 2608 provides a floor plan indication of the building affected by the threat of element 2606. The user can view each of the floors of the building and view, on the floor plan map, where the threat is occurring within the building. The element 2604 provides an indication of a dynamic risk score for the building an a tabulation of each of the threats affecting the building, for example, if another threat is affecting the building outside of the "Foil Break Alarm," an active shooter threat, the active shooter threat and/or the foil break alarm can be shown in the element 2604 along with an indication of the risk score value for the particular threat. Element 2610 provides an indication of security camera feeds associated with the building at a particular location associated with the location of the threat occurring within the building. For example, the monitoring client 128 can be configured to identify, based on equipment reporting the foil break alarm, what camera in the building views the equipment and/or space associated with the equipment. In this regard, a user can view a live stream and/or a historical video stream (associated with the time at which the threat was triggered) to review the threat.

In FIG. 27, the risk card 2502 is shown in greater detail. The risk card 2502 includes an indication of a baseline risk values and an associated threat category, i.e., elements 2704 and 2700. For example, a particular asset can have multiple base risks, one baseline risk for crime and another baseline risk for natural disasters. A dynamic risk 2702 is further shown indicating the highest risk score reported for the asset. Element 2706 provides an indication of whether the risk score has been rising and/or falling for a predefined time period. The monitoring client 128 can be configured to determine whether the risk score has risen and/or fallen over a predefined time period and can provide the risk card 2502 with an indication of the amount that the risk score has risen or fallen. If the risk score is rising the monitoring client 128 can cause the risk card 2502 to provide an up arrow while if the risk score is falling the monitoring client 128 can provide a down arrow. The user can interact with a risk details element 2708. In response to detecting a user interacting with the risk details element 2708, the monitoring client 128 can cause information pertaining to a risk (all threats reported for the asset, the highest risk threat, etc.) to be displayed.

The risk card 2502 includes the most critical information but in a concise and brief manner. The risk card 2502 includes the dynamic risk score which corresponds to the current risk score from real time active threats. Then it also includes baseline risk score which shows the risk score over an extended period of time. Combination of these two together makes it a meaningful insight. Neither of them alone may be enough. Considering a location such as Miami, the risk of Tornado is higher in Miami as compared to Milwaukee but if one looks into the dynamic risk score which comes from the active threats reflecting what is happening "right now" that might not even show any difference because tornados do not happen any minute. However, if one looks into base risk score which has been calculated over 50 years of data then one would see that there is a noticeable difference in those scores between those cities.

On the other hand dynamic risk score is beneficial for situational awareness to understand what threats are active at the moment and which one has the highest risk. So the risk card shows both base and dynamic risk score. It also shows the slope (rise or fall) on the last hour for dynamic risk to show where it's headed.

The risk card 2502 includes two categories for base risk score: Crime and Natural disaster. Those are the two main categories that many users care about according to some studies. The baseline risk scores for crime and natural disaster when combined might convey wrong information. In this regard, baseline risk scores can be determined for particular categories so that a user can compare a dynamic risk score for crime to the baseline for crime and a dynamic risk score for natural disasters to the baseline for natural disasters.

Other than the risk card, an "alarm details" page can be viewed in response to interacting with the element 2708 which shows the more detailed info on that alarm or threat. In that page, additional information on the risk score is provided as well for example the distance of the threat and also the details of the asset that was impacted. In the detailed information page one can also show the base risk score at the sub-category level. For example if risk score is shown to be high for natural disaster at the risk card level, the interface can specify which sub-category e.g. earthquake, tornado snow fall and etc. on the detailed page.

Figure 28:
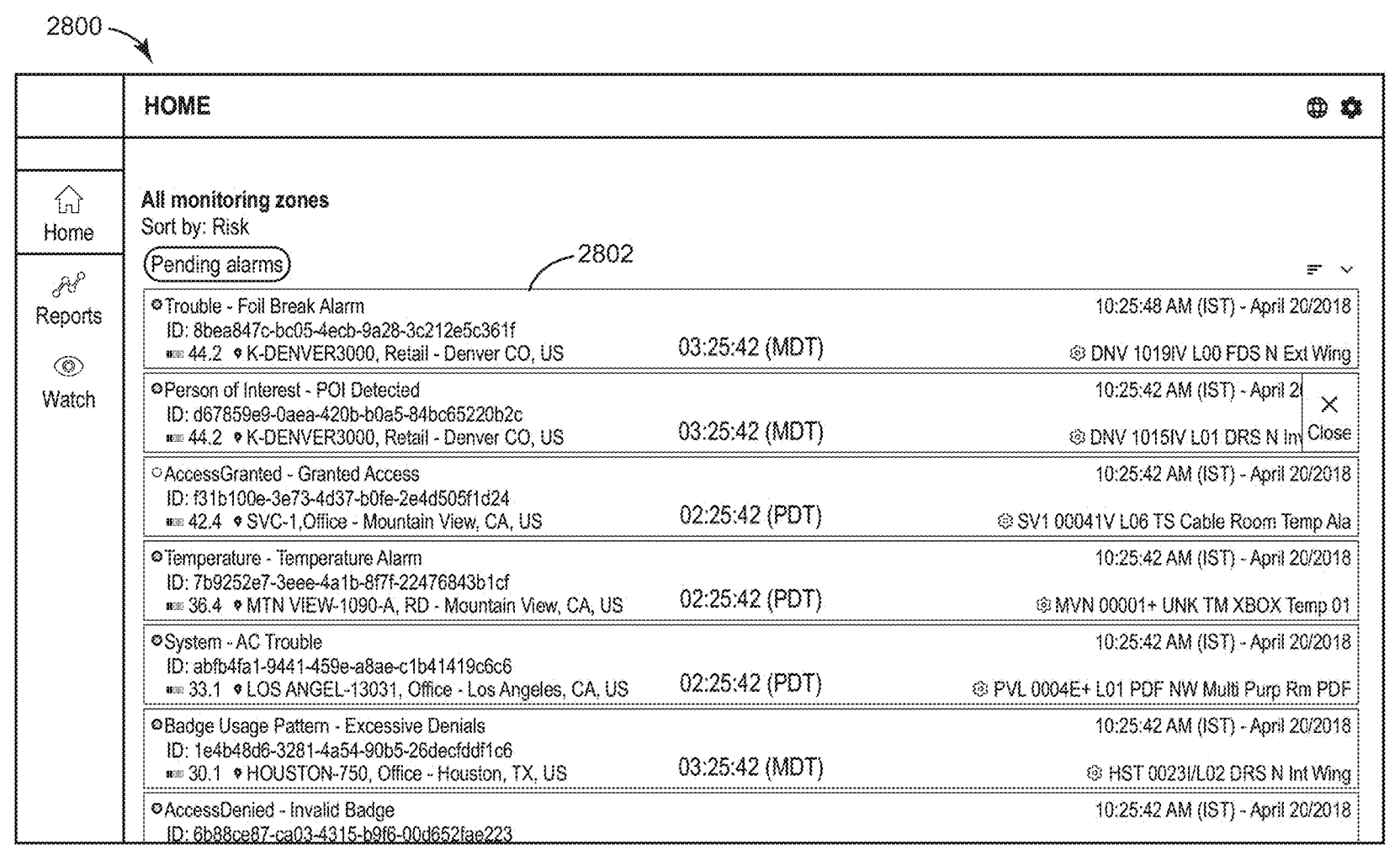

Referring now to FIGS. 28-29, interfaces 2800 and 2900 are shown including a list of active threats for an asset listed along with the risk associated for each threat. The higher the risk score the more important that threat is. In this regard, the monitoring client 128 can dynamically prioritize alarms, i.e., threats, based on a risk score associated with the asset affected by the threat. The monitoring client 128 can be configured to dynamically sort the threats of the list 2802 and 2902 so that the highest risk scores are shown on the top of the list, allowing a user to quickly identify what threats and/or assets are associated with the highest priority. As can be seen in interfaces 2800-2900, as new threats are reported, and risk scores change, threats can move up and down the list, as can be seen from list 2802 to 2902.

Existing solutions may prioritize events and alarms by adding "severity" metadata fields to the monitored data. These severity fields are usually configured by the site-monitoring devices themselves. One disadvantage of these methods is the severity data's lack of situational context. For example, two identical "glass break" events in two different buildings may have different actual priorities if one of the buildings is near a civil demonstration. Similarly, the same category of asset threat would have a different actual impact on buildings of greater value, or where a senior executive, or a known offender, is present. In current solutions, such events are likely to be given equal priority without further investigation, adding potential cost and delay to the incident management process. An automated, more richly contextualized risk analysis of threat data facilitates a more timely and accurate prioritization of asset threats.

As another example, a broken window in a building could trigger a break glass alarm event. The risk score for the building asset would be increased in response to the event occurring. The risk score for the building may not trigger any automated workflow (e.g., call the police). However, if there is an event in the vicinity of the building, e.g., an active shooter, the building asset risk score could be elevated. The break glass event risk score could be added to the already elevated risk score to reflect the larger potential significance of the break glass event occurring near the active shooter. This could cause an automated workflow to be triggered causing security personal to be contacted or access to specific areas of the building to be restricted.

For an increase in the risk reported from social media on an specific asset, the priority of the alarm related to that asset movies higher on the monitoring client interfaces 2800-2900 because of the increased risk. This provides dynamic alarm prioritization in real-time versus statically prioritizing alarms without including any signals on the incidents that happen in real time that leave a potential risk on assets.

The provided risk score can also be used to sort the alarms based on the risk score. The risk score can be dynamic risk score for the most important alarm at that particular time or it can be the baseline risk score to highlight the assets or neighborhoods that historically have shown higher exposer to threats like crime or natural disasters.

Referring now to FIG. 30, an interface 3000 is shown providing a global risk dashboard to view dynamic risk history, threat, and asset information interactively, according to an exemplary embodiment. The interface 3000 can be generated by the risk dashboard 130 to provide a user with information for assets and/or threats on a global scale. The risk dashboard 130 can provide a dedicated application to risk and threat analysis across all assets associated with a particular entity or group of entities (e.g., a store chain, a particular chain owner, etc.). The risk dashboard 130 is a comprehensive tool for risk analysis utilizing most of the backend service developed for risk. The interface 3000 can provide an overview of all assets and the major risk factors for each one, an analysis of threats by grouping them based on category, location and time frame. Furthermore, the interface 3000 can provide a view of historical values of dynamic risk. The interface can provide an indication of analysis of baseline risk scores for different neighborhoods and assets including comparisons and root cause analysis. The interface 3000 can provide risk forecasting based on the historical data and can provide the capability to do simulated scenarios for moving assets. The interface 3000 can use map view to quickly identify the threats and their risk scores against assets and explore assets, their values and vulnerabilities interactively.

The implementation of the risk dashboard 130 can be different in different applications. The risk dashboard 130 allows a user to view dynamic risk history, threats and asset information interactively. As shown in the figure, the threats can be categorized and filtered interactively to enable analyzing the risk globally across all assets. The threats can be filtered by asset category, threat severity, threat type, geographic regions, etc. Furthermore, the risk dashboard 130 (or any other risk dashboard described herein) can display forecasted risk for multiple future points in time based on multiple past threat values (e.g., for a particular asset). Risk scores can be forecasted via timeseries forecasting techniques such as the techniques as described in U.S. patent application Ser. No. 14/717,593 filed May 20, 2015, the entirety of which is incorporated by reference herein.

Referring more particularly to interface 3000, interface 3000 is shown to include an element 3002. The element 3002 can provide an indication of the most recent risk score for a particular asset for all assets reported in the interface 3000. Element 3004 can show the value of the risk score, an identification of an asset, a location of the asset, and time that the threat occurred that is affecting the asset. The risk information shown in the element 3004 can be the information of the last risk score shown in the element 3002.

A counter 3006 is shown in the interface 3000. The counter 3006 can count the number of threats that have been recorded for all assets on a global scale. An indication of a time at which the risk dashboard 130 most recently updated the counter 3006 can be shown. In some embodiments, the total number of threats shown by the counter 3006 is an all-time count and/or for a particular period of time into the past. The element 3008 can show a count of threats by data source. In this regard, the risk dashboard 130 can record the number of threats reported by teach of the data sources 102 and display the indication in the element 3008.

Element 3010 illustrates threats by geographic area on an interactive map. The asset locations shown may correspond to important cities and/or cities where assets belonging to the entity and/or entities are located. The risk scores for the assets can be shown by different colors to indicate the level of risk of each city. For example, some cities may have more risk scores and/or higher level risk scores, therefore, these cities can be assigned a different risk level and/or risk level color.

In element 3016, risk scores are shown over time. The risk scores can illustrate a trend for a particular asset, city, and/or a maximum reported risk score for multiple points of time. Element 3012 provides an indication of assets and the number of threats reported for particular locations (e.g., cities, states, countries, continents, etc.). Element 3014 provides an indication of a number of threats per category. The categories can be the same and/or similar to the categories described with reference to FIG. 5. Finally, element 3018 provides an indication of threats and the severity of the threats. The indications of threat severities are shown in a pie chart where a particular percentage of total reported threats have a severity level within predefined amounts associated with an "Extreme" label while a second percentage of total reported threats have a severity level within other predefined amounts associated with a "Severe" label.

Referring now to FIG. 31, an interface 3100 is shown including additional information on dynamic and baseline risk for a particular asset. The interface 3100 is shown to include an element 3102. The element 3102 can provide an indication of dynamic risk 332, element 3104, a trend of the dynamic risk trend 3106, and a baseline risk 3108. Element 3102 provides an indication of dynamic risk and highlighted threats impacting an asset. Risk dynamics can be studied by providing the risk evolution in time and highlighting major incidents causing the risk to rise or fall. The trend 3106 provides an indication of the risk levels rising due to major events.

The risk decay and threat expiry can also be studied in detail using the risk dashboard capabilities (e.g., the threat expiration and risk decay as shown and described with reference to FIG. 22 and elsewhere herein).

Referring to FIG. 29 and FIG. 31, historical risk and their evolution when threats are impacting the assets is shown. FIG. 29 particularly shows risk dynamics with threat expiry and decay factors. It should be understood that the baseline risk is also impacted by the introduction of the threats. However, the impact is very small compared to the dynamic risk because baseline risk considers the historical data so sudden changes in the data do not move the chart that much. There is a certain weighting for the history rather than the latest samples.

Referring now to FIG. 32, interface 3200 is shown providing analysis tools to study threats impacting the assets by grouping, sorting and/or forecasting, according to an exemplary embodiment. Interface 3200 is shown to include a regional risk element 3202. The risk element 3202 can include an indication of risk scores for particular geographic regions. The geographic regions themselves can be considered assets and therefore the risk score for the geographic region can be determined in the same manner as the risk scores are generated for other assets by the risk analytics system 106. Furthermore, the geographic risk scores can be generated as a composite (e.g., the highest, average risk score, median risk score) for all threats and assets located within the geographic region.

Interface 3200 is shown to include element 3204. Element 3204 includes an indication of a number of threats received from the data sources 102 for each of the number of categories determines for the threats by the risk analytics system 106. The threat categories can be ordered in a list so that the categories with the highest number of threats is at the top and the categories with the lowest number of threats is at the bottom. If a particular category has more than a first predefined number of threats, the category can be shown in red text. If the number of threats for a category is between a second and the first number of threats (a range less than the number of threats for the red text), the threats can be shown in yellow. If the number of threats are less than and/or equal to the second number of threats, the threats can be shown in white. For example, for threat numbers are equal to and/or between 0 and 5, the categories can be shown in white. For threats equal to and/or between 6 and 11, the threat categories can be shown in yellow. For threat numbers equal and/or more than 12, the categories can be shown in red.

Elements 3206 and 3208 illustrate two threats and the assets that they each affect. The elements 3206 and 3208 are ordered based on the level of the risk that each represents. The elements 3206 and 3208 can be the same as and/or similar to the element 2504 as described with reference to FIG. 25.

Referring now to FIG. 33, an interface 3300 is shown indicating the risk score, the threats can be studied by grouping and filtering certain categories or locations, according to an exemplary embodiment. Interface 3300 is shown to include comments by particular security operators in element 3304. In this regard, if a new user logins into the risk dashboard 130, they can be presented with the interface 3300 showing the comments of a previous user that the new user may be replacing. A security advisor can see the previous comments and pick up the work right from where others left off with all the information consolidated in one place. The interface 3300 further shows regional risk score in element 3306. The element 3306 may be the same as and/or similar to the element 3202 as described with reference to FIG. 2. Furthermore, the top threats for various assets are shown in element 3302 of the interface 3300.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A risk management system comprising:
   one or more computer-readable storage media storing:
   a data structure, wherein the data structure comprises a plurality of vulnerability values indicating vulnerability levels for an asset based on a plurality of threat types; and
   instructions that, when executed by one or more processors, cause the one or more processors to:
   receive a threat to the asset, the threat comprising a particular threat type of the plurality of threat types;
   retrieve a particular vulnerability value from the data structure based on the particular threat type responsive to receipt of the threat;
   determine, based on the particular vulnerability value and the threat, a risk value associated with the asset; and
   generate a risk card based on the risk value associated with the asset.

2. The risk management system of claim 1, wherein the risk card comprises an indication of the asset and the risk value associated with the asset.

3. The risk management system of claim 1, wherein the risk card comprises an indication of the asset and the risk value associated with the asset.

4. The risk management system of claim 1, wherein the risk card is based on the risk value associated with the asset and the vulnerability levels of the asset.

5. The risk management system of claim 1, wherein the risk card is based on the risk value associated with the asset and the vulnerability levels for the asset, the risk card further comprises:
   an indication of the asset;
   the risk value associated with the asset; and
   the vulnerability levels associated with each of the plurality of threat types for the asset.

6. The risk management system of claim 1, further comprising a user interface to display the risk card.

7. The risk management system of claim 1, wherein the asset is at least one of a user, a space, a building, or a device.

8. The risk management system of claim 1, wherein each of the plurality of vulnerability values is a numeric value indicating an amount that the asset is affected by each of the plurality of threat types, wherein the numeric value is between zero and one.

9. The risk management system of claim 1, wherein the data structure is a matrix comprising a first dimension, wherein a plurality of assets including the asset are associated with the first dimension.

10. The risk management system of claim 1, wherein the data structure is a matrix comprising a first dimension and a second dimension, wherein a plurality of assets including the asset are associated with the first dimension and the plurality of threat types are associated with the second dimension.

11. The risk management system of claim 1, wherein the instructions cause the one or more processors to:
provide a data structure retrieve endpoint, wherein the data structure retrieve endpoint is configured to provide the data structure to a requesting device; and
provide a data structure update endpoint, wherein the data structure update endpoint is configured to update vulnerabilities of the data structure based on updates received from the requesting device.

12. The risk management system of claim 1, wherein the instructions cause the one or more processors to:
receive, via a user interface, a first update to a vulnerability associated with the asset and the particular threat type; and
update the data structure with the first update to the vulnerability; generate, for the asset, a set of threat types that the asset is vulnerable to based on the data structure, wherein the set of threat types are threat types that affect the risk value of the asset;
cause the user interface to display the set of threat types;
receive, via the user interface, a second update to the set of threat types, the second update comprising an indication to add one or more new threat types, wherein the data structure does not indicate that the risk value of the asset is affected by the one or more new threat types; and
update the plurality of vulnerability values of the data structure based on the second update by adding vulnerabilities based on the indication to add the one or more new threat types of the set of threat types.

13. A method for risk analysis, the method comprising:
receiving, by one or more processing circuits, a threat, the threat comprising a particular threat type of a plurality of threat types, the threat indicating an incident affecting a risk value associated with a particular asset of a plurality of assets;
retrieving, by the one or more processing circuits, a particular vulnerability of a data structure based on the particular threat type and the particular asset, wherein the data structure comprises a plurality of vulnerabilities and a plurality of pairs, each of the plurality of pairs comprising one of the plurality of assets and one of the plurality of threat types, wherein each of the plurality of pairs is associated with one of the plurality of vulnerabilities;
determining, by the one or more processing circuits, based on the particular vulnerability and the threat, the risk value associated with the particular asset; and
generating, by the one or more processing circuits, based on the risk value associated with the particular asset, a risk card.

14. The method of claim 13, comprising displaying, by the one or more processing circuits, the risk card via a user interface.

15. The method of claim 13, wherein each of the plurality of vulnerabilities is a numeric value indicating an amount that the particular asset is affected by each of the plurality of threat types, wherein the numeric value is between zero and one.

16. The method of claim 13, wherein the data structure is a matrix comprising a first dimension and a second dimension, wherein the plurality of assets including the particular asset are associated with the first dimension and the plurality of threat types are associated with the second dimension.

17. The method of claim 13, comprising:
providing, by the one or more processing circuits, a data structure retrieve endpoint, wherein the data structure retrieve endpoint is configured to provide the data structure to a requesting device; and
providing, by the one or more processing circuits, a data structure update endpoint, wherein the data structure update endpoint is configured to update vulnerabilities of the data structure based on updates received from the requesting device.

18. The method of claim 13, comprising:
receiving, by the one or more processing circuits, via a user interface, an update to a vulnerability associated with the particular asset and the particular threat type; and
updating, by the one or more processing circuits, the data structure with the update to the vulnerability.

19. A risk management system, comprising:
one or more computer-readable storage media having instructions stored thereon that, when executed by one or more processors, cause the one or more processors to:
receive a plurality of threat events indicating a potential threat to one or more of a plurality of assets, the plurality of threat events associated with a plurality of threat categories, the plurality of assets associated with a plurality of locations;
for each asset of the plurality of assets:
determine one or more of the plurality of threat events affecting the asset; and generate a risk score for each of the plurality of assets based on the plurality of threat events determined to affect the asset;
generate a location-specific aggregated risk score for two or more of the plurality of locations based on a combination of the risk score of at least some the plurality of assets associated with the plurality of locations;
generate a category-specific risk metric indicating, for each of at least two or more of the plurality of threat categories, a number of threat events associated with the plurality of threat categories;
generate user interface data including, within a single interface, visual representations of both location-specific aggregated risk scores for the two or more of the plurality of locations and category-specific risk metrics for the two or more of the plurality of threat categories;
generate a risk card, based on the user interface data; and
cause the risk card to be displayed on a display device.

20. The risk management system of claim 19, wherein the plurality of assets comprise at least one of a user, a space, a building, or a device.

\* \* \* \* \*